US012684097B2

(12) United States Patent
Amano et al.

(10) Patent No.: US 12,684,097 B2
(45) Date of Patent: Jul. 14, 2026

(54) IMAGE FORMING OPTICAL SYSTEM, PROJECTION TYPE DISPLAY DEVICE, AND IMAGING APPARATUS

(71) Applicant: FUJIFILM Corporation, Tokyo (JP)

(72) Inventors: Masaru Amano, Saitama (JP); Akiko Nagahara, Saitama (JP); Yukiko Nagatoshi, Saitama (JP); Taku Furubayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 386 days.

(21) Appl. No.: 18/364,071

(22) Filed: Aug. 2, 2023

(65) Prior Publication Data

US 2024/0064276 A1 Feb. 22, 2024

(30) Foreign Application Priority Data

Aug. 16, 2022 (JP) ................................ 2022-129664

(51) Int. Cl.
*H04N 9/31* (2006.01)

(52) U.S. Cl.
CPC ........... *H04N 9/317* (2013.01); *H04N 9/3197* (2013.01)

(58) Field of Classification Search
CPC ............................. H04N 9/317; H04N 9/3197
USPC .......................................................... 353/101
See application file for complete search history.

(56) References Cited

U.S. PATENT DOCUMENTS 11,378,880 B2 7/2022 Masui et al.
2019/0235197 A1* 8/2019 Kuwashiro .......... G03B 21/142
2022/0373773 A1 11/2022 Kuwashiro

FOREIGN PATENT DOCUMENTS

JP 2017-032927 A 2/2017
JP 2018-180447 A 11/2018
JP 2019-133120 A 8/2019
WO WO-2020045559 A1 * 3/2020 ........... G02B 15/167

OTHER PUBLICATIONS

Translation of WO 2020045559 A1 (Year: 2025).*
An Office Action, “Notice of Reasons for Refusal,” mailed by the Japanese Patent Office on Mar. 10, 2026, which corresponds to Japanese Patent Application No. 2022-129664 and is related to U.S. Appl. No. 18/364,071; with English language translation.

* cited by examiner

*Primary Examiner* — Jerry L Brooks
(74) *Attorney, Agent, or Firm* — Studebaker Brackett PLLC

(57) ABSTRACT

The image forming optical system is capable of forming an image on a conjugated plane on a reduction side as an intermediate image and re-forming the intermediate image as a magnified image on a conjugated plane on a magnification side. The image forming optical system includes: a first adjustment group that moves along an optical axis in adjusting an image formation position of a region of the magnified image including a farthest point from the optical axis; and a second adjustment group that moves along the optical axis in adjusting an image formation position of a region of the magnified image including a nearest point from the optical axis. An optical element disposed closest to the magnification side is a lens. The second adjustment group has a positive refractive power as a whole, and is disposed closest to the reduction side.

19 Claims, 44 Drawing Sheets

EXAMPLE 1

EXAMPLE 1

EXAMPLE 1

EXAMPLE 2

EXAMPLE 2

EXAMPLE 3

EXAMPLE 3

EXAMPLE 4

EXAMPLE 4

EXAMPLE 5

EXAMPLE 5

EXAMPLE 6

EXAMPLE 6

EXAMPLE 7

EXAMPLE 7

EXAMPLE 8

EXAMPLE 8

EXAMPLE 9

EXAMPLE 9

EXAMPLE 10

EXAMPLE 10

EXAMPLE 11

EXAMPLE 11

EXAMPLE 12

EXAMPLE 12

EXAMPLE 13

EXAMPLE 13

EXAMPLE 14

EXAMPLE 14

EXAMPLE 15

EXAMPLE 15

EXAMPLE 16

EXAMPLE 16

IMAGE FORMING OPTICAL SYSTEM, PROJECTION TYPE DISPLAY DEVICE, AND IMAGING APPARATUS

CROSS-REFERENCE TO RELATED APPLICATIONS

This application claims priority from Japanese Patent Application No. 2022-129664, filed on Aug. 16, 2022, the entire disclosure of which is incorporated herein by reference.

BACKGROUND OF THE INVENTION

Technical Field

The technique of the present disclosure relates to an image forming optical system, a projection type display device, and an imaging apparatus.

Related Art

JP2019-133120A describes an image forming optical system applicable to a projection type display device.

SUMMARY

There is a demand for an image forming optical system having a wide angle and maintaining high optical performance in which various aberrations are satisfactorily corrected. Further, there is a demand for an image forming optical system capable of performing various adjustments such as adjustment of field curvature and adjustment of image formation position.

The present disclosure has been made in view of the above circumstances, and an object of the present disclosure is to provide an image forming optical system having various adjustment mechanisms and maintaining high optical performance in which various aberrations due to an increase in angle of view are satisfactorily corrected, a projection type display device including the image forming optical system, and an imaging apparatus including the image forming optical system.

According to a first aspect of the present disclosure, there is provided an image forming optical system capable of forming an image on a conjugated plane on a reduction side as an intermediate image and re-forming the intermediate image as a magnified image on a conjugated plane on a magnification side, the image forming optical system comprising: a first adjustment group that moves along an optical axis in adjusting an image formation position of a region of the magnified image including a farthest point from the optical axis; and a second adjustment group that moves along the optical axis in adjusting an image formation position of a region of the magnified image including a nearest point from the optical axis, in which an optical element disposed closest to the magnification side is a lens, and the second adjustment group includes at least two lenses, has a positive refractive power as a whole, and is disposed closest to the reduction side.

In the first aspect, it is preferable that the second adjustment group consists of two lenses, and at least one of the two lenses is a positive lens. Assuming that an Abbe number of the positive lens based on a d line is νp, it is preferable that the image forming optical system satisfies Conditional Expression (1), which is represented by $$\nu p<45 \quad (1).$$

According to a second aspect of the present disclosure, there is provided an image forming optical system capable of forming an image on a conjugated plane on a reduction side as an intermediate image and re-forming the intermediate image as a magnified image on a conjugated plane on a magnification side, the image forming optical system comprising: a first adjustment group that moves along an optical axis in adjusting an image formation position of a region of the magnified image including a farthest point from the optical axis; and a second adjustment group that moves along the optical axis in adjusting an image formation position of a region of the magnified image including a nearest point from the optical axis, in which an optical element disposed closest to the magnification side is a lens, and the second adjustment group includes at least one positive lens, has a positive refractive power as a whole, and is disposed closest to the reduction side. Assuming that an Abbe number of the positive lens of the second adjustment group based on a d line is νp, the image forming optical system satisfies Conditional Expression (1), which is represented by $$\nu p<45 \quad (1).$$

In the following, in this unit, the first aspect and the second aspect are collectively referred to as the above-mentioned aspect.

In the above-mentioned aspect, assuming that a focal length of the first adjustment group is f1, a composite focal length of a plurality of groups of the first adjustment group is f1 in a case where the first adjustment group consists of the plurality of groups that move by changing a spacing from adjacent groups during the adjustment, a focal length of the second adjustment group is f2, and a composite focal length of a plurality of groups of the second adjustment group is f2 in a case where the second adjustment group consists of the plurality of groups that move by changing a spacing from adjacent groups during the adjustment, it is preferable that the image forming optical system satisfies Conditional Expression (2), which is represented by $$0.5<|f1/f2|<30 \quad (2).$$

In the above-mentioned aspect, assuming that a paraxial lateral magnification of the first adjustment group is β1, a composite paraxial lateral magnification of a plurality of groups of the first adjustment group is β1 in a case where the first adjustment group consists of the plurality of groups that move by changing a spacing from adjacent groups during the adjustment, a composite paraxial lateral magnification of the entire optical system closer to the reduction side than the first adjustment group is β1r, a paraxial lateral magnification of the second adjustment group is β2, and a composite paraxial lateral magnification of a plurality of groups of the second adjustment group is β2 in a case where the second adjustment group consists of the plurality of groups that move by changing a spacing from adjacent groups during the adjustment, it is preferable that the image forming optical system satisfies Conditional Expression (3), which is represented by $$0<|\{(1-\beta 1^2)\times\beta 1r^2\}/(1-\beta 2^2)|<0.5 \quad (3).$$

In the above-mentioned aspect, it is preferable that the first adjustment group is disposed closer to the magnification side than the intermediate image.

In the above-mentioned aspect, the image forming optical system consists of, in order from the magnification side to the reduction side, a first optical system and a second optical system with the intermediate image interposed therebetween. Assuming that a focal length of the first optical system is fU1, and a focal length of the image forming optical system is fw, where fU1 and fw are values at a wide angle end in a case where the image forming optical system is a variable magnification optical system, it is preferable that the image forming optical system satisfies Conditional Expression (4), which is represented by $$1<fU1/|fw|<5 \quad (4).$$

In the above-mentioned aspect, assuming that a back focal length of the image forming optical system at an air-equivalent distance is Bfw, and a focal length of the image forming optical system is fw, where Bfw and fw are values at a wide angle end in a case where the image forming optical system is a variable magnification optical system, it is preferable that the image forming optical system satisfies Conditional Expression (5), which is represented by $$3.5<Bfw/|fw| \quad (5).$$

In the above-mentioned aspect, it is preferable that the image forming optical system includes three single lenses that have negative refractive powers, successively in order from a position closest to the magnification side to the reduction side.

In the above-mentioned aspect, it is preferable that the image forming optical system is a variable magnification optical system, and the image forming optical system includes at least two lens groups, of which spacings with adjacent groups change during magnification change, at a position closer to the reduction side than the intermediate image.

In the above-mentioned aspect, it is preferable that the first adjustment group consists of two or fewer lenses.

According to another aspect of the present disclosure, there is provided a projection type display device comprising: a light valve that outputs an optical image; and the image forming optical system according to any one of the above-mentioned aspects, and the image forming optical system projects the optical image, which is output from the light valve, on a screen.

According to still another aspect of the present disclosure, there is provided an imaging apparatus comprising the image forming optical system according to any one of the above-mentioned aspects.

In the present specification, it should be noted that the terms "consisting of" and "consists of" mean that the lens may include not only the above-mentioned components but also lenses substantially having no refractive powers, optical elements, which are not lenses, such as a stop, a mask, a filter, a cover glass, a plane mirror, and a prism, and mechanism parts such as a lens flange, a lens barrel, an imaging element, and a camera shaking correction mechanism. Further, the "lens group" may include optical elements other than the lens such as a stop, a mask, a filter, a cover glass, a plane mirror, and a prism in addition to the lens.

The "first adjustment group", the "second adjustment group", the "sub-group", and the "lens group" in the present specification each are not limited to a configuration consisting of a plurality of components, but may be a configuration consisting of only one component, and may be a configuration consisting of for example, one lens. The "focal length" used in a conditional expression is a paraxial focal length. The term "a lens that has a positive refractive power" and the term "a positive lens" are synonymous. The term "a lens that has a negative refractive power" and the term "negative lens" are synonymous.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power, and the surface shape of the lens including the aspherical surface will be used in terms of the paraxial region unless otherwise specified.

The "d line", "C line", and "F line" described in the present specification are bright lines, the wavelength of the d line is 587.56 nm (nanometers), the wavelength of the C line is 656.27 nm (nanometers), and the wavelength of the F line is 486.13 nm (nanometers).

According to the present disclosure, it is possible to provide an image forming optical system having various adjustment mechanisms and maintaining high optical performance in which various aberrations due to an increase in angle of view are satisfactorily corrected, a projection type display device including the image forming optical system, and an imaging apparatus including the image forming optical system.

DESCRIPTION OF EMBODIMENTS

Hereinafter, embodiments of the present disclosure will be described with reference to the accompanying drawings.

Figure 1:
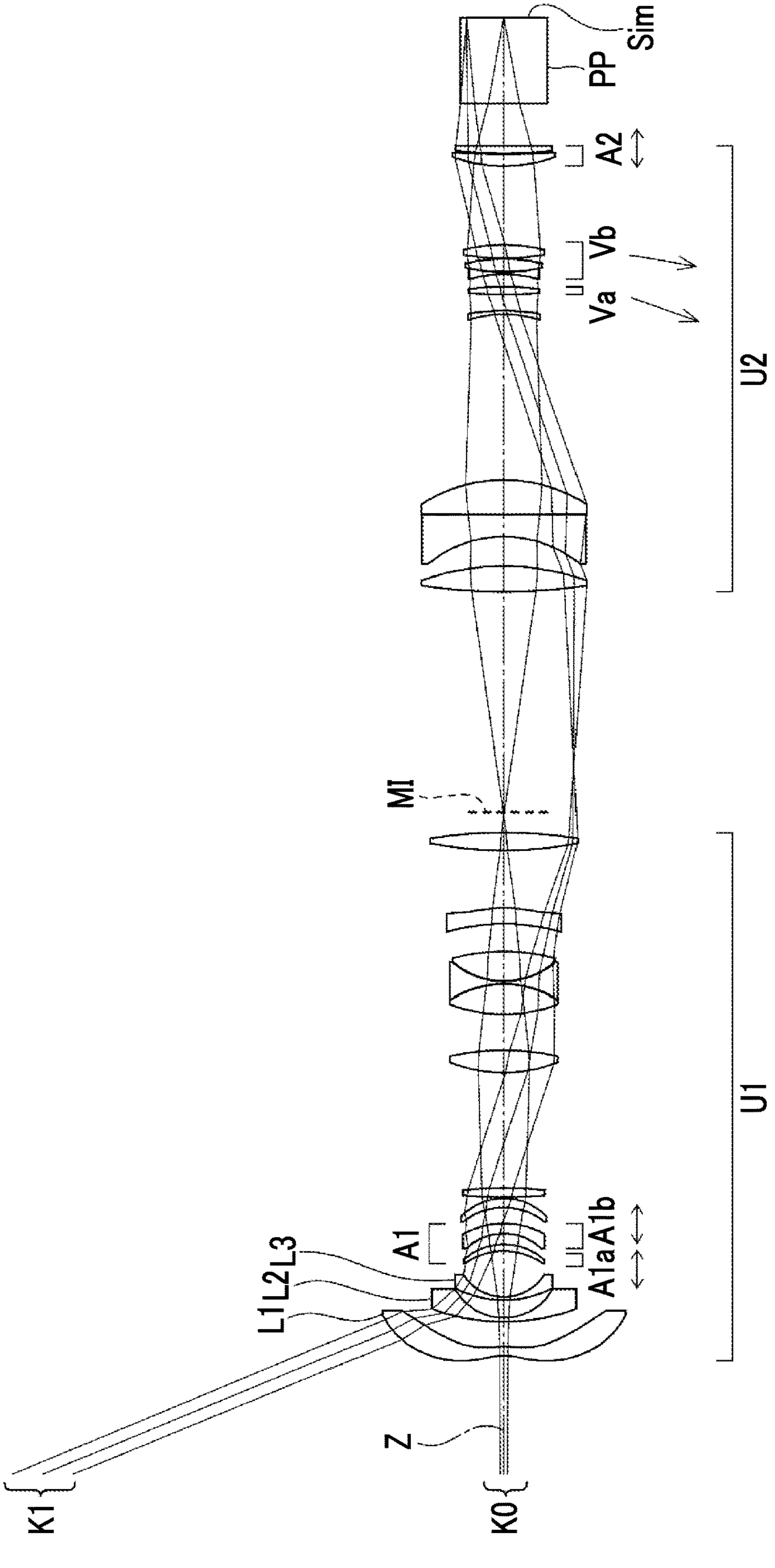
FIG. 1 is a cross-sectional view showing a configuration and luminous flux of an image forming optical system according to an embodiment, corresponding to an image forming optical system of Example 1.

FIG. 1 shows a configuration and luminous flux in a cross section including an optical axis Z of an image forming optical system according to an embodiment of the present disclosure. The configuration example shown in FIG. 1 corresponds to Example 1 described later. FIG. 1 shows, as the luminous flux, a luminous flux K0 with a minimum angle of view and a luminous flux K1 with a maximum half angle of view. In the example of FIG. 1, the luminous flux K0 with the minimum angle of view is an on-axis luminous flux. In FIG. 1, the left side is set as the magnification side, and the right side is set as the reduction side.

The image forming optical system of the present disclosure may be a projection optical system that is mounted on a projection type display device and forms an image projected on a screen, or may be an imaging optical system that is mounted on an imaging apparatus and that forms an image of an object. Hereinafter, the case of using the image forming optical system in the application of the projection optical system will be described. Further, in the following description, in order to avoid redundant description, the "image forming optical system of the present disclosure" may be simply referred to as an "image forming optical system".

FIG. 1 shows an example in which an optical member PP and an image display surface Sim of a light valve are disposed on the reduction side of the image forming optical system on the assumption that the image forming optical system is mounted on the projection type display device. The optical member PP is a member which is regarded as a filter, a cover glass, a color synthesis prism, or the like. The optical member PP has no refractive power, and the optical member PP may be configured to be omitted. The light valve outputs an optical image, and the optical image is displayed as an image on the image display surface Sim.

In the projection type display device, luminous flux provided with image information on the image display surface Sim is incident on the image forming optical system through the optical member PP, and is projected on the screen, which is not shown, through the image forming optical system. In such a case, the image display surface Sim corresponds to the conjugated plane on the reduction side, and the screen corresponds to the conjugated plane on the magnification side. It should be noted that, in the present specification, the term "screen" means an object on which a projected image formed by the image forming optical system is projected. The screen may be not only a dedicated screen but also a wall surface of a room, a floor surface, a ceiling surface, an outer wall surface of a building, or the like.

It should be noted that, in the description of the present specification, the term "magnification side" means the screen side on the optical path, and the "reduction side" means the image display surface Sim side on the optical path. In the present specification, the terms "magnification side" and "reduction side" are determined along the optical path, and this point is the same in a case of the image forming optical system having the deflected optical path. The term "closest to the magnification side" as used herein means that positions are closest to the magnification side on the optical path in the arrangement order, and does not mean that the positions are closest to the screen in terms of distance. In the following description, in order to avoid making the description redundant, the phrase "in order from the magnification side to the reduction side along the optical path" may be described as "in order from the magnification side to the reduction side".

The image forming optical system in FIG. 1 is capable of forming an image on a conjugated plane on a reduction side as an intermediate image MI and re-forming the intermediate image MI as a magnified image on a conjugated plane on a magnification side. In FIG. 1, only a part of the intermediate image MI near the optical axis is simply indicated by a dotted line. The intermediate image MI in FIG. 1 shows a position on the optical axis and does not show an accurate shape. The image forming optical system in FIG. 1, consists of, in order from the magnification side to the reduction side, a first optical system U1 and a second optical system U2 with the intermediate image MI interposed therebetween. The optical system that forms the intermediate image MI in such a manner has an advantage that a back focal length of the first optical system U1 can be shortened and a lens diameter of the first optical system U1 on the magnification side can be reduced.

For example, in the example of FIG. 1, the first optical system U1 consists of 13 lenses, and the second optical system U2 consists of 10 lenses. The second optical system U2 forms an image of an image displayed on the image display surface Sim as an intermediate image MI, and the first optical system U1 reforms the intermediate image MI as a magnified image (that is, a projected image) on a screen (not shown in the drawing).

In the image forming optical system of the present disclosure, an optical element disposed on the magnification side is configured to be a lens. If a mirror having power and co-axis with the other lens is disposed closest to the magnification side of the image forming optical system, a problem arises in that the luminous flux near the optical axis cannot reach the screen and cannot be used for imaging. Therefore, in the image forming optical system of the present disclosure, such a problem is eliminated.

The image forming optical system of the present disclosure includes a first adjustment group A1 and a second adjustment group A2 as adjustment mechanisms. The first adjustment group A1 moves along the optical axis Z in adjusting an image formation position of a first region Re1 which is a region of the magnified image including a farthest point from the optical axis Z. The second adjustment group A2 moves along the optical axis Z in adjusting an image formation position of a second region Re2, which is a region of the magnified image including a nearest point from the optical axis Z. The "nearest point from the optical axis Z" described herein includes a point on the optical axis.

Figure 2:
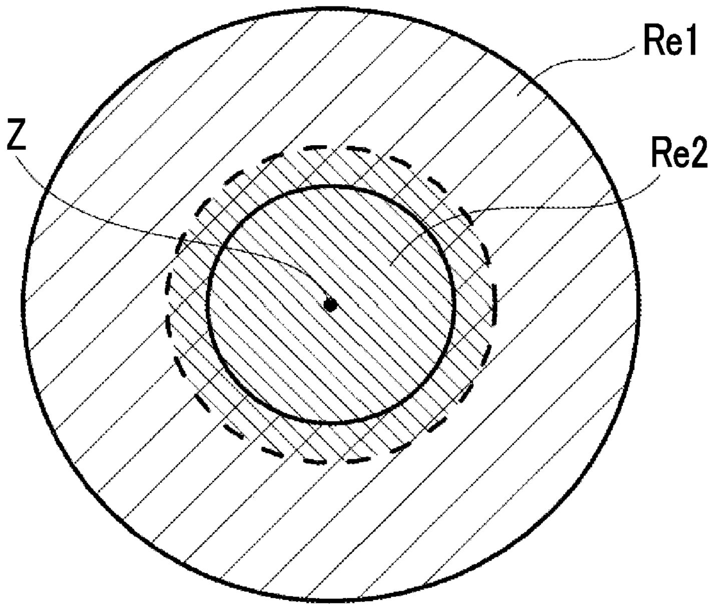
FIG. 2 is a diagram showing an example of a first region and a second region.

The first region Re1 is a region of the magnified image including the image formation point of the luminous flux K1 with the maximum half angle of view, and the second region Re2 is a region of the magnified image including the image formation point of the luminous flux K0 with the minimum angle of view. For example, FIG. 2 shows the first region Re1 and the second region Re2 in a plane perpendicular to the optical axis Z. The example of FIG. 2 shows the following configuration. The magnified image is a large solid circle which is centered on the optical axis Z. The first region Re1 is a ring-shaped portion which is hatched with relatively wide spacings between a circle having a large solid line and a circle having a small solid line. The second region Re2 is a broken line circle which is hatched with relatively narrow spacings. The farthest point in the magnified image is a point on a circumference that is the outer edge of the magnified image, and the first region Re1 includes the points. The nearest point in the magnified image is a point on the optical axis, and the second region Re2 includes the point.

Here, the first region Re1 and the second region Re2 in the technique of the present disclosure are not necessarily limited to the example of FIG. 2. As compared with the example of FIG. 2, any configuration in which the first region Re1 is wide or narrow is possible, and any configuration in which the second region Re2 is wide or narrow is possible. For example, in the radial direction, the first region Re1 may be set as a region from an image height of 40% of the maximum image height to the maximum image height, and the second region Re2 may be set as a region from the optical axis Z to an image height of 50% of the maximum image height. In the example of FIG. 2, a part of the first region Re1 and a part of the second region Re2 overlap each other, but in the technique of the present disclosure, the first region Re1 and the second region Re2 do not have to have an overlapping part. For example, in the radial direction, the first region Re1 may be set as a region from an image height of 50% of the maximum image height to the maximum image height, and the second region Re2 may be set as a region from the optical axis Z to an image height of 50% of the maximum image height. FIG. 2 shows an example in which the second region Re2 includes the optical axis Z. However, in a case where the magnified image does not include the optical axis Z, there may be a configuration in which the second region Re2 does not include the optical axis Z. Further, although FIG. 2 shows a circular magnified image, a shape of the magnified image can be any shape, and may be, for example, a rectangular shape.

Since the first region Re1 is a region of the magnified image including the farthest point from the optical axis Z, the first adjustment group A1 is able to adjust an image formation position of an edge part of the magnified image. In the ultra-wide-angle image forming optical system, change in the magnified image with respect to change in the projection distance (distance on the optical axis from the surface closest to the magnification side in the image forming optical system to the conjugated plane on the magnification side) are greatly different between the vicinity of the optical axis and the edge part. That is, in the ultra-wide-angle image forming optical system, since the depth of field is deep in the vicinity of the optical axis of the magnified image, the sensitivity of the change in the image formation position with respect to the change in the projection distance is very low. In contrast, in the edge part of the magnified image, there is a tendency that the sensitivity of the change in the field curvature to the change in the projection distance is high. Therefore, the first adjustment group A1 is able to function as a field curvature correction group that moves along the optical axis Z in correcting field curvature. The correction of the field curvature is an important matter in the wide-angle optical system. Therefore, the provision of the first adjustment group A1 as described above is advantageous for an increase in angle of view.

It is preferable that the first adjustment group A1 is disposed closer to the magnification side than the intermediate image MI. That is, it is preferable that the first adjustment group A1 is disposed in the first optical system U1. In the first optical system U1 mainly used for an increase in angle of view of the optical system, the on-axis ray and the off-axis ray are easily separated. Therefore, the relative sensitivity difference in the image plane change between the on-axis and the off-axis also tends to increase. Specifically, in the first optical system U1, the sensitivity of the image plane change in a movement of each adjustment group is significantly higher than the sensitivity of the image plane change on the optical axis to the sensitivity of the image plane change outside the optical axis. For this reason, by disposing the first adjustment group A1 not in the second optical system U2 but in the first optical system U1, the effect of correcting field curvature is more likely to be exhibited.

In the example of FIG. 1, the first adjustment group A1 consists of two groups including a sub-group A1*a* and a sub-group A1*b*. The sub-group A1*a* and the sub-group A1*b* consist of lenses which are fourth and fifth from the magnification side, respectively. The sub-group A1*a* and the sub-group A1*b* move along the optical axis Z by changing the mutual spacing during the adjustment. The horizontal arrows below each of the sub-groups A1*a* and A1*b* in FIG. 1 indicate that the sub-group A1*a* and the sub-group A1*b* individually move along the optical axis Z by changing the mutual spacing during the adjustment. As described above, in a case where the first adjustment group A1 is configured to consist of a plurality of groups that move by changing the spacing between the adjacent groups during the adjustment, there is an advantage in achieving more favorable adjustment.

It is preferable that the first adjustment group A1 consists of two or fewer lenses. In such a case, there is an advantage in achieving reduction in weight of the first adjustment group A1, and it is easy to suppress the complication of the mechanism for moving the first adjustment group A1 and suppress the increase in size. Further, the configuration also is able to contribute to suppressing an increase in size of the image forming optical system.

In a case where the first adjustment group A1 consists of two lenses, and the two lenses are a positive lens and a negative lens, there is an advantage in suppressing fluctuation in chromatic aberration during adjustment. Further, in such a case, the positive lens and the negative lens forming the first adjustment group A1 may be cemented to each other, or both may be a single lens. In a case where the first adjustment group A1 consists of one lens and the one lens is a positive lens, there is an advantage in achieving reduction in size in the radial direction.

The second adjustment group A2 is able to perform adjustment of an image formation position in the vicinity of the optical axis of the magnified image, that is, so-called focus adjustment.

The second adjustment group A2 is disposed closest to the reduction side in the image forming optical system. The back focal length can be easily changed by moving the lens group closest to the reduction side in the image forming optical system. In the example of FIG. 1, the second adjustment group A2 consists of two lenses including a lens closest to the reduction side and a lens which is second from the reduction side. The horizontal arrow under the second adjustment group A2 in FIG. 1 indicates that the second adjustment group A2 moves along the optical axis Z during the adjustment.

The second adjustment group A2 is configured as a group that has a positive refractive power as a whole. By making the refractive power of the second adjustment group A2 disposed closest to the reduction side positive, it is easy to achieve both ensuring of telecentricity on the reduction side of the image forming optical system and change in the field curvature caused by change in the image formation position near the optical axis.

The second adjustment group A2 may be configured to include at least two lenses. By providing two or more lenses in the second adjustment group A2, there is an advantage in suppressing change in performance caused by change in the image formation position, and particularly there is an advantage in suppressing change in chromatic aberration.

The second adjustment group A2 may be configured to consist of two lenses. By setting the number of lenses of the second adjustment group A2 to two, it is possible to suppress an increase in volume of the second adjustment group A2 in the limited space closest to the reduction side. As a result, it becomes easy to realize a mechanism for moving the second adjustment group A2. In a case where the second adjustment group A2 consists of two lenses, the two lenses may be cemented to each other, or both of the two lenses may be single lenses.

Since the second adjustment group A2 is a group that has a positive refractive power as a whole, the second adjustment group A2 includes at least one positive lens. In a case where the second adjustment group A2 consists of two lenses, both of the two lenses may be positive lenses, or the two lenses may be a positive lens and a negative lens.

In a case where an Abbe number of at least one positive lens included in the second adjustment group A2 based on the d line is νp, it is preferable that the image forming optical system satisfies Conditional Expression (1). In a general optical material, the refractive index increases as the Abbe number decreases. Therefore, by using a material having a smaller Abbe number, it is easy to ensure the refractive power of the lens without reducing the absolute value of the curvature radius of the lens. Assuming that, in a case where an absolute value of the curvature radius is small, aberration is likely to occur, and change in performance caused by the adjustment of the image formation position increases. By not allowing the corresponding value of Conditional Expression (1) to be equal to or greater than the upper limit thereof, it is possible to suppress occurrence of aberration while ensuring an appropriate refractive power for the second adjustment group A2. As a result, it is possible to suppress change in performance due to adjustment of the image formation position. It is more preferable that the image forming optical system satisfies Conditional Expression (1-1). By satisfying Conditional Expression (1-1), a material having an Abbe number greater than the lower limit of Conditional Expression (1-1) can be used. In a general optical material, a refractive index decreases as the Abbe number increases, but a higher transmittance can be obtained in accordance therewith, and the material cost becomes lower.

$$\nu p<45 \quad (1)$$

$$10<\nu p<45 \quad (1\text{-}1)$$

Assuming that a focal length of the first adjustment group A1 is f1 and a focal length of the second adjustment group A2 is f2, it is preferable that the image forming optical system satisfies Conditional Expression (2). However, in a case where the first adjustment group A1 consists of a plurality of groups that move by changing the spacing between the adjacent groups during the adjustment, it is assumed that a composite focal length of the plurality of groups is f1. Further, in a case where the second adjustment group A2 consists of a plurality of groups that move by changing the spacing between the adjacent groups during the adjustment, it is assumed that a composite focal length of the plurality of groups is f2. By not allowing the corresponding value of Conditional Expression (2) to be equal to or less than the lower limit thereof, the refractive power of the first adjustment group A1 is prevented from becoming excessively strong with respect to the refractive power of the second adjustment group A2. Thus, the change in the image formation position in the vicinity of the optical axis of the magnified image in a case where the first adjustment group A1 moves is prevented from becoming excessively large. Therefore, even in a case where the second adjustment group A2 corrects the change in the image formation position, the change can be performed while balancing the overall performance of the image forming optical system while suppressing the amount of movement of the second adjustment group A2. By not allowing the corresponding value of Conditional Expression (2) to be equal to or greater than the upper limit thereof, the refractive power of the first adjustment group A1 with respect to the refractive power of the second adjustment group A2 is not excessively weakened, and thus the amount of movement of the first adjustment group A1 can be suppressed. As a result, there is an advantage in achieving reduction in size of the entire optical system. In order to obtain more favorable characteristics, it is more preferable that the image forming optical system satisfies Conditional Expression (2-1).

$$0.5<|f1/f2|<30 \quad (2)$$

$$1<|f1/21<8.5 \quad (2\text{-}1)$$

Assuming that a paraxial lateral magnification of the first adjustment group A1 is β1, a composite paraxial lateral magnification of all optical systems closer to the reduction side than the first adjustment group A1 is β1r, and a paraxial lateral magnification of the second adjustment group A2 is β2, it is preferable that the image forming optical system satisfies Conditional Expression (3). However, in a case where the first adjustment group A1 consists of a plurality of groups that move by changing the spacing between the adjacent groups during the adjustment, it is assumed that a composite paraxial lateral magnification of these plurality of groups is β1. Further, in a case where the second adjustment group A2 consists of a plurality of groups that move by changing the spacing between the adjacent groups during the adjustment, it is assumed that a composite paraxial lateral magnification of these plurality of groups is β2. The term $\{(1-\beta1^2)\times\beta1r^2\}$ of Conditional Expression (3) indicates a ratio of an amount of movement of the image formation position to a unit amount of movement of the first adjustment group A1, that is, a sensitivity of change in the image formation position in a case where the first adjustment group A1 moves. In a similar manner, assuming that a composite paraxial lateral magnification of the entire optical system closer to the reduction side than the second adjustment group A2 is β2r, the term $\{(1-\beta2^2)\times\beta2r^2\}$ indicates a sensitivity of change in the image formation position in a case where the second adjustment group A2 moves. However, in the image forming optical system of the present disclosure, the second adjustment group A2 is disposed closest to the reduction side. Therefore, β2r=1, and $\{(1-\beta2^2)\times\beta2r^2\}=(1-\beta2^2)$. That is, Conditional Expression (3) is an expression relating to the ratio of the sensitivity of the first adjustment group A1 to the sensitivity of the second adjustment group A2. Regarding the lower limit of the conditional expression (3), the corresponding value of the conditional expression (3) is an absolute value, and thus "0<". By not allowing the corresponding value of Conditional Expression (3) to be equal to or greater than the upper limit thereof, the sensitivity of the first adjustment group A1 to the sensitivity of the second adjustment group A2 is prevented from becoming excessively large. Thus, the change in the image formation position in the vicinity of the optical axis of the magnified image in a case where the first adjustment group A1 moves is prevented from becoming excessively large. Therefore, even in a case where the second adjustment group A2 corrects the change in the image formation position, the change can be performed while balancing the overall performance of the image forming optical system while suppressing the amount of movement of the second adjustment group A2. In order to obtain more favorable characteristics, it is more preferable that the image forming optical system satisfies Conditional Expression (3-1).

$$0<|\{(1-\beta1^2)\times\beta1r^2\}/(1-\beta2^2)|<0.5 \quad (3)$$

$$0<|\{(1-\beta1^2)\times\beta1r^2\}/(1-\beta2^2)|<0.15 \quad (3\text{-}1)$$

Assuming that a focal length of the first optical system U1 is FU1 and a focal length of the image forming optical system is fw, it is preferable that the image forming optical system satisfies Conditional Expression (4). Here, it is assumed that all and fw are values at a wide angle end in a case where the image forming optical system is a variable magnification optical system. By not allowing the corresponding value of Conditional Expression (4) to be equal to or less than the lower limit thereof, the F number of the first optical system U1 is prevented from being excessively reduced. As a result, there is an advantage in correcting spherical aberration and astigmatism. Further, by not allowing the corresponding value of Conditional Expression (4) to be equal to or less than the lower limit thereof, the luminous flux diameter of the on-axis ray passing through the first optical system U1 is reduced. Thus, the above-mentioned relative sensitivity difference with respect to the image plane change between the on-optical-axis state and the off-optical-axis state increases. As a result, the effect of correcting field curvature can be made larger. By not allowing the corresponding value of Conditional Expression (4) to be equal to or greater than the upper limit thereof, the relay magnification in forming the intermediate image MI is prevented from becoming excessively large. Therefore, the size of the intermediate image MI can be suppressed. Therefore, it is possible to suppress an increase in size of the first optical system U1, and there is an advantage in correcting distortion and field curvature in the first optical system U1. In order to obtain more favorable characteristics, it is more preferable that the image forming optical system satisfies Conditional Expression (4-1).

$$1<|\{(1-\beta1^2)\times\beta1r^2\}/(1-\beta2^2)|<0.5 \quad (4)$$

$$1.5<fU1/|fw|<2.5 \quad (4\text{-}1)$$

Assuming that a back focal length of the image forming optical system at an air-equivalent distance is Bfw and a focal length of the image forming optical system is fw, it is preferable that the image forming optical system satisfies Conditional Expression (5). Here, it is assumed that Bfw and fw are values at a wide angle end in a case where the image forming optical system is a variable magnification optical system. Further, regarding the back focal length, the reduction side is set as the back side. By not allowing the corresponding value of Conditional Expression (5) to be equal to or less than the lower limit thereof, the back focal length is prevented from being excessively shortened, and thus it is easy to dispose a color synthesis prism or the like. It is more preferable that the image forming optical system satisfies Conditional Expression (5-1). By not allowing the corresponding value of Conditional Expression (5-1) to be equal to or less than the lower limit thereof, the above-mentioned effect relating to the lower limit of Conditional Expression (5) can be further enhanced. By not allowing the corresponding value of Conditional Expression (5-1) to be equal to or greater than the upper limit thereof, it is possible to suppress an increase in size of the entire optical system including the back focal length.

$$3.5<Bfw/|fw| \quad (5)$$

$$4.5<Bfw/|fw|<10 \quad (5\text{-}1)$$

It is preferable that the image forming optical system includes three single lenses that have negative refractive powers, successively in order from a position closest to the magnification side to the reduction side. In such a case, there is an advantage in achieving an increase in angle of view. In the example of FIG. 1, the lens L1 closest to the magnification side, the lens L2 which is second from the magnification side, and the lens L3 which is third from the magnification side are single lenses each of which has a negative refractive power. In a case where the image forming optical system includes three single lenses each of which has a negative refractive power successively in order from the magnification side to the reduction side, it is preferable that the first adjustment group A1 is disposed closer to the reduction side than the three single lenses each of which has a negative refractive power. The negative lens disposed on the magnification side and used for an increase in angle of view tends to have a large diameter. Therefore, in a case where the first adjustment group A1 is configured by using the above three single lenses each of which has a negative refractive power, the moving mechanism that operates the first adjustment group A1 is increased in size. Therefore, it is preferable to make a configuration of the first adjustment group A1 by using lenses different from the three single lenses each of which has a negative refractive power.

The image forming optical system may be configured to be a variable magnification optical system, or may be configured to be, for example, a zoom optical system. In such a case, it is preferable that the image forming optical system includes at least two lens groups at a position closer to the reduction side than the intermediate image MI, in which the spacing between the adjacent groups changes during magnification change. By performing magnification change at a position closer to the reduction side than the intermediate image MI, change in magnification for magnification change can be performed by changing the size of the intermediate image MI. Therefore, an optically simple configuration can be obtained.

For example, in the example of FIG. 1, the image forming optical system is a zoom lens, and the second optical system U2 includes two lens groups Va and Vb in which the spacing between adjacent groups changes during magnification change. In the example of FIG. 1, the lens group Va consists of one lens which is sixth from the reduction side, and the lens group Va consists of three lenses which are third to fifth from the reduction side. The lens group Va and the lens group Vb in the example of FIG. 1 move toward the magnification side along the optical axis Z during magnification change from the wide angle end to the telephoto end. In FIG. 1, an oblique downward arrow indicates a schematic movement direction of each lens group during magnification change from the wide angle end to the telephoto end under a lens group that moves during magnification change.

It is preferable that the image forming optical system is configured to be telecentric on the reduction side. For example, a projection type display device that projects a high-definition image mostly employs a so-called three-plate system in which an image display element corresponding to each wavelength of blue, green, or red is provided. In order to support such a method, it is preferable that the zoom lens is configured to be telecentric on the reduction side. Strictly speaking, in an image forming optical system which is telecentric on the reduction side, a principal ray directed from the surface closest to the reduction side in the image forming optical system to the conjugated plane on the reduction side is parallel to the optical axis Z.

However, the phrase "telecentric on the reduction side" in the technique of the present disclosure is not limited to the case where the angle of the principal ray with respect to the optical axis Z is 0 degree, and includes an error that is practically allowed in the technical field to which the technique of the present disclosure belongs. The error may be, for example, in a range in which the angle of the principal ray with respect to the optical axis Z is −3 degrees or more and +3 degrees or less. In a system that does not include the aperture stop St, in a case where the luminous flux is viewed in the direction from the magnification side to the reduction side, the telecentricity may be determined by using, as a substitute for the principal ray, the bisector line of the maximum ray on the upper side and the maximum ray on the lower side in the cross section of the luminous flux focused on a point on the conjugated plane on the reduction side.

In the image forming optical system, it is preferable that distortion is suppressed within a range of −3% or more and +3% or less. Further, it is preferable that the image forming optical system has a maximum total angle of view of 120 degrees or more. In a case where the image forming optical system is a variable magnification optical system, it is preferable that the maximum total angle of view at the wide angle end is 120 degrees or more.

The example shown in FIG. 1 is an example, and various modifications can be made without departing from the scope of the technique according to the embodiment of the present disclosure. For example, the number of lenses included in the first adjustment group A1, the second adjustment group A2, the first optical system U1, the second optical system U2, and the lens group that moves during magnification change may be different from the number of lenses in the example of FIG. 1. In order to achieve reduction in size, the first adjustment group A1 may be configured to consist of one lens. In order to simplify the movable mechanism, the first adjustment group A1 may be configured to consist of a plurality of lenses that move integrally. In order to achieve reduction in size, the second adjustment group A2 may be configured to consist of one positive lens. In a case where the second adjustment group A2 consists of one positive lens, the magnification side surface of the positive lens may be configured to be a convex surface. The second adjustment group A2 may be configured to consist of a plurality of groups that move by changing the spacing between adjacent groups during adjustment. The number of lens groups in which the spacing between the adjacent groups changes during magnification change may be different from the number in the example of FIG. 1.

In a case of correcting field curvature, both the first adjustment group A1 and the second adjustment group A2 may be configured to move along the optical axis Z. In a case of correcting field curvature, both the first adjustment group A1 and the second adjustment group A2 may be configured to move along the optical axis Z at the same time. Alternatively, after the second adjustment group A2 moves along the optical axis Z, the first adjustment group A1 may move along the optical axis Z to correct field curvature.

The image forming optical system may be configured to include an optical path deflection member that deflects the optical path inside. For example, since a relatively wide air spacing can be ensured at a position adjacent to the intermediate image MI, it is easy to dispose the member at this position. Therefore, an optical path deflection member may be disposed at a position adjacent to the intermediate image MI. By including the optical path deflection member, it is possible to contribute to reduction in size of the entire optical system. As the optical path deflection member, for example, a mirror, a prism having a reflective surface, or the like can be used.

The deflection angle at which the optical path of the optical path deflection member is deflected can be arbitrarily set, but may be set to, for example, 90 degrees. By setting the deflection angle to 90 degrees, it is possible to form a structure that is easy to produce. It should be noted that the term "90 degrees" includes an error that is practically allowed in the technical field to which the technique of the present disclosure belongs. The error may be, for example, in a range of −5 degrees or more and +5 degrees or less.

The above-mentioned preferred configurations and available configurations may be optional combinations, and it is preferable to selectively adopt the configurations in accordance with required specification. It should be noted that the conditional expressions that the image forming optical system of the present disclosure preferably satisfies are not limited to the conditional expressions described in the form of the expression, and the lower limit and the upper limit are selected from the preferable and more preferable conditional expressions. The conditional expressions may include all conditional expressions obtained through optional combinations.

According to a preferred first aspect of the present disclosure, there is provided an image forming optical system capable of forming an image on a conjugated plane on a reduction side as an intermediate image MI and re-forming the intermediate image MI as a magnified image on a conjugated plane on a magnification side. The image forming optical system comprises: a first adjustment group A1 that moves along an optical axis Z in adjusting an image formation position of a region of the magnified image including a farthest point from the optical axis Z; and a second adjustment group A2 that moves along the optical axis Z in adjusting an image formation position of a region of the magnified image including a nearest point from the optical axis Z. An optical element disposed closest to the magnification side is a lens, and the second adjustment group A2 includes at least two lenses, has a positive refractive power as a whole, and is disposed closest to the reduction side.

In a preferred second aspect of the present disclosure, there is provided an image forming optical system capable of forming an image on a conjugated plane on a reduction side as an intermediate image MI and re-forming the intermediate image MI as a magnified image on a conjugated plane on a magnification side. The image forming optical system comprises: a first adjustment group A1 that moves along an optical axis Z in adjusting an image formation position of a region of the magnified image including a farthest point from the optical axis Z; and a second adjustment group A2 that moves along the optical axis Z in adjusting an image formation position of a region of the magnified image including a nearest point from the optical axis Z. An optical element disposed closest to the magnification side is a lens, and the second adjustment group A2 includes at least one positive lens, has a positive refractive power as a whole, and is disposed closest to the reduction side. Conditional Expression (1) is satisfied.

Next, examples of the image forming optical system of the present disclosure will be described, with reference to the drawings. The reference numerals noted in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

EXAMPLE 1

FIG. 1 is a cross-sectional view of a configuration and luminous flux of an image forming optical system of Example 1, and an illustration method and a configuration thereof are as described above. Therefore, some description is not repeated herein. The image forming optical system of Example 1 is a variable magnification optical system, and consists of, in order from the magnification side to the reduction side, the first optical system U1 and the second optical system U2 with the intermediate image MI formed in the image forming optical system and interposed between the first optical system U1 and the second optical system U2.

The first optical system U1 includes the first adjustment group A1. The first adjustment group A1 consists of the sub-group A1*a* and the sub-group A1*b* that move by changing a mutual spacing during adjustment. Each of the sub-groups A1*a* and the sub-group A1*b* consists of one lens. The second optical system U2 includes the second adjustment group A2 closest to the reduction side. The second optical system U2 includes the lens group Va and the lens group Vb that move by changing the spacing between the adjacent groups during magnification change. During magnification change, the lenses other than the lens group Va and the lens group Vb remain stationary with respect to the image display surface Sim.

Regarding the image forming optical system of Example 1, Tables 1A and 1B show basic lens data, Table 2 shows specifications and variable surface spacings, Table 3 shows aspherical coefficients, and Table 4 shows general pictures of the adjustment groups.

The table of basic lens data is divided into two tables including Table 1A and Table 1B in order to avoid lengthening of one table. Table 1A shows the first optical system U1, and Table 1B shows the second optical system U2 and the optical member PP. The table of basic lens data will be described as follows. The column of Sn shows surface numbers in a case where the surface closest to the magnification side is the first surface and the number is increased one by one toward the reduction side. The column of R shows a curvature radius of each surface. The column of D shows a surface spacing between each surface and the surface adjacent to the reduction side on the optical axis. The column of Nd shows a refractive index of each component at the d line. The column of νd shows an Abbe number of each component based on the d line.

In the table of the basic lens data, the sign of the curvature radius of the convex surface facing toward the magnification side is positive, and the sign of the curvature radius of the convex surface facing toward the reduction side is negative. A value at the bottom cell of D in Table 1B indicates a spacing between the image display surface Sim and the surface closest to the reduction side in the table. In the table of basic lens data, the symbol DD[ ] is used for each variable surface spacing during magnification change, and the magnification side surface number of the spacing is given in [ ] and is noted in the column of D. Table 1 shows data in a state where the projection distance is 1.1 meters (m).

Table 2 shows the magnification change ratio Zr, the absolute value of the focal length |f|, and the F number FNo., and the maximum total angle of view 2ω are shown on the basis of the d line. The maximum total angle of view is twice the maximum half angle of view. [°] in the cells of 2ω indicates that the unit thereof is a degree. In Table 2, the WIDE column shows values in the wide angle end state, and the TELE column shows values in the telephoto end state.

In basic lens data, a reference sign * is attached to surface numbers of aspherical surfaces, and values of the paraxial curvature radius are written into the column of the curvature radius of the aspherical surface. In Table 3, the Sn row shows surface numbers of the aspherical surfaces, and the KA and Am rows show numerical values of the aspherical coefficients for each aspherical surface. It should be noted that m of Am is an integer of 3 or more, and differs depending on the surface. For example, in the first surface of Example 1, m=3, 4, 5, . . . , and 20. The "E±n" (n: an integer) in numerical values of the aspherical coefficients of Table 3 indicates "$\times 10^{\pm n}$". KA and Am are the aspherical coefficients in the aspherical surface expression represented by the following expression.

$$Zd=C\times h^2/\{1+(1-KA\times C^2\times h^2)^{1/2}\}+\Sigma Am\times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is a reciprocal of the paraxial curvature radius, KA and Am are aspherical coefficients, and Σ in the aspherical surface expression means the sum with respect to m.

Table 4 shows general pictures of the first adjustment group A1 and the second adjustment group A2. Since the first adjustment group A1 of Example 1 consists of two groups including the sub-group A1*a* and the sub-group A1*b*, the columns of the number of lenses and Sn in Table 4 show values for each of the sub-groups. The column of the number of lenses shows the number of lenses constituting each group. The column of Sn shows surface numbers in a table of basic lens data of lenses constituting each group. For example, the term "7-8" in the Sn column of Table 4 indicates a lens corresponding to the seventh to eighth surfaces of the table of basic lens data. Regarding the adjustment group including the plurality of lenses, "moving individually" or "moving integrally" is described in the column of the form of moving in accordance with the form of moving during the adjustment. For example, in Example 1, the sub-group A1*a* and the sub-group A1*b* constituting the first adjustment group A1 move individually while changing the mutual spacing during the adjustment. Therefore, in the column of the form of moving of the first adjustment group A1, "moving individually" is written. The plurality of lenses forming the second adjustment group A2 of Example 1 move integrally. Therefore, in the column of the form of moving of the second adjustment group A2, "moving integrally" is written. It should be noted that, in the present specification, the term "moving integrally" means that the same amount of movement is performed in the same direction at the same time.

In the data of each table, degrees are used as a unit of an angle, and millimeters are used as a unit of a length, but appropriate different units may be used since the optical system can be used even in a case where the system is enlarged or reduced in proportion. Each of the following tables shows numerical values rounded off to predetermined decimal places.

TABLE 1A

Example 1

| Sn | R | D | Nd | νd |
|---|---|---|---|---|
| *1 | −26.5419 | 4.4999 | 1.53097 | 55.61 |
| *2 | −58.8569 | 12.3907 | | |
| 3 | 103.3005 | 1.9991 | 1.91082 | 35.25 |
| 4 | 27.7503 | 8.8653 | | |
| 5 | 52.7000 | 1.5000 | 1.80400 | 46.53 |
| 6 | 23.6826 | 22.8114 | | |
| 7 | −33.9122 | 3.2592 | 1.78880 | 28.43 |
| 8 | −30.4462 | 5.1537 | | |
| 9 | −27.8562 | 5.0438 | 1.71299 | 53.87 |
| 10 | −41.3529 | 7.9952 | | |
| 11 | −32.1152 | 4.5682 | 1.62299 | 58.16 |
| 12 | −29.1620 | 0.4991 | | |
| 13 | 196.3512 | 4.6268 | 1.80809 | 22.76 |
| 14 | −199.3536 | 57.0001 | | |
| 15 | 71.4190 | 11.1536 | 1.49700 | 81.61 |
| 16 | −123.8423 | 17.8430 | | |
| 17 | 74.1720 | 14.9585 | 1.60311 | 60.64 |
| 18 | −49.1700 | 1.3995 | 1.84666 | 23.78 |
| 19 | 38.9147 | 14.7375 | 1.49700 | 81.61 |
| 20 | −96.6568 | 13.7626 | | |
| *21 | −78.5681 | 7.9997 | 1.51633 | 64.06 |
| *22 | −49.9998 | 28.6074 | | |
| 23 | 191.4998 | 8.8537 | 1.80518 | 25.46 |
| 24 | −228.4771 | 119.7207 | | |

TABLE 1B

Example 1

| Sn | R | D | Nd | νd |
|---|---|---|---|---|
| 25 | 288.9569 | 12.6492 | 1.80400 | 46.53 |
| 26 | −119.4161 | 14.7003 | | |
| 27 | −58.8035 | 10.9739 | 1.59270 | 35.31 |
| 28 | 3605.1093 | 16.9993 | 1.72916 | 54.68 |
| 29 | −74.9311 | 81.9994 | | |
| 30 | −56.2134 | 1.8727 | 1.80610 | 40.93 |
| 31 | −93.9860 | DD[31] | | |
| 32 | 259.3940 | 3.8639 | 1.60311 | 60.64 |
| 33 | −139.8933 | DD[33] | | |
| 34 | −60.4527 | 1.0005 | 1.78880 | 28.43 |
| 35 | 83.6088 | 0.0832 | | |
| 36 | 87.1296 | 6.2753 | 1.53775 | 74.70 |
| 37 | −86.5927 | 0.2004 | | |
| 38 | 107.8251 | 6.7513 | 1.49700 | 81.61 |
| 39 | −81.0408 | DD[39] | | |
| 40 | 76.3953 | 5.8889 | 1.94595 | 17.98 |
| 41 | 435.5606 | 0.4088 | | |
| 42 | 240.0890 | 3.6796 | 1.59522 | 67.73 |
| 43 | ∞ | 21.0000 | | |
| 44 | ∞ | 42.8000 | 1.51633 | 64.14 |
| 45 | ∞ | 0.0267 | | |

TABLE 2

| Example 1 | | |
|---|---|---|
| | WIDE | TELE |
| Zr | 1.0 | 1.05 |
| \|f\| | 7.71 | 8.10 |
| FNo. | 1.88 | 1.90 |
| 2ω[°] | 135.0 | 133.0 |
| DD[31] | 8.01 | 0.96 |
| DD[33] | 6.28 | 11.34 |
| DD[39] | 39.32 | 41.31 |

TABLE 3

| Example 1 | | | | |
|---|---|---|---|---|
| Sn | 1 | 2 | 21 | 22 |
| KA | 1.8164077E−01 | 9.1248375E−01 | 1.0000000E+00 | 1.0000000E+00 |
| A3 | −3.2907002E−04 | −3.2102275E−05 | −1.1451863E−04 | −3.1275295E−05 |
| A4 | 1.3407467E−04 | 5.9360715E−05 | 3.2426511E−05 | 1.9657506E−05 |
| A5 | −5.2147692E−06 | 4.8391932E−07 | −1.0848038E−06 | 8.2883073E−07 |
| A6 | −6.8258706E−08 | −2.0332887E−07 | −1.9583333E−07 | −1.9073492E−07 |
| A7 | 9.5236293E−09 | 3.5355079E−09 | 2.4005054E−08 | 1.0107983E−08 |
| A8 | −1.3027670E−10 | 2.3284095E−10 | −6.8789495E−10 | 1.8116416E−10 |
| A9 | −7.0167724E−12 | −6.7791415E−12 | −3.7890773E−11 | −3.8400980E−11 |
| A10 | 2.2586853E−13 | −1.5302879E−13 | 2.1346002E−12 | 6.8197347E−13 |
| A11 | 1.3588532E−15 | 6.7060751E−15 | 5.3737594E−14 | 5.9697187E−14 |
| A12 | −1.4052287E−16 | 3.6470034E−17 | −4.5431537E−15 | −2.0547113E−15 |
| A13 | 9.7724142E−19 | −3.5171955E−18 | −1.9724367E−17 | −4.6123843E−17 |
| A14 | 4.0615983E−20 | 7.4699393E−21 | 4.8317227E−18 | 2.3892916E−18 |
| A15 | −6.3205135E−22 | 1.0531716E−21 | −1.1052839E−20 | 1.7338513E−20 |
| A16 | −4.2959072E−24 | −6.9989123E−24 | −2.9437283E−21 | −1.4348746E−21 |
| A17 | 1.3859018E−25 | −1.6300000E−25 | 1.2622318E−23 | −2.4522782E−24 |
| A18 | −2.8294093E−28 | 1.5380036E−27 | 9.4097066E−25 | 4.4322202E−25 |
| A19 | −1.0914185E−29 | 1.0515582E−29 | −2.5650597E−27 | −2.8680892E−29 |
| A20 | 6.7719646E−32 | −1.1955531E−31 | −1.3484953E−28 | −5.6168060E−29 |

TABLE 4

| Example 1 | | | |
|---|---|---|---|
| | Number of lenses | Sn | Form of moving |
| First adjustment group | 1<br>1 | 7-8<br>9-10 | moving individually |
| Second adjustment group | 2 | 40-43 | moving integrally |

Figure 3:
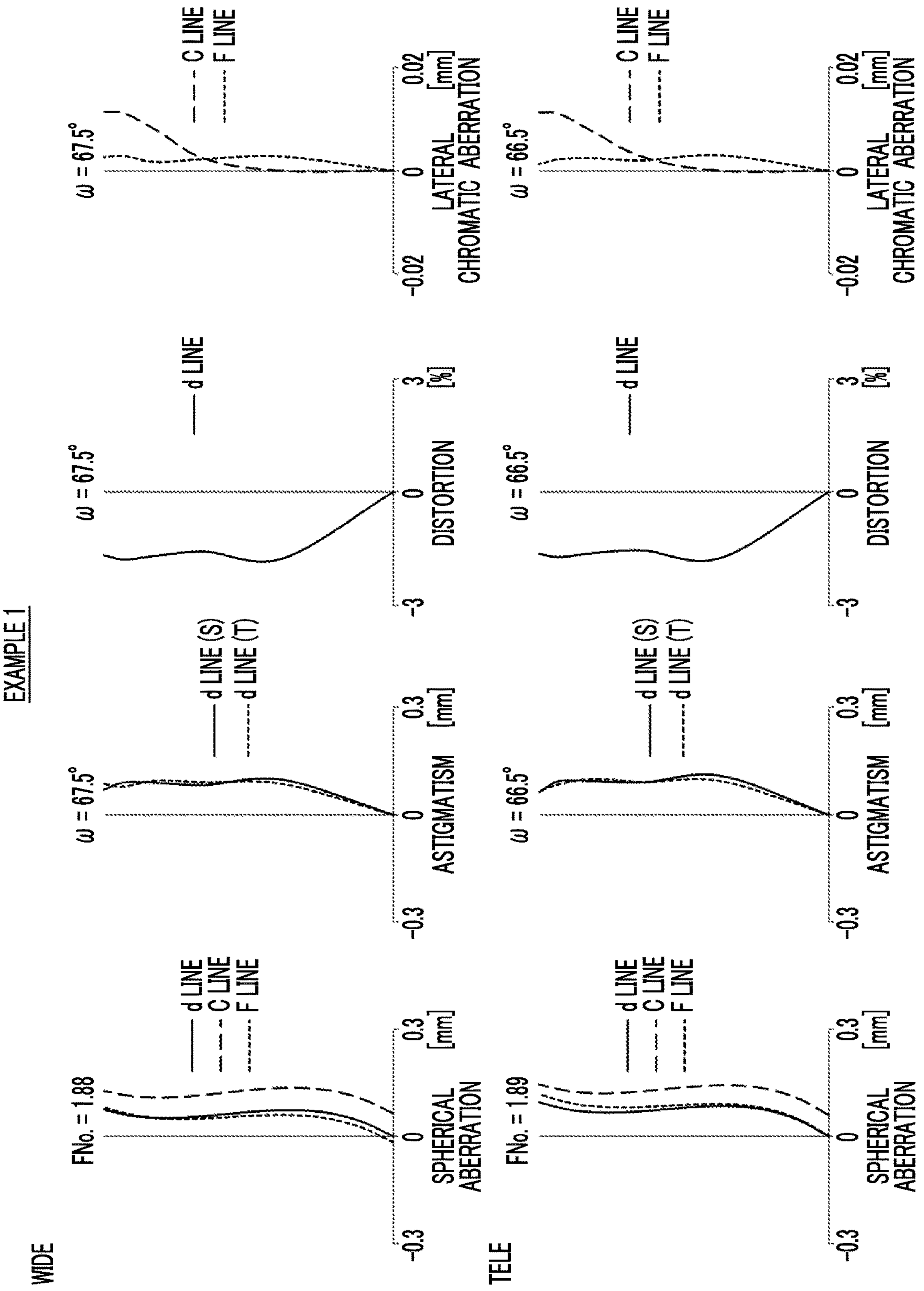
FIG. 3 is an aberration diagram of the image forming optical system according to Example 1.

FIG. 3 shows aberration diagrams of the image forming optical system of Example 1 in a state where the projection distance is 1.1 meters (m). In FIG. 3, the upper part labeled "WIDE" shows aberration diagrams at the wide angle end, and the lower part labeled "TELE" shows aberration diagrams at the telephoto end. FIG. 3 shows, in order from the left, spherical aberration, astigmatism, distortion, and lateral chromatic aberration. In the spherical aberration diagram, aberrations at the d line, C line, and F line are indicated by the solid line, the long broken line, and the short broken line, respectively. In the astigmatism diagram, the aberration at the d line in the sagittal direction is indicated by a solid line, and the aberration at the d line in the tangential direction is indicated by the short broken line. In the distortion diagram, aberration at the d line is indicated by the solid line. In the lateral chromatic aberration diagram, aberrations at the C line and the F line are indicated by the long broken line and the short broken line, respectively. In the spherical aberration diagram, the value of the F number is shown after "FNo.=". In other aberration diagrams, the value of the maximum half angle of view is shown after "ω=".

Figure 4:
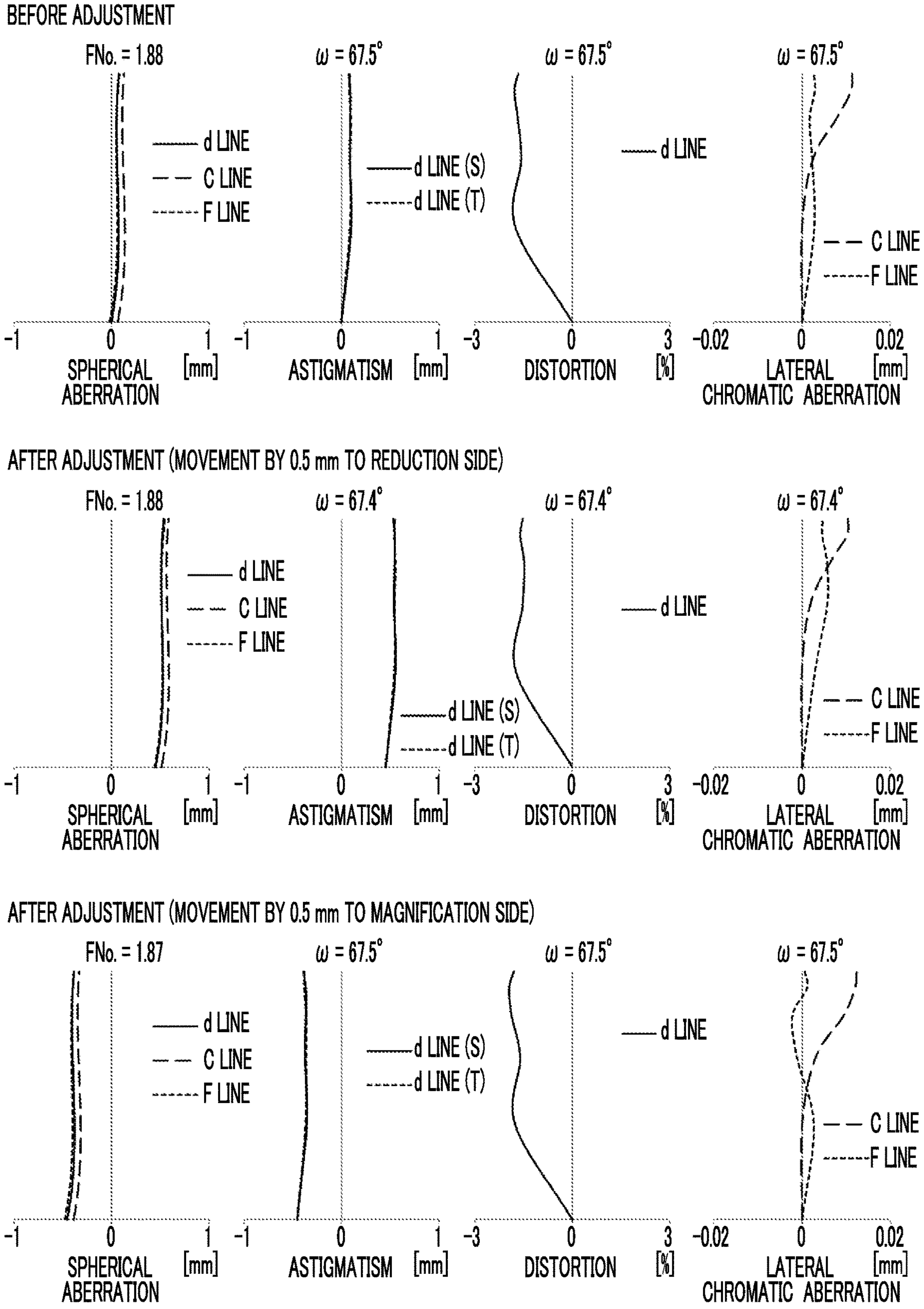
FIG. 4 is a diagram of aberrations before and after adjustment in a case where a second adjustment group of the image forming optical system of Example 1 is moved.

FIG. 4 shows diagrams of aberrations before and after the adjustment in an example in which the second adjustment group A2 is moved to perform the adjustment. The uppermost part of FIG. 4 labeled "Before Adjustment" shows aberration diagrams in the state before adjustment. Each aberration diagram of the "Before Adjustment" is shown by changing the scale of the horizontal axis of each aberration diagram at the wide angle end of FIG. 3. The second stage from the top labeled "After Adjustment (moved by 0.5 mm on the reduction side)" in FIG. 4 shows aberration diagrams in a state where the second adjustment group A2 is moved by 0.5 millimeters (mm) on the reduction side from the state before the adjustment. The third stage from the top labeled "After Adjustment (moved by 0.5 mm on the magnification side)" in FIG. 4 shows aberration diagrams in a state where the second adjustment group A2 is moved by 0.5 millimeters (mm) on the magnification side from the state before the adjustment. It should be noted that all the aberration diagrams in FIG. 4 are aberrations at a position on the same image plane.

Figure 5:
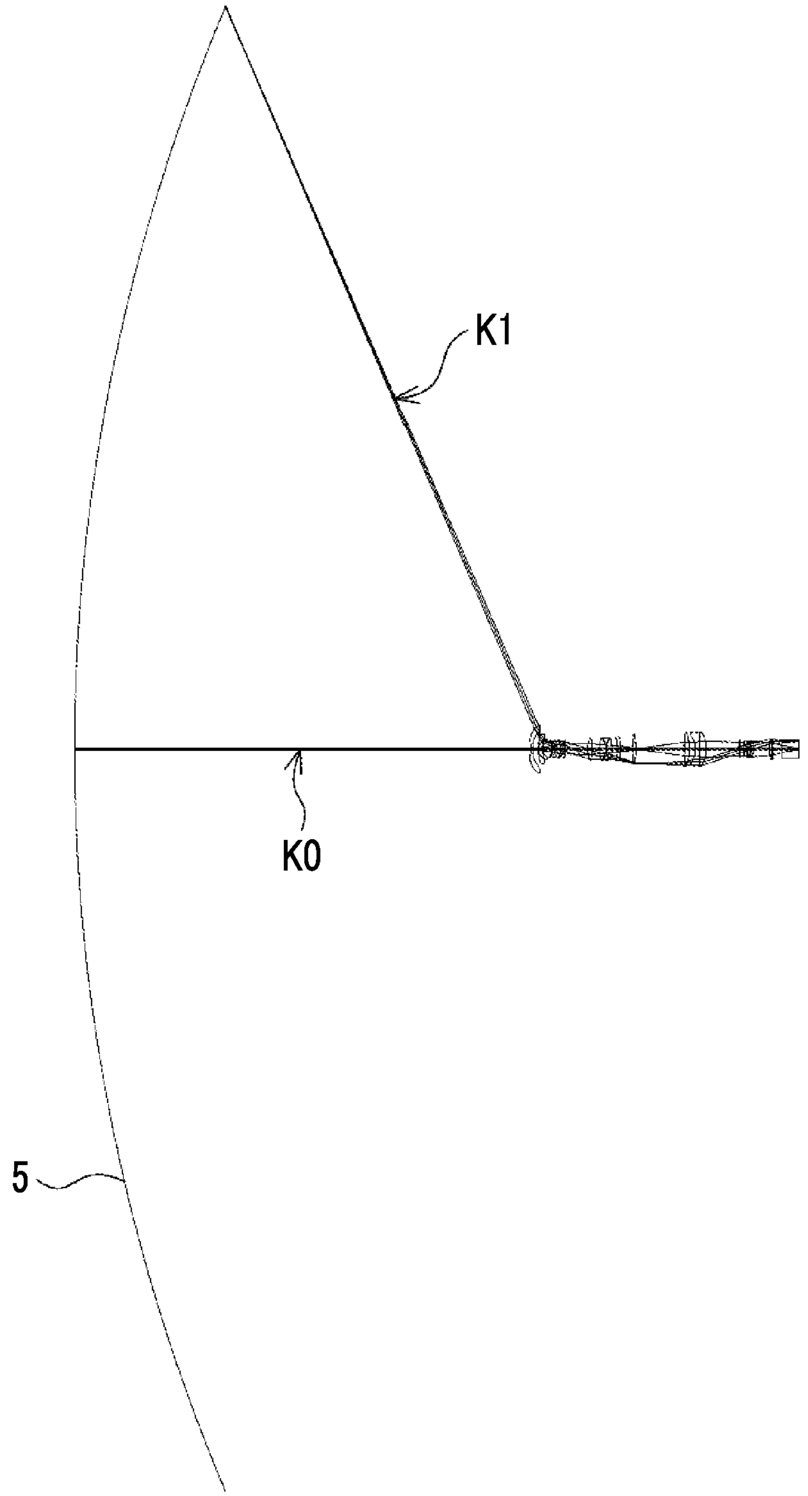
FIG. 5 is a diagram showing a state where projection is performed on a curved screen using the image forming optical system of Example 1.
Figure 6:
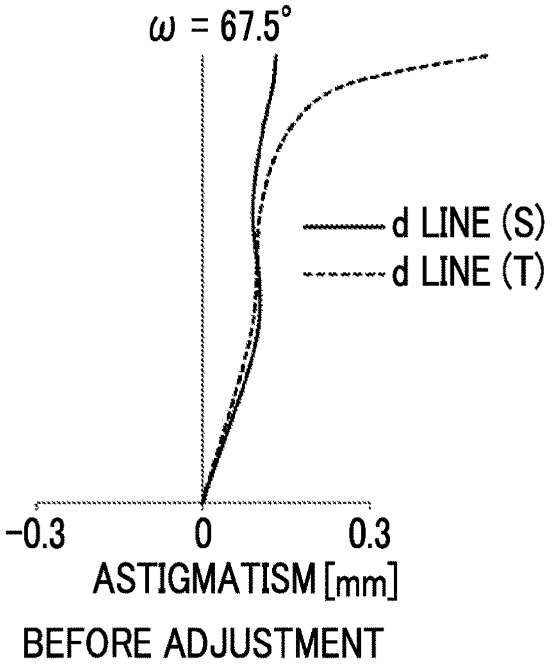
FIG. 6 is a diagram of astigmatism before and after adjustment in an example in which a first adjustment group is moved in the state shown in FIG. 5.

FIGS. 5 to 8 are diagrams according to an example in a case where the first adjustment group A1 is moved to perform the adjustment. FIG. 5 shows a state where projection is performed on a curved screen 5 convex toward the magnification side using the image forming optical system of Example 1. In FIG. 5, the screen 5 has a curvature radius of 5,000 millimeters (mm) and a projection distance of 1.1 meters (m). An astigmatism diagram before adjustment in a case of projection onto the screen 5 of FIG. 5 is shown on the left side of FIG. 6, and an astigmatism diagram after adjustment is performed by moving the first adjustment group A1 is shown on the right side of FIG. 6.

Figure 7:
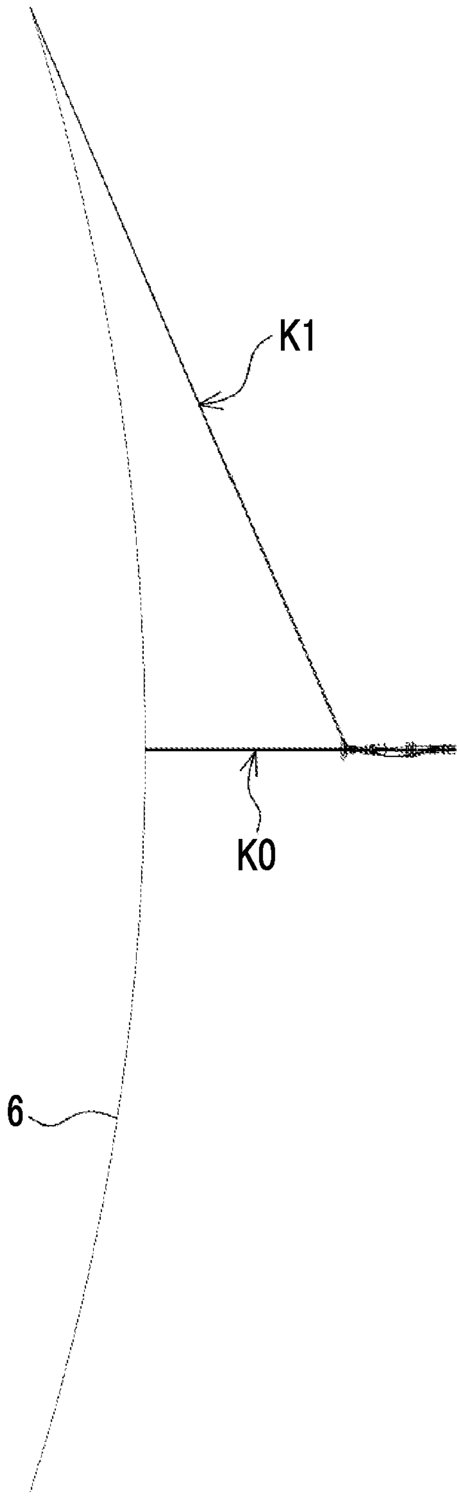
FIG. 7 is a diagram showing a state where projection is performed on another curved screen using the image forming optical system of Example 1.
Figure 8:
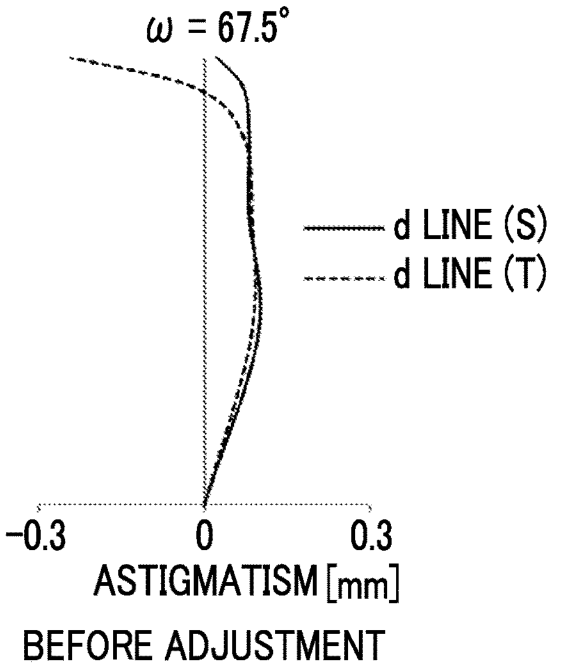
FIG. 8 is a diagram of astigmatism before and after adjustment in an example in which the first adjustment group is moved in the state shown in FIG. 7.

FIG. 7 shows a state where projection is performed on a curved screen 6 convex toward the reduction side using the image forming optical system of Example 1. In FIG. 7, the screen 6 has a curvature radius of −15,000 millimeters (mm) and a projection distance of 1.1 meters (m). An astigmatism diagram before adjustment in a case of projection onto the screen 6 of FIG. 7 is shown on the left side of FIG. 8, and an astigmatism diagram after adjustment is performed by moving the first adjustment group A1 is shown on the right side of FIG. 8.

Figure 9:
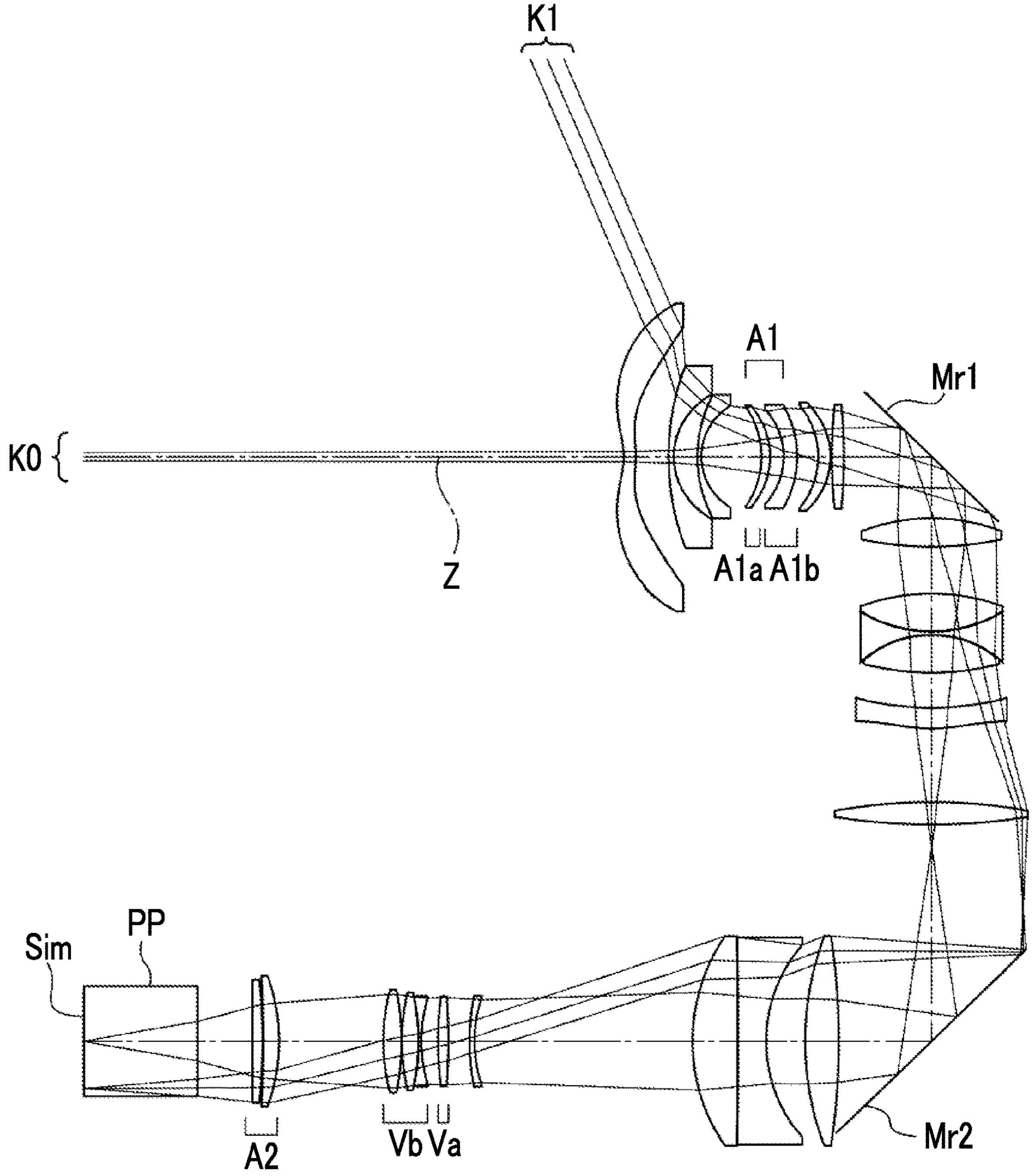
FIG. 9 is a cross-sectional view showing a configuration and luminous flux of an image forming optical system according to a modification example of Example 1.

FIG. 9 shows a configuration and luminous flux of the image forming optical system according to a modification example of Example 1 at the wide angle end. The image forming optical system of FIG. 9 is different from the image forming optical system of Example 1 in that two mirrors Mr1 and Mr2 are included therein and an optical path thereof is deflected by the mirror Mr1 and the mirror Mr2. Other configurations of the image forming optical system of FIG. 9 are the same as the configurations of the image forming optical system of Example 1. In FIG. 9, the arrow indicating the movement thereof is not shown. By deflecting the optical path, a compact configuration is possible.

Symbols, meanings, description methods, and illustration methods of the respective data pieces according to Example 1 and the modification example are basically similar to those in the following examples unless otherwise specified. Therefore, in the following description, repeated description will not be given.

EXAMPLE 2

Figure 10:
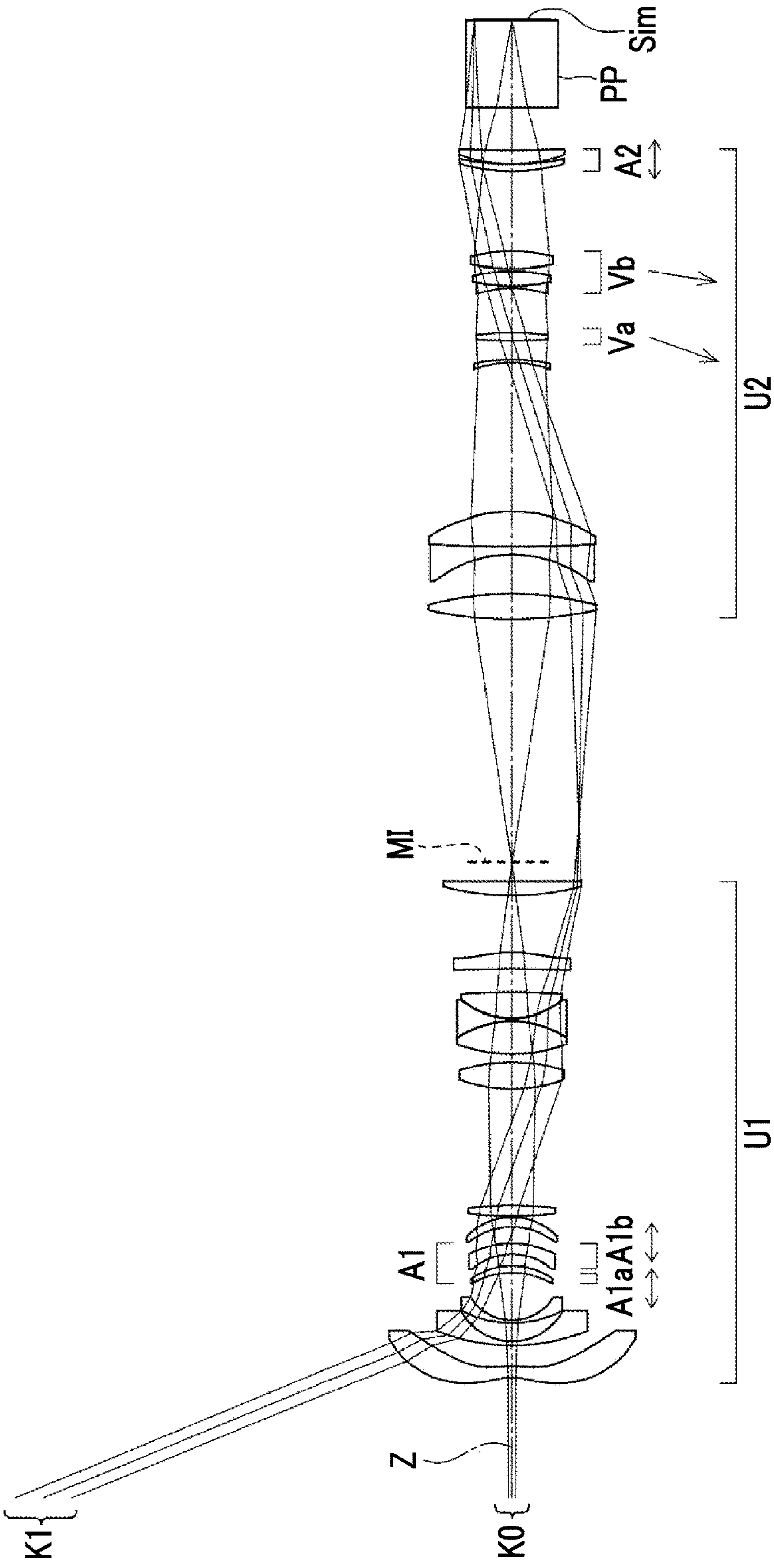
FIG. 10 is a cross-sectional view showing a configuration and luminous flux of an image forming optical system according to Example 2.

FIG. 10 shows a cross-sectional view of a configuration and luminous flux of the image forming optical system according to Example 2. The image forming optical system of Example 2 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two groups including the sub-group A1*a* and the sub-group A1*b*, which move along the optical axis Z by changing the mutual spacing during the adjustment. The sub-group A1*a* consists of one lens which is fourth from the magnification side. The sub-group A1*b* consists of one lens which is fifth from the magnification side. The second optical system U2 includes the second adjustment group A2 closest to the reduction side. The second adjustment group A2 consists of two lenses including a lens closest to the reduction side and a lens which is second from the reduction side. The two lenses of the second adjustment group A2 move integrally along the optical axis Z during the adjustment.

The image forming optical system of Example 2 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 11:
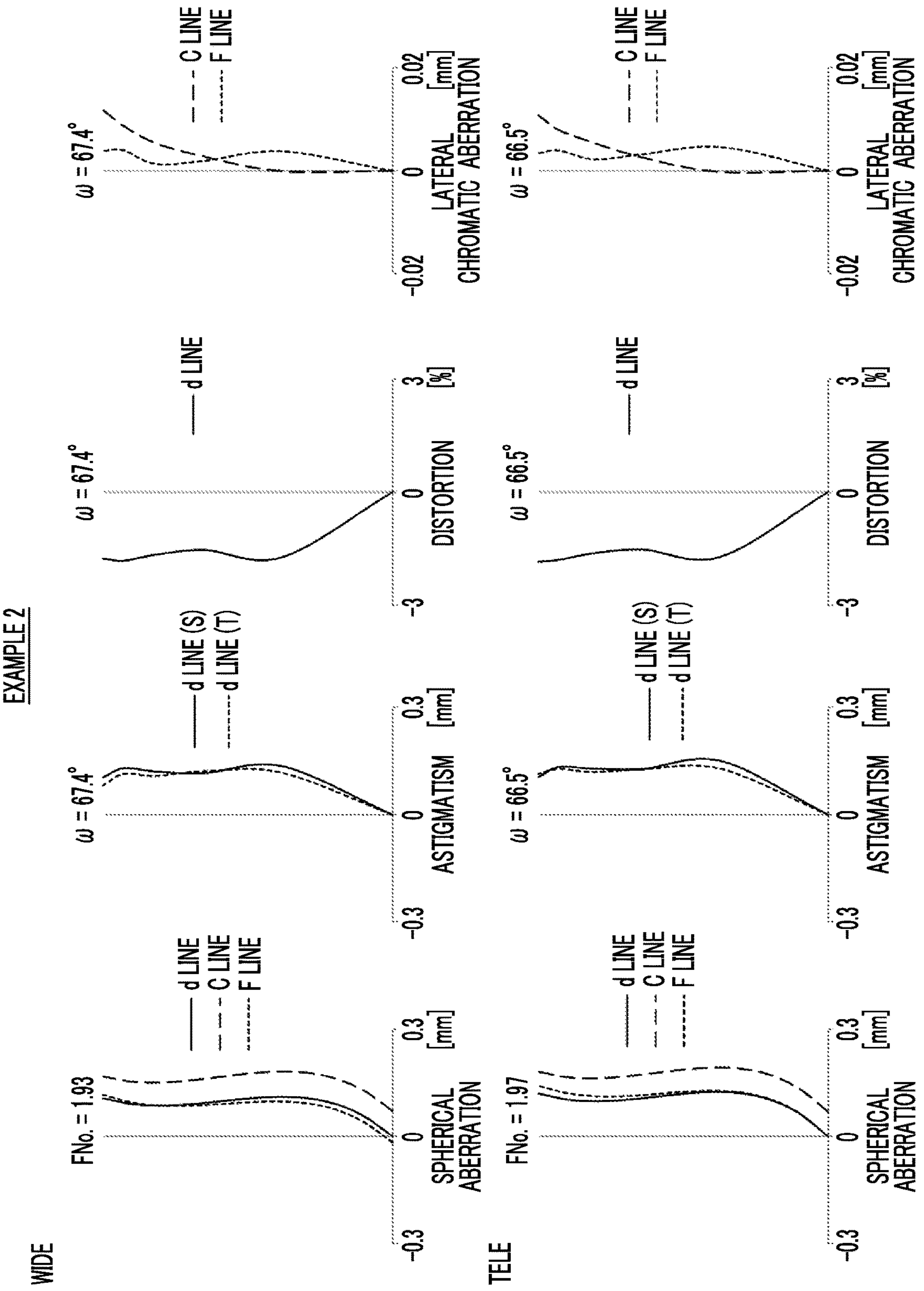
FIG. 11 is an aberration diagram of the image forming optical system according to Example 2.

Regarding the image forming optical system of Example 2, Tables 5A and 5B show basic lens data, Table 6 shows specifications and variable surface spacings, Table 7 shows aspherical coefficients, and Table 8 shows general pictures of the adjustment groups. Further, FIG. 11 shows aberration diagrams in a state where the projection distance is 1.1 meters (m).

TABLE 5A

| Example 2 | | | | |
|---|---|---|---|---|
| Sn | R | D | Nd | νd |
| *1 | −25.8860 | 5.5702 | 1.53097 | 55.61 |
| *2 | −56.9468 | 10.2053 | | |
| 3 | 98.3142 | 2.0000 | 1.91082 | 35.25 |

TABLE 5A-continued

| Example 2 | | | | |
|---|---|---|---|---|
| Sn | R | D | Nd | νd |
| 4 | 28.4466 | 8.9437 | | |
| 5 | 52.6482 | 1.4991 | 1.80400 | 46.53 |
| 6 | 24.1203 | 23.2346 | | |
| 7 | −38.5934 | 3.3560 | 1.78880 | 28.43 |
| 8 | −34.1964 | 5.4312 | | |
| 9 | −30.2654 | 5.3041 | 1.71299 | 53.87 |
| 10 | −44.7374 | 8.0582 | | |
| 11 | −33.4157 | 4.8131 | 1.62299 | 58.16 |
| 12 | −30.4033 | 0.5000 | | |
| 13 | 166.2165 | 5.0987 | 1.80809 | 22.76 |
| 14 | −186.2549 | 56.9998 | | |
| 15 | 74.5623 | 12.9644 | 1.49700 | 81.61 |
| 16 | −86.1979 | 4.1848 | | |
| 17 | 80.3340 | 16.0091 | 1.60311 | 60.64 |
| 18 | −47.8241 | 1.3991 | 1.84666 | 23.78 |
| 19 | 39.1822 | 12.6858 | 1.49700 | 81.61 |
| 20 | −285.7885 | 11.3737 | | |
| *21 | −301.8152 | 8.0000 | 1.51633 | 64.06 |
| *22 | −54.7402 | 27.8739 | | |
| 23 | 125.2689 | 6.9328 | 1.80518 | 25.46 |
| 24 | 3422.6022 | 128.3949 | | |

TABLE 5B

| Example 2 | | | | |
|---|---|---|---|---|
| Sn | R | D | Nd | νd |
| 25 | 182.7577 | 12.5658 | 1.80400 | 46.53 |
| 26 | −158.4222 | 19.3288 | | |
| 27 | −61.0117 | 3.7407 | 1.59270 | 35.31 |
| 28 | 705.2417 | 17.0009 | 1.72916 | 54.68 |
| 29 | −75.0445 | 72.7784 | | |
| 30 | −53.2280 | 1.4660 | 1.80610 | 40.93 |
| 31 | −89.8345 | DD[31] | | |
| 32 | 299.2987 | 3.8724 | 1.60311 | 60.64 |
| 33 | −158.0286 | DD[33] | | |
| 34 | −59.9047 | 0.9991 | 1.78880 | 28.43 |
| 35 | 83.2149 | 0.1909 | | |
| 36 | 90.2195 | 7.0935 | 1.59522 | 67.73 |
| 37 | −91.8303 | 1.3050 | | |
| 38 | 95.8432 | 8.4751 | 1.49700 | 81.61 |
| 39 | −83.0670 | DD[39] | | |
| 40 | 95.7179 | 3.2588 | 1.59282 | 68.62 |
| 41 | 117.6176 | 0.2008 | | |
| 42 | 74.2587 | 6.6980 | 1.94595 | 17.98 |
| 43 | 420.1185 | 21.0000 | | |
| 44 | ∞ | 42.8000 | 1.51633 | 64.14 |
| 45 | ∞ | 0.3946 | | |

TABLE 6

| Example 2 | | |
|---|---|---|
| | WIDE | TELE |
| Zr | 1.0 | 1.05 |
| \|f\| | 7.70 | 8.09 |
| FNo. | 1.93 | 1.90 |
| 2ω[°] | 134.8 | 133.0 |
| DD[31] | 9.27 | 1.38 |
| DD[33] | 21.76 | 27.84 |
| DD[39] | 39.29 | 41.09 |

TABLE 7

| Example 2 | | | | |
|---|---|---|---|---|
| Sn | 1 | 2 | 21 | 22 |
| KA | 1.7075211E−01 | 7.9756656E−01 | 1.0000000E+00 | 1.0000000E+00 |
| A3 | −3.8153987E−04 | −4.8825790E−05 | −1.1598454E−04 | 4.7565174E−06 |
| A4 | 1.3465999E−04 | 5.2896844E−05 | 3.2549669E−05 | 9.9010938E−06 |
| A5 | −5.0684148E−06 | 9.9287262E−07 | −1.9853532E−06 | 1.5021564E−06 |
| A6 | −7.0613710E−08 | −1.9935844E−07 | −9.2997676E−08 | −2.1633160E−07 |
| A7 | 9.3237631E−09 | 2.2986565E−09 | 2.0326143E−08 | 9.1538231E−09 |
| A8 | −1.2562037E−10 | 2.4802861E−10 | −9.0016017E−10 | 3.1044465E−10 |
| A9 | −6.8698776E−12 | −5.3778981E−12 | −1.4954023E−11 | −4.0121701E−11 |
| A10 | 2.2114380E−13 | −1.8435090E−13 | 1.9771394E−12 | 4.8242800E−13 |
| A11 | 1.3070004E−15 | 5.8854176E−15 | 2.7546304E−15 | 6.6238921E−14 |
| A12 | −1.3784709E−16 | 6.1704474E−17 | −3.1304255E−15 | −1.9426496E−15 |
| A13 | 9.7896493E−19 | −3.2560277E−18 | 2.9676991E−17 | −5.4087361E−17 |
| A14 | 3.9771896E−20 | −3.5000977E−21 | 2.6517736E−18 | 2.4191194E−18 |
| A15 | −6.2716629E−22 | 1.0137645E−21 | −3.4029971E−20 | 2.2055948E−20 |
| A16 | −4.1649483E−24 | −4.3432887E−24 | −1.3411314E−21 | −1.5014651E−21 |
| A17 | 1.3710921E−25 | −1.6140103E−25 | 1.6488168E−23 | −3.8076285E−24 |
| A18 | −2.8805427E−28 | 1.1963454E−27 | 3.5874312E−25 | 4.7317502E−25 |
| A19 | −1.0775755E−29 | 1.0678355E−29 | −2.5873086E−27 | 1.1999775E−28 |
| A20 | 6.7148903E−32 | −1.0165133E−31 | −4.7242037E−29 | −6.0816402E−29 |

TABLE 8

| Example 2 | | | |
|---|---|---|---|
| | Number of lenses | Sn | Form of moving |
| First adjustment group | 1 | 7-8 | moving individually |
| | 1 | 9-10 | |
| Second adjustment group | 2 | 40-43 | moving integrally |

Figure 12:
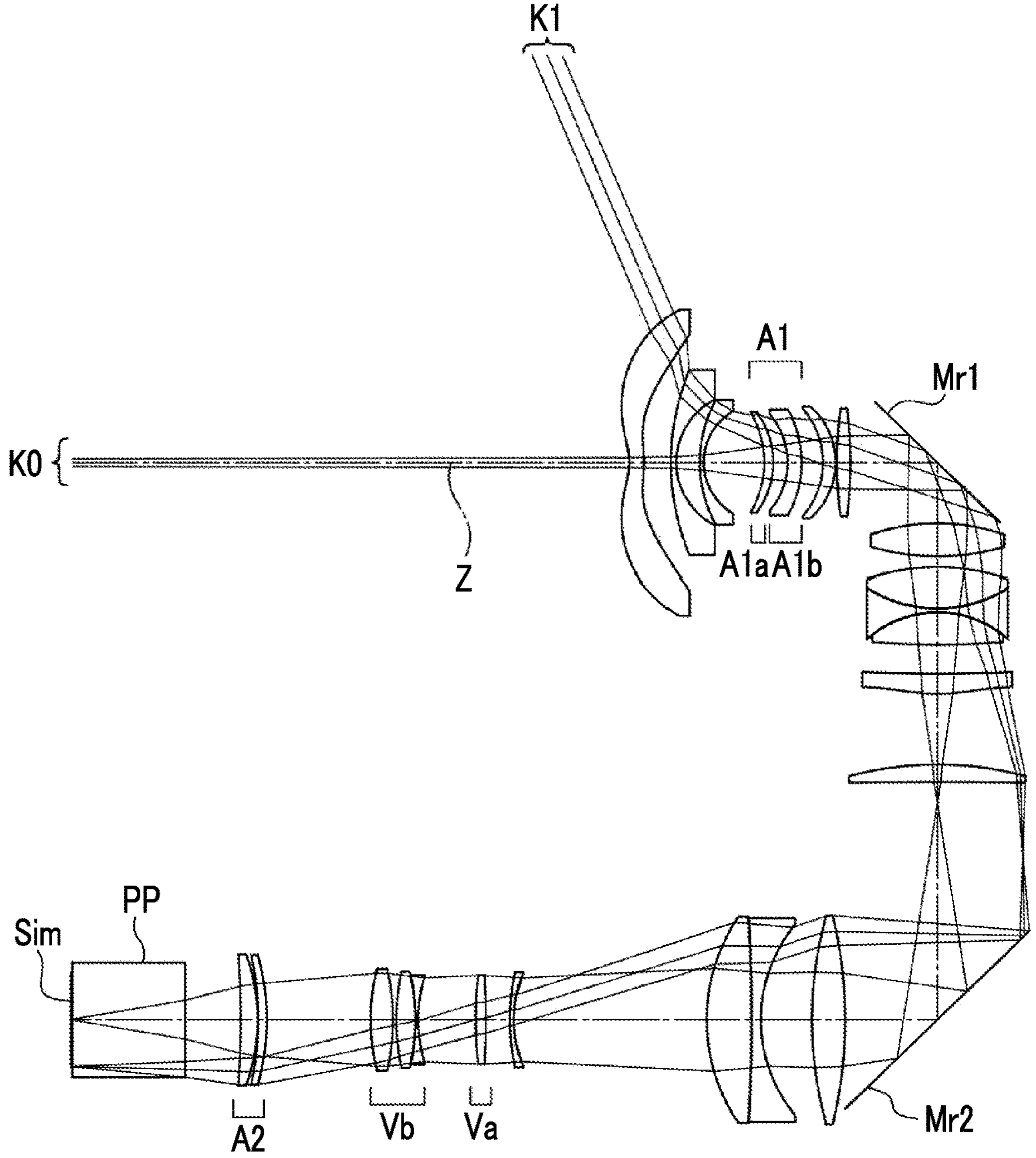
FIG. 12 is a cross-sectional view showing a configuration and luminous flux of an image forming optical system according to a modification example of Example 2.

FIG. 12 shows a configuration and luminous flux of the image forming optical system according to a modification example of Example 2 at the wide angle end. The image forming optical system of FIG. 12 is different from the image forming optical system of Example 2 in that two mirrors Mr1 and Mr2 are included therein and an optical path thereof is deflected by the mirror Mr1 and the mirror Mr2. Other configurations of the image forming optical system of FIG. 12 are the same as the configurations of the image forming optical system of Example 2. By deflecting the optical path, a compact configuration is possible.

EXAMPLE 3

Figure 13:
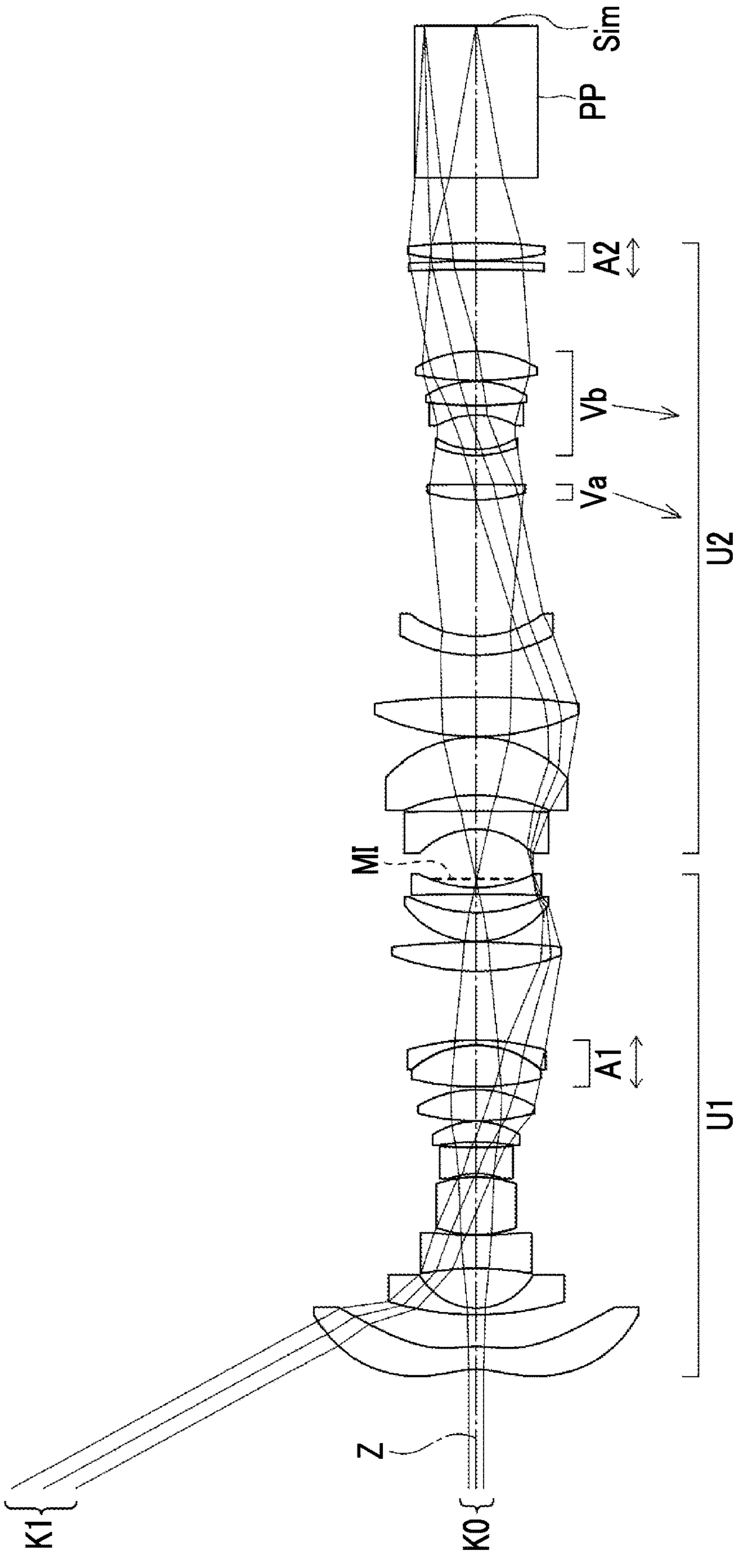
FIG. 13 is a cross-sectional view showing a configuration and luminous flux of an image forming optical system according to Example 3.

FIG. 13 shows a cross-sectional view of a configuration and luminous flux of the image forming optical system according to Example 3. The image forming optical system of Example 3 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two lenses including an eighth lens and a ninth lens from the magnification side. The two lenses of the first adjustment group A1 move integrally along the optical axis Z during the adjustment. The second optical system U2 includes the second adjustment group A2 closest to the reduction side. The second adjustment group A2 consists of two lenses including a lens closest to the reduction side and a lens which is second from the reduction side. The two lenses of the second adjustment group A2 move integrally along the optical axis Z during the adjustment.

The image forming optical system of Example 3 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 14:
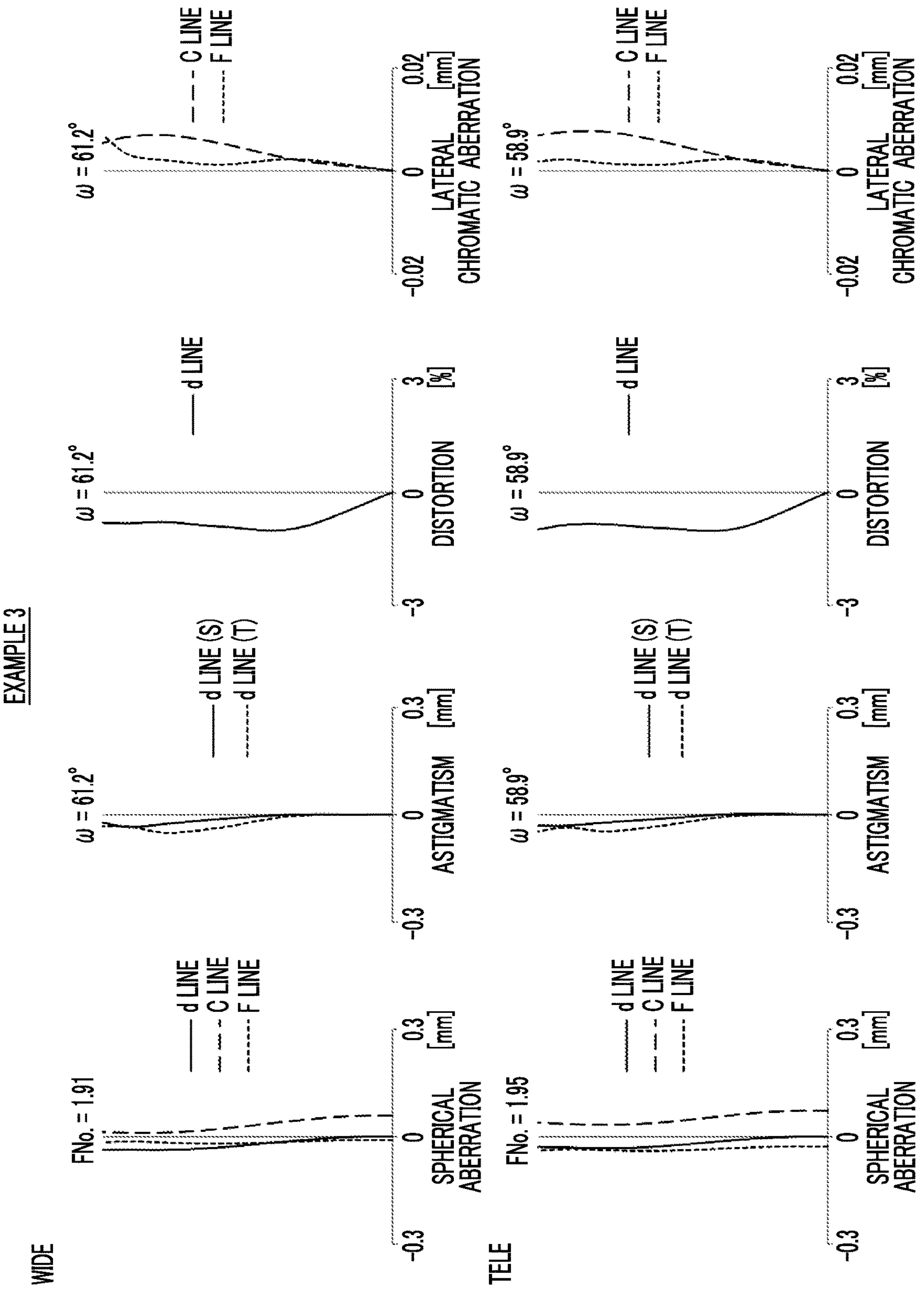
FIG. 14 is an aberration diagram of the image forming optical system according to Example 3.

Regarding the image forming optical system of Example 3, Tables 9A and 9B show basic lens data, Table 10 shows specifications and variable surface spacings, Table 11 shows aspherical coefficients, and Table 12 shows general pictures of the adjustment groups. Further, FIG. 14 shows aberration diagrams in a state where the projection distance is 1.5 meters (m).

TABLE 9A

| Example 3 | | | | |
|---|---|---|---|---|
| Sn | R | D | Nd | νd |
| *1 | −22.6306 | 5.9995 | 1.53158 | 55.08 |
| *2 | −46.7138 | 8.3043 | | |
| 3 | 77.1557 | 1.7008 | 1.71299 | 53.87 |
| 4 | 16.8898 | 10.3393 | | |
| 5 | −82.9618 | 8.5322 | 1.62299 | 58.16 |
| 6 | 93.5141 | 0.2001 | | |
| 7 | 31.1489 | 15.0001 | 1.65412 | 39.68 |
| 8 | −31.4714 | 0.9177 | | |
| 9 | −18.1243 | 6.6216 | 1.84666 | 23.78 |
| 10 | 150.0930 | 1.3671 | | |
| 11 | −57.3936 | 5.3613 | 1.58913 | 61.13 |
| 12 | −20.3653 | 0.1994 | | |
| 13 | 58.8919 | 8.1242 | 1.49700 | 81.61 |
| 14 | −29.2060 | 0.7957 | | |
| 15 | 72.9576 | 10.8371 | 1.43875 | 94.66 |
| 16 | −25.3052 | 1.3501 | 1.84666 | 23.78 |
| 17 | −63.2838 | 17.8309 | | |
| 18 | 60.1968 | 7.5705 | 1.84666 | 23.78 |
| 19 | −187.5696 | 0.2000 | | |
| 20 | 23.1521 | 7.5293 | 1.83400 | 37.21 |
| 21 | 38.5342 | 4.7964 | | |
| 22 | −525.6254 | 1.6994 | 1.84666 | 23.78 |
| 23 | 33.0512 | 15.2132 | | |

TABLE 9B

| Example 3 | | | | |
|---|---|---|---|---|
| Sn | R | D | Nd | νd |
| 24 | −20.6732 | 4.7443 | 1.58913 | 61.13 |
| 25 | −1085.7781 | 4.2028 | | |
| 26 | −47.1940 | 14.9991 | 1.84666 | 23.78 |
| 27 | −31.8171 | 0.1996 | | |
| 28 | 63.0329 | 10.2720 | 1.83481 | 42.72 |
| 29 | −204.2807 | 10.8859 | | |
| 30 | 40.2281 | 4.9994 | 1.84666 | 23.78 |
| 31 | 28.5239 | DD[31] | | |
| 32 | 43.2056 | 4.0135 | 1.80000 | 29.84 |
| 33 | −13328.4120 | DD[33] | | |
| 34 | 28.0868 | 1.5010 | 1.84666 | 23.78 |
| 35 | 19.6792 | 8.9543 | | |
| 36 | −20.8211 | 2.4642 | 1.84666 | 23.18 |
| 37 | 88.5678 | 0.1683 | | |
| 38 | 107.2229 | 5.9980 | 1.49700 | 81.61 |
| 39 | −25.3790 | 0.2001 | | |
| 40 | 85.4617 | 7.7044 | 1.49700 | 81.61 |
| 41 | −30.8769 | DD[41] | | |
| 42 | −368.9721 | 2.0214 | 1.89286 | 20.36 |
| 43 | −281.4992 | 0.2000 | | |
| 44 | 94.4011 | 4.6018 | 1.89286 | 20.36 |
| 45 | −161.4345 | 16.9950 | | |
| 46 | ∞ | 39.6050 | 1.51680 | 64.20 |
| 47 | ∞ | 0.1980 | | |

TABLE 10

| Example 3 | | |
|---|---|---|
| | WIDE | TELE |
| Zr | 1.0 | 1.1 |
| \|f\| | 7.41 | 8.16 |
| FNo. | 1.91 | 1.95 |
| 2ω[°] | 122.4 | 117.8 |
| DD[31] | 35.45 | 28.79 |
| DD[33] | 7.66 | 9.85 |
| DD[41] | 21.27 | 25.73 |

TABLE 11

| Example 3 | | |
|---|---|---|
| Sn | 1 | 2 |
| KA | 1.1308554E−01 | 1.3937797E+00 |
| A3 | −6.5894103E−04 | −4.2818965E−04 |
| A4 | 3.1034568E−04 | 2.1842204E−04 |
| A5 | −1.9110306E−05 | −8.0257520E−06 |
| A6 | 2.0244148E−08 | −5.7183488E−07 |
| A7 | 4.9481902E−08 | 5.0131390E−08 |
| A8 | −1.7498557E−09 | −3.4559098E−10 |
| A9 | −3.8919400E−11 | −8.5455255E−11 |
| A10 | 3.5467125E−12 | 2.4193437E−12 |
| A11 | −2.5590642E−14 | 6.4276902E−14 |
| A12 | −3.0689086E−15 | −3.6316930E−15 |
| A13 | 6.5810233E−17 | −3.3108809E−19 |
| A14 | 1.1710144E−18 | 2.4430492E−18 |
| A15 | −4.6869570E−20 | −2.7216684E−20 |
| A16 | −4.6096753E−23 | −7.5243744E−22 |
| A17 | 1.5156573E−23 | 1.5645048E−23 |
| A18 | −9.4430860E−26 | 4.1267533E−26 |
| A19 | −1.9058195E−27 | −2.7688587E−27 |
| A20 | 1.9666672E−29 | 1.6465010E−29 |

TABLE 12

| Example 3 | | | |
|---|---|---|---|
| | Number of lenses | Sn | Form of moving |
| First adjustment group | 2 | 15-17 | moving integrally |
| Second adjustment group | 2 | 42-45 | moving integrally |

EXAMPLE 4

Figure 15:
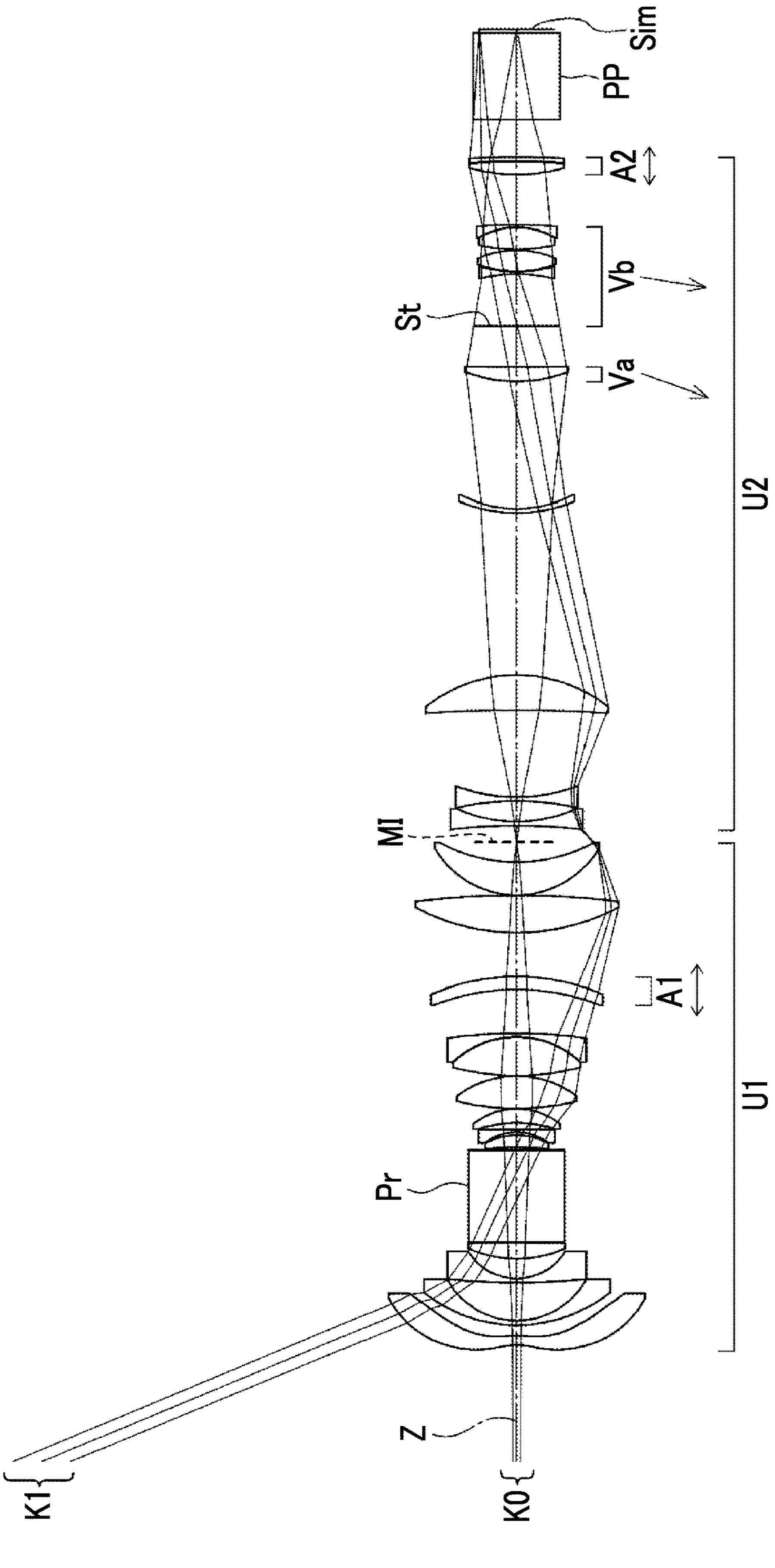
FIG. 15 is a cross-sectional view showing a configuration and luminous flux of an image forming optical system according to Example 4.

FIG. 15 shows a cross-sectional view of a configuration and luminous flux of the image forming optical system according to Example 4. The image forming optical system of Example 4 consists of, in order from the magnification side to the reduction side, the first optical system U1 and the second optical system U2 with the intermediate image MI formed in the image forming optical system and interposed between the first optical system U1 and the second optical system U2. The first optical system U1 includes a prism Pr and a plurality of lenses. The first adjustment group A1 consists of one lens which is eleventh from the magnification side in the first optical system U1. The second optical system U2 includes the second adjustment group A2 closest to the reduction side. The second adjustment group A2 consists of two lenses including a lens closest to the reduction side and a lens which is second from the reduction side. The two lenses of the second adjustment group A2 move integrally along the optical axis Z during the adjustment.

The image forming optical system of Example 4 is a variable magnification optical system. During magnification change, the lens group Va and the lens group Vb in the second optical system U2 move along the optical axis Z by changing the spacing between the adjacent groups, and the other lenses and the prism Pr remain stationary with respect to the image display surface Sim. The lens group Vb includes an aperture stop St.

Figure 16:
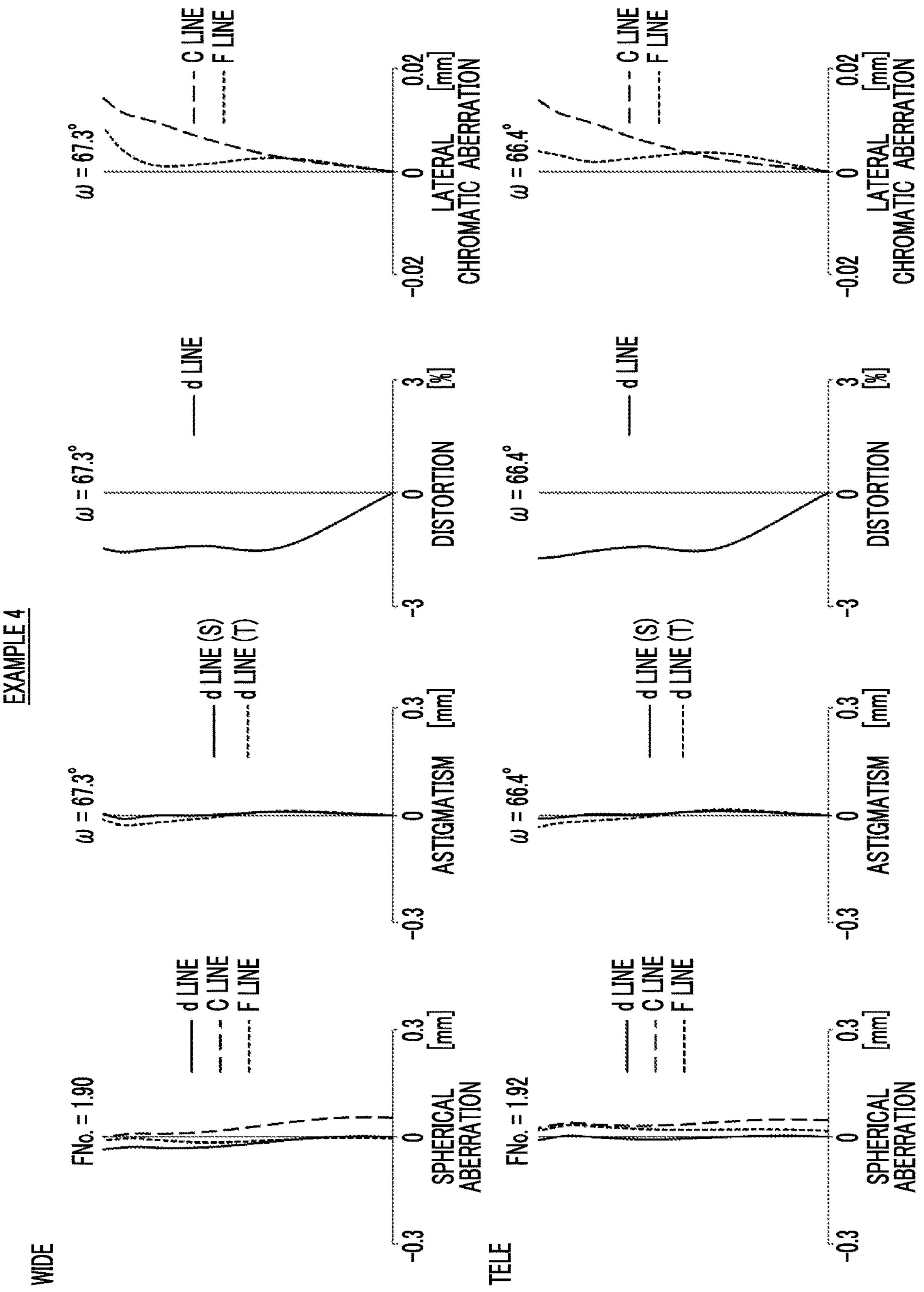
FIG. 16 is an aberration diagram of the image forming optical system according to Example 4.

Regarding the image forming optical system of Example 4, Tables 13A and 13B show basic lens data, Table 14 shows specifications and variable surface spacings, Table 15 shows aspherical coefficients, and Table 16 shows general pictures of the adjustment groups. Further, FIG. 16 shows aberration diagrams in a state where the projection distance is 1.1 meters (m). In the table of basic lens data, the surface number and the term (St) are noted in the column of the surface number of the surface corresponding to the aperture stop St, and this notation is the same in subsequent examples including the aperture stop St.

TABLE 13A

| Example 4 | | | | |
|---|---|---|---|---|
| Sn | R | D | Nd | νd |
| *1 | −28.7270 | 4.5001 | 1.53158 | 55.08 |
| *2 | −61.3137 | 5.2965 | | |
| 3 | 72.5464 | 2.3000 | 1.80400 | 46.58 |
| 4 | 38.9813 | 18.8120 | | |
| 5 | 346.1093 | 2.0000 | 1.62299 | 58.16 |
| 6 | 28.3268 | 9.7795 | | |
| 7 | 59.6037 | 7.9165 | 1.64769 | 33.79 |
| 8 | −1089.8807 | 0.2623 | | |
| 9 | ∞ | 45.0000 | 1.51680 | 64.20 |
| 10 | ∞ | 1.2784 | | |
| 11 | −111.3032 | 5.9528 | 1.80400 | 46.58 |
| 12 | −31.2300 | 1.4339 | | |

TABLE 13A-continued

| Example 4 | | | | |
|---|---|---|---|---|
| Sn | R | D | Nd | νd |
| 13 | −26.0136 | 1.2993 | 1.80518 | 25.46 |
| 14 | −1576.6766 | 3.2501 | | |
| 15 | −62.1675 | 6.9132 | 1.80400 | 46.58 |
| 16 | −34.4928 | 0.1998 | | |
| 17 | 124.2991 | 16.0540 | 1.49700 | 81.61 |
| 18 | −48.8832 | 0.1999 | | |
| 19 | 123.3876 | 19.1242 | 1.43875 | 94.66 |
| 20 | −45.8118 | 1.7995 | 1.84666 | 23.78 |
| 21 | −247.3354 | 21.6093 | | |
| 22 | −110.7940 | 6.2770 | 1.83481 | 42.72 |
| 23 | −105.3600 | 21.6093 | | |
| 24 | 106.3426 | 18.3782 | 1.84666 | 23.78 |
| 25 | −415.6548 | 0.2007 | | |
| 26 | 46.8211 | 16.2501 | 1.80518 | 25.46 |
| 27 | 79.3591 | 18.0734 | | |

TABLE 13B

| Example 4 | | | | |
|---|---|---|---|---|
| Sn | R | D | Nd | νd |
| 28 | −256.0957 | 2.0007 | 1.80518 | 25.46 |
| 29 | 73.1968 | 10.1500 | | |
| 30 | −128.9990 | 2.0002 | 1.80518 | 25.46 |
| 31 | 86.8944 | 42.5648 | | |
| 32 | −655.3142 | 17.4163 | 1.80400 | 46.58 |
| 33 | −71.7411 | 80.0000 | | |
| 34 | 74.0596 | 2.0002 | 1.80518 | 25.46 |
| 35 | 58.0933 | DD[35] | | |
| 36 | 72.3811 | 7.1191 | 1.80518 | 25.46 |
| 37 | 1400.0588 | DD[37] | | |
| 38(St) | ∞ | 25.6642 | | |
| 39 | −74.6995 | 1.2001 | 1.84666 | 23.78 |
| 40 | 65.6340 | 0.2002 | | |
| 41 | 55.6856 | 10.1996 | 1.49700 | 81.61 |
| 42 | −45.8592 | 0.3919 | | |
| 43 | 88.9910 | 10.8451 | 1.49700 | 81.61 |
| 44 | −36.3480 | 0.1043 | | |
| 45 | −35.9733 | 1.2007 | 1.80610 | 33.27 |
| 46 | −247.6582 | DD[46] | | |
| 47 | 86.9919 | 6.6118 | 1.85896 | 22.73 |
| 48 | −264.4813 | 2.0102 | 1.48749 | 70.24 |
| 49 | −368.5542 | 18.5000 | | |
| 50 | ∞ | 42.8000 | 1.51680 | 64.20 |
| 51 | ∞ | 1.8618 | | |

TABLE 14

| Example 4 | | |
|---|---|---|
| | WIDE | TELE |
| Zr | 1.0 | 1.0 |
| \|f\| | 7.72 | 8.11 |
| FNo. | 1.90 | 1.92 |
| 2ω[°] | 134.6 | 132.8 |
| DD[35] | 62.46 | 57.19 |
| DD[37] | 20.16 | 21.81 |
| DD[46] | 24.81 | 28.43 |

TABLE 15

| Example 4 | | |
|---|---|---|
| Sn | 1 | 2 |
| KA | 1.3090891E−01 | 1.0181055E+00 |
| A3 | −2.3589987E−04 | −8.0796828E−06 |

TABLE 15-continued

| Example 4 | | |
|---|---|---|
| Sn | 1 | 2 |
| A4 | 1.1794733E−04 | 5.5721266E−05 |
| A5 | −4.9195506E−06 | 4.3109574E−07 |
| A6 | −1.5115651E−08 | −1.7831145E−07 |
| A7 | 6.1514068E−09 | 2.3886036E−09 |
| A8 | −1.1239681E−10 | 2.2242245E−10 |
| A9 | −2.7786619E−12 | −4.9747901E−12 |
| A10 | 1.1193369E−13 | −1.6742102E−13 |
| A11 | −8.7456021E−18 | 5.3018699E−15 |
| A12 | −4.6755755E−17 | 6.0999690E−17 |
| A13 | 4.4960396E−19 | −3.0309322E−18 |
| A14 | 9.2128514E−21 | −5.4373798E−21 |
| A15 | −1.6684446E−22 | 9.8659369E−22 |
| A16 | −5.5849418E−25 | −3.7013062E−24 |
| A17 | 2.5777096E−26 | −1.6823534E−25 |
| A18 | −7.0987726E−29 | 1.1974984E−27 |
| A19 | −1.5127685E−30 | 1.1883262E−29 |
| A20 | 9.0313647E−33 | −1.1140664E−31 |

TABLE 16

| Example 4 | | | |
|---|---|---|---|
| | Number of lenses | Sn | Form of moving |
| First adjustment group | 1 | 22-23 | — |
| Second adjustment group | 2 | 47-49 | moving integrally |

EXAMPLE 5

Figure 17:
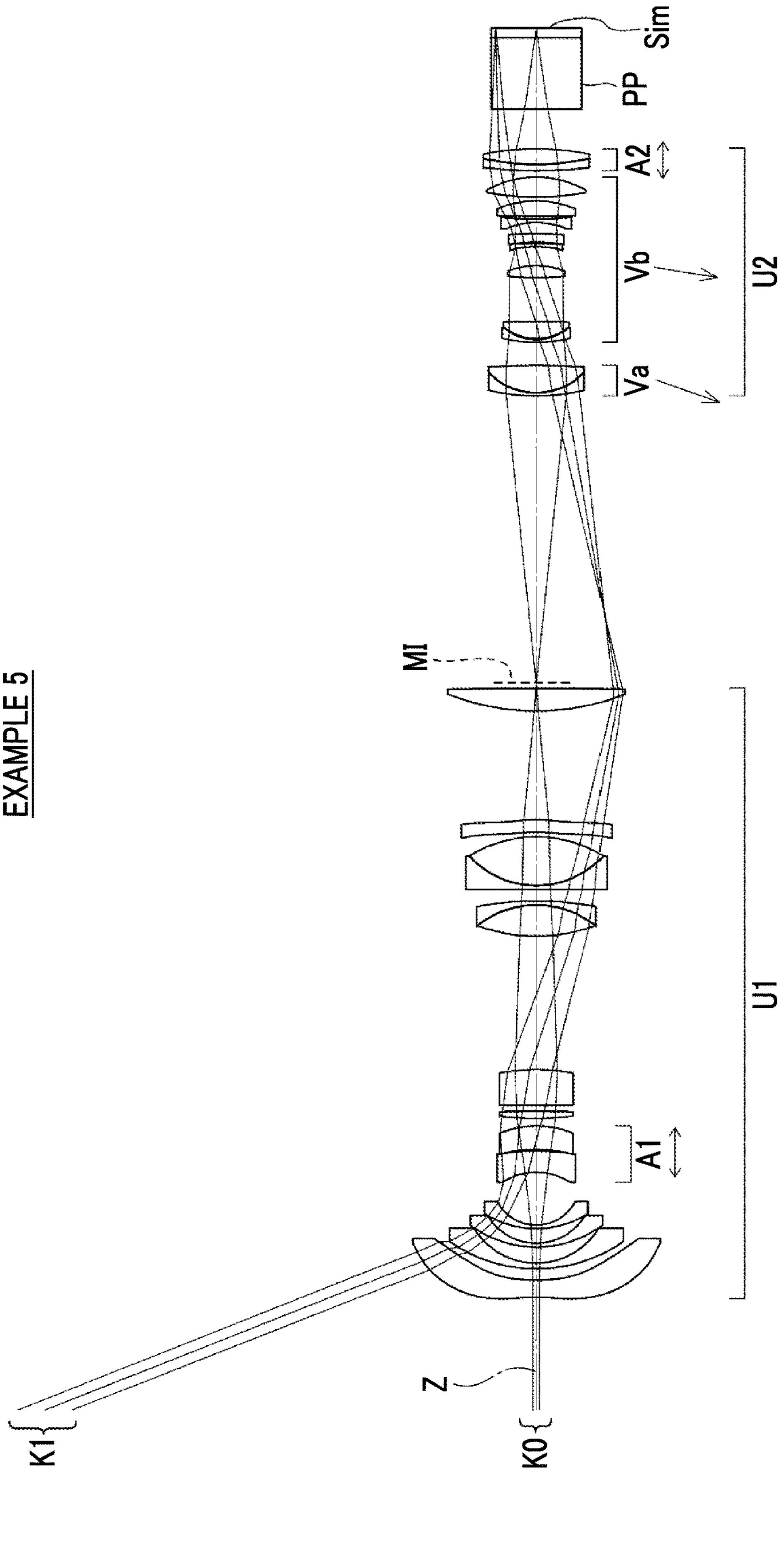
FIG. 17 is a cross-sectional view showing a configuration and luminous flux of an image forming optical system according to Example 5.

FIG. 17 shows a cross-sectional view of a configuration and luminous flux of the image forming optical system according to Example 5. The image forming optical system of Example 5 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two lenses including a fifth lens and a sixth lens from the magnification side. The two lenses of the first adjustment group A1 move integrally along the optical axis Z during the adjustment. The second optical system U2 includes the second adjustment group A2 closest to the reduction side. The second adjustment group A2 consists of two lenses including a lens closest to the reduction side and a lens which is second from the reduction side. The two lenses of the second adjustment group A2 move integrally along the optical axis Z during the adjustment.

The image forming optical system of Example 5 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 18:
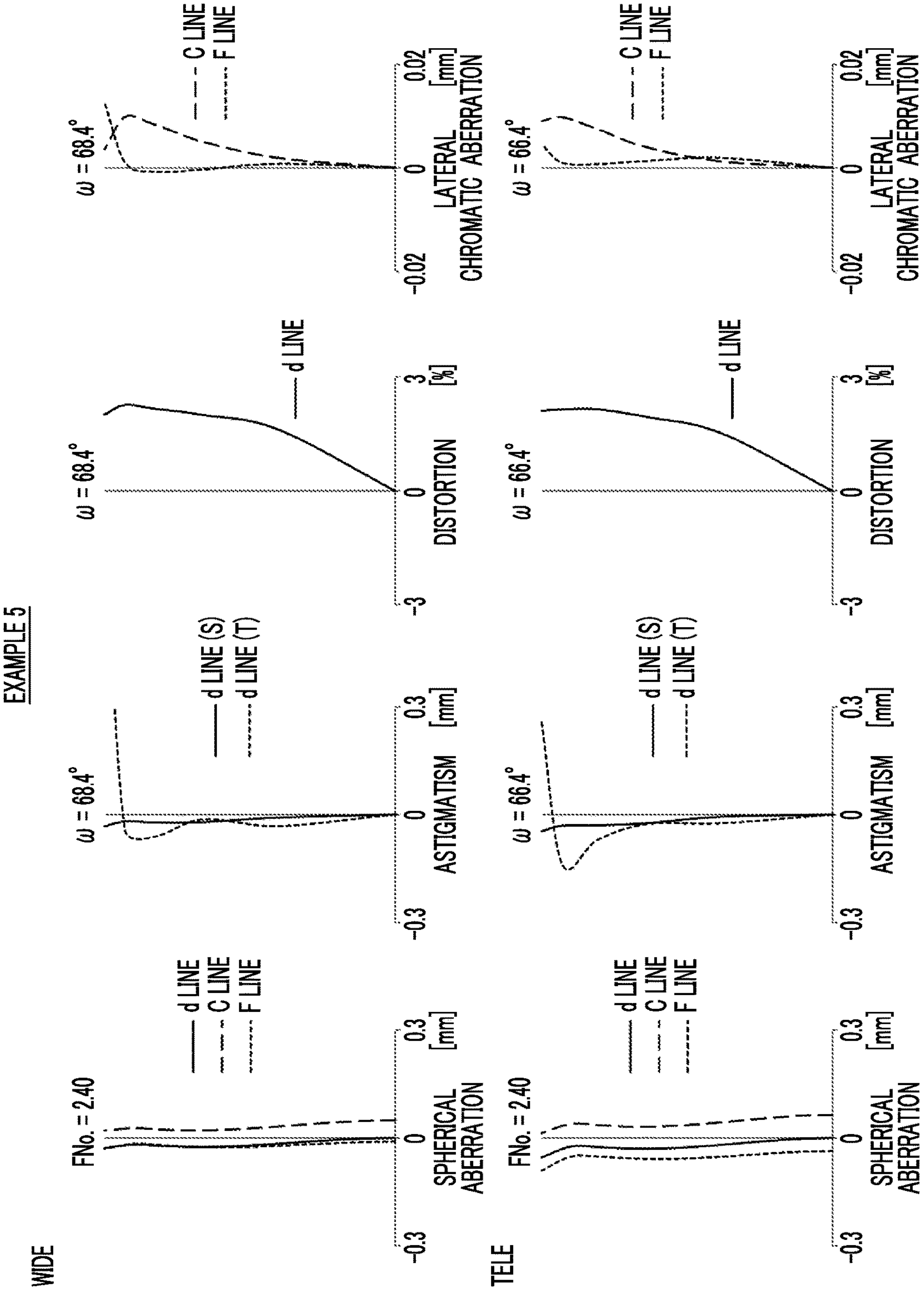
FIG. 18 is an aberration diagram of the image forming optical system according to Example 5.

Regarding the image forming optical system of Example 5, Tables 17A and 17B show basic lens data, Table 18 shows specifications and variable surface spacings, Table 19 shows aspherical coefficients, and Table 20 shows general pictures of the adjustment groups. Further, FIG. 18 shows aberration diagrams in a state where the projection distance is 0.8 meters (m).

TABLE 17A

| Example 5 | | | | |
|---|---|---|---|---|
| Sn | R | D | Nd | νd |
| *1 | −32.5278 | 5.6000 | 1.53158 | 55.08 |
| *2 | −403.8257 | 3.5954 | | |
| 3 | 48.4465 | 1.8000 | 1.77250 | 49.62 |
| 4 | 23.3214 | 5.1653 | | |
| 5 | 35.1492 | 1.2500 | 1.84666 | 23.78 |
| 6 | 18.1194 | 4.6972 | | |
| 7 | 31.1090 | 1.1000 | 1.77250 | 49.62 |
| 8 | 14.1635 | 16.7517 | | |
| 9 | −19.9180 | 6.8585 | 1.48749 | 70.44 |
| 10 | −72.3758 | 0.4322 | | |
| 11 | −48.4240 | 7.5285 | 1.51742 | 52.19 |
| 12 | −31.0219 | 2.4325 | | |
| 13 | 85.3382 | 2.2644 | 1.80518 | 25.46 |
| 14 | −385.6206 | 1.7376 | | |
| 15 | ∞ | 11.4429 | 1.77249 | 49.58 |
| 16 | −57.8548 | 42.5973 | | |
| 17 | 54.5292 | 10.0189 | 1.49700 | 81.61 |
| 18 | −29.8728 | 1.3000 | 1.84666 | 23.78 |
| 19 | −100.5343 | 3.6549 | | |
| 20 | ∞ | 1.2500 | 1.84666 | 23.78 |
| 21 | 28.8194 | 15.6261 | 1.59282 | 68.62 |
| 22 | −40.4906 | 1.4661 | | |
| *23 | −52.7538 | 4.0000 | 1.51633 | 64.06 |
| *24 | −40.4572 | 34.7477 | | |
| 25 | 76.3584 | 7.2295 | 1.92286 | 20.88 |
| 26 | −1280.4101 | DD[26] | | |

TABLE 17B

| Example 5 | | | | |
|---|---|---|---|---|
| Sn | R | D | Nd | νd |
| 27 | 66.0453 | 1.0100 | 1.89286 | 20.36 |
| 28 | 21.8691 | 8.4994 | 1.90110 | 27.06 |

TABLE 17B-continued

| Example 5 | | | | |
|---|---|---|---|---|
| Sn | R | D | Nd | νd |
| 29 | −212.6916 | DD[29] | | |
| 30 | 45.1876 | 0.9000 | 1.90366 | 31.31 |
| 31 | 15.9063 | 0.3300 | | |
| 32 | 16.4977 | 5.4233 | 1.51742 | 52.15 |
| 33 | −647.6009 | 14.1120 | | |
| 34 | 89.0841 | 3.7995 | 1.49700 | 81.54 |
| 35 | −24.9000 | 5.9439 | | |
| 36 | −33.2021 | 1.0009 | 1.74077 | 27.79 |
| 37 | −121.4231 | 0.5109 | | |
| 38 | −49.8686 | 2.7193 | 1.91082 | 35.25 |
| 39 | −91.5106 | 3.6109 | | |
| 40 | 22.8521 | 1.0000 | 1.91082 | 35.25 |
| 41 | 99.7481 | 0.9583 | | |
| 42 | 938.6417 | 4.8994 | 1.89286 | 20.36 |
| 43 | −32.2312 | 1.2883 | | |
| 44 | 89.5867 | 6.3552 | 1.49700 | 81.54 |
| 45 | −31.8785 | DD[45] | | |
| 46 | 138.6809 | 2.0208 | 1.59551 | 39.22 |
| 47 | 73.5993 | 5.0608 | 1.65160 | 58.40 |
| 48 | −83.6575 | 12.7200 | | |
| 49 | ∞ | 23.0000 | 1.51633 | 64.14 |
| 50 | ∞ | 3.0000 | 1.48749 | 70.44 |
| 51 | ∞ | 0.0192 | | |

TABLE 18

| Example 5 | | |
|---|---|---|
| | WIDE | TELE |
| Zr | 1.0 | 1.1 |
| \|f\| | 5.01 | 5.51 |
| FNo. | 2.40 | 2.40 |
| 2ω[°] | 136.8 | 132.8 |
| DD[26] | 93.65 | 87.62 |
| DD[29] | 7.36 | 9.23 |
| DD[45] | 2.00 | 6.15 |

TABLE 19

| Example 5 | | | | |
|---|---|---|---|---|
| Sn | 1 | 2 | 23 | 24 |
| KA | −7.6148269E−01 | −3.4882007E−02 | 1.0000000E+00 | 1.0000000E+00 |
| A3 | 8.6668561E−17 | 3.9705217E−16 | −1.3909136E−19 | 1.7150589E−19 |
| A4 | 1.0869314E−03 | 1.4153363E−03 | 7.2571693E−05 | 7.1963923E−05 |
| A5 | −3.3286070E−04 | −5.1412219E−04 | −4.8659103E−07 | 2.6761685E−06 |
| A6 | 5.1477438E−05 | 9.1183378E−05 | −4.7751309E−07 | −8.5421436E−07 |
| A7 | −4.5867198E−06 | −8.9528174E−06 | −1.4803374E−08 | −2.9328154E−09 |
| A8 | 2.2644783E−07 | 4.4072206E−07 | 7.5971993E−09 | 1.0663537E−08 |
| A9 | −3.6515232E−09 | −1.0583836E−09 | −6.3858096E−11 | −5.0532117E−10 |
| A10 | −2.3560070E−10 | −1.1019827E−09 | −6.7457080E−11 | −5.4477668E−11 |
| A11 | 1.5061986E−11 | 5.1126699E−11 | 2.5118702E−12 | 4.5296271E−12 |
| A12 | −2.2875967E−13 | −1.0899484E−14 | 2.7954678E−13 | 9.1346212E−14 |
| A13 | −8.1791330E−15 | −6.9585538E−14 | −1.6580902E−14 | −1.6291664E−14 |
| A14 | 3.8742477E−16 | 1.8760761E−15 | −5.0578383E−16 | 1.2409289E−16 |
| A15 | −3.2396815E−18 | 1.6846528E−17 | 4.8437125E−17 | 2.7419402E−17 |
| A16 | −1.3415660E−19 | −1.6200683E−18 | 1.1324846E−19 | −6.0461603E−19 |
| A17 | 3.5405412E−21 | 2.0396451E−20 | −6.7254478E−20 | −1.9033185E−20 |
| A18 | −1.2430999E−23 | 2.9828093E−22 | 7.7677596E−22 | 6.3773461E−22 |
| A19 | −6.1887456E−25 | −9.7923249E−24 | 3.6211694E−23 | 2.2406519E−24 |
| A20 | 9.2885598E−27 | 7.6444757E−26 | −7.1191152E−25 | −1.5294949E−25 |
| A21 | −4.1553851E−29 | −8.4257034E−29 | | |

TABLE 20

| Example 5 | | | |
|---|---|---|---|
| | Number of lenses | Sn | Form of moving |
| First adjustment group | 2 | 9-12 | moving integrally |
| Second adjustment group | 2 | 46-48 | moving integrally |

EXAMPLE 6

Figure 19:
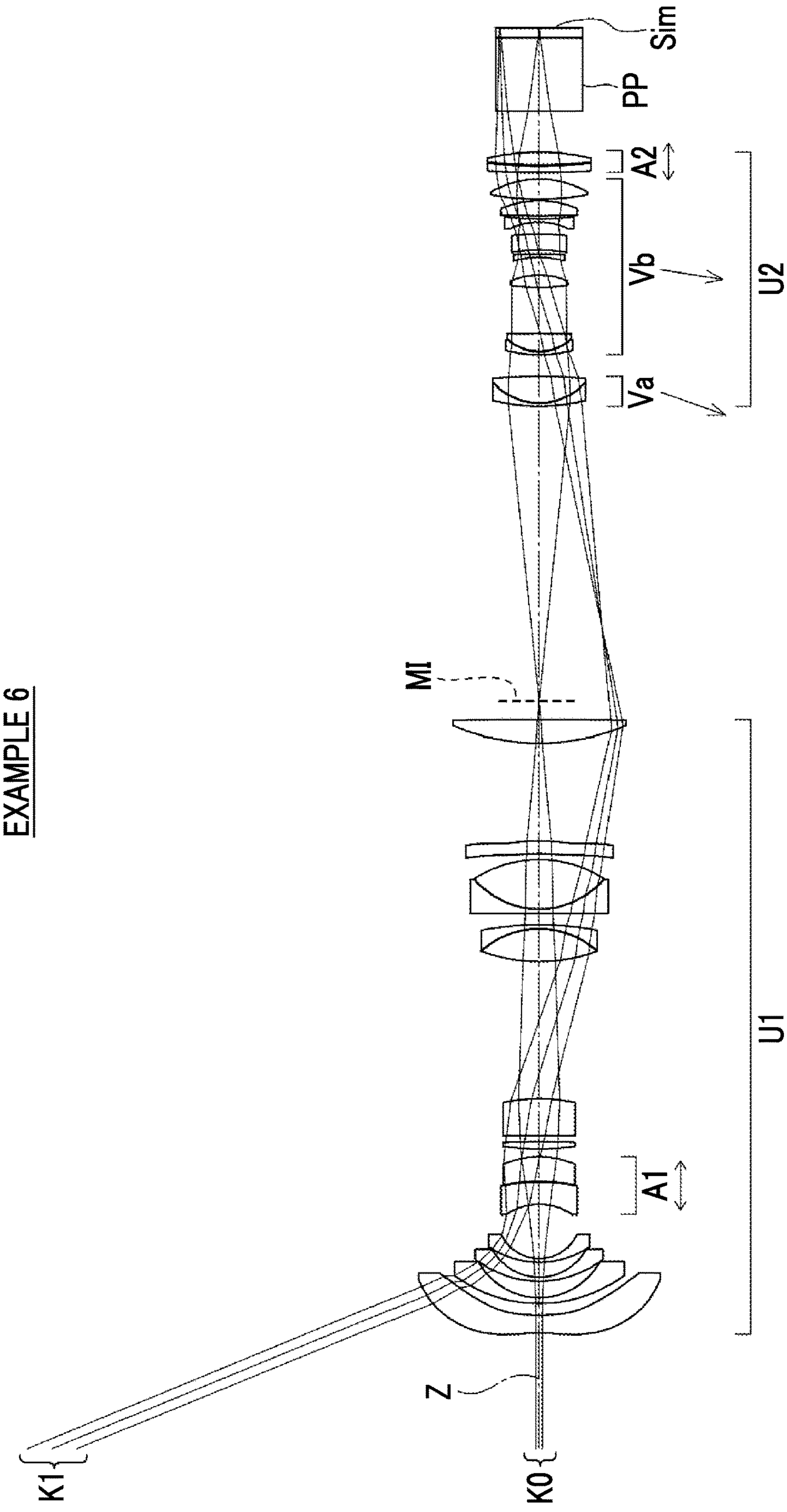
FIG. 19 is a cross-sectional view showing a configuration and luminous flux of an image forming optical system according to Example 6.

FIG. 19 shows a cross-sectional view of a configuration and luminous flux of the image forming optical system according to Example 6. The image forming optical system of Example 6 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two lenses including a fifth lens and a sixth lens from the magnification side. The two lenses of the first adjustment group A1 move integrally along the optical axis Z during the adjustment. The second optical system U2 includes the second adjustment group A2 closest to the reduction side. The second adjustment group A2 consists of two lenses including a lens closest to the reduction side and a lens which is second from the reduction side. The two lenses of the second adjustment group A2 move integrally along the optical axis Z during the adjustment.

The image forming optical system of Example 6 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 20:
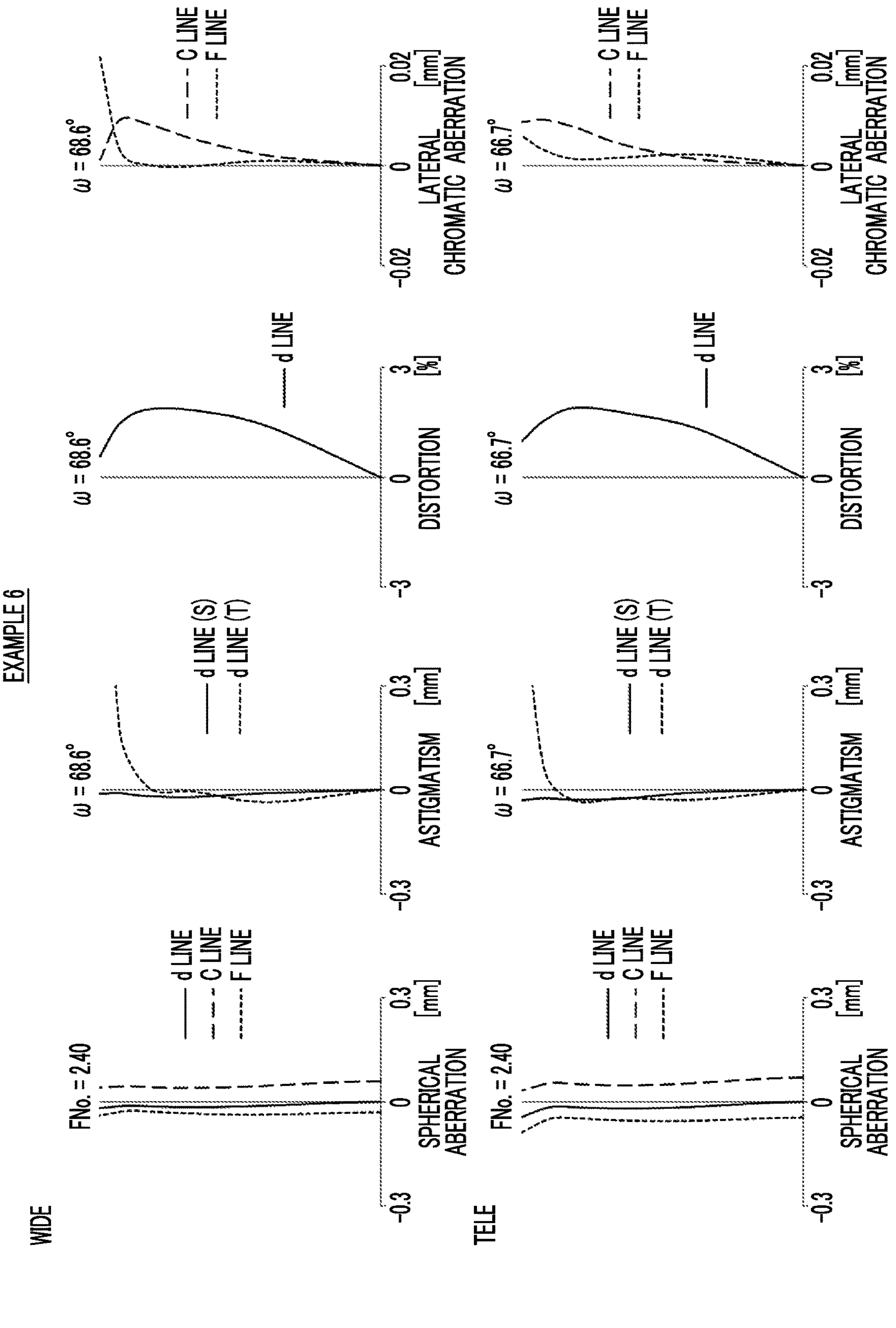
FIG. 20 is an aberration diagram of the image forming optical system according to Example 6.

Regarding the image forming optical system of Example 6, Tables 21A and 21B show basic lens data, Table 22 shows specifications and variable surface spacings, Table 23 shows aspherical coefficients, and Table 24 shows general pictures of the adjustment groups. Further, FIG. 20 shows aberration diagrams in a state where the projection distance is 0.8 meters (m).

TABLE 21A

Example 6

| Sn | R | D | Nd | νd |
|---|---|---|---|---|
| *1 | −32.5278 | 5.6000 | 1.53158 | 55.08 |
| *2 | −403.8257 | 3.5954 | | |
| 3 | 48.4465 | 1.8000 | 1.77250 | 49.62 |
| 4 | 23.3214 | 5.1653 | | |
| 5 | 35.1492 | 1.2500 | 1.84666 | 23.78 |
| 6 | 18.1194 | 4.6972 | | |
| 7 | 31.1090 | 1.1000 | 1.77250 | 49.62 |
| 8 | 14.1635 | 16.7517 | | |
| 9 | −19.9180 | 6.8585 | 1.48749 | 70.44 |
| 10 | −72.3758 | 0.4322 | | |
| 11 | −48.4240 | 7.5285 | 1.51742 | 52.19 |
| 12 | −31.0219 | 2.4325 | | |
| 13 | 85.3382 | 2.2644 | 1.80518 | 25.46 |
| 14 | −385.6206 | 1.7376 | | |
| 15 | ∞ | 11.4429 | 1.77249 | 49.58 |

TABLE 21A-continued

Example 6

| Sn | R | D | Nd | νd |
|---|---|---|---|---|
| 16 | −57.8548 | 42.5973 | | |
| 17 | 56.5788 | 10.2174 | 1.49700 | 81.61 |
| 18 | −29.6689 | 1.3000 | 1.84666 | 23.78 |
| 19 | −104.1687 | 3.6008 | | |
| 20 | ∞ | 1.2500 | 1.84666 | 23.78 |
| 21 | 28.8421 | 15.4487 | 1.59282 | 68.62 |
| 22 | −40.8593 | 1.8707 | | |
| *23 | −56.4230 | 4.0000 | 1.51633 | 64.06 |
| *24 | −41.2883 | 30.3603 | | |
| 25 | 76.2537 | 7.3601 | 1.92286 | 20.88 |
| 26 | −1280.4171 | DD[26] | | |

TABLE 21B

Example 6

| Sn | R | D | Nd | νd |
|---|---|---|---|---|
| 27 | 65.5218 | 1.0100 | 1.89286 | 20.36 |
| 28 | 21.8197 | 7.9926 | 1.90110 | 27.06 |
| 29 | −200.7593 | DD[29] | | |
| 30 | 45.1170 | 0.9000 | 1.91082 | 35.25 |
| 31 | 15.9056 | 0.2474 | | |
| 32 | 16.4278 | 5.4679 | 1.51742 | 52.15 |
| 33 | −530.3696 | 14.4313 | | |
| 34 | 71.1731 | 3.8000 | 1.49700 | 81.54 |
| 35 | −24.6532 | 5.4865 | | |
| 36 | −33.1029 | 1.0003 | 1.80518 | 25.42 |
| 37 | −152.9867 | 1.2245 | | |
| 38 | −52.6112 | 5.0050 | 1.90043 | 37.37 |
| 39 | −84.2651 | 3.6833 | | |
| 40 | −22.7072 | 1.0000 | 1.90366 | 31.31 |
| 41 | 98.1341 | 0.9799 | | |
| 42 | 530.7392 | 4.6533 | 1.89286 | 20.36 |
| 43 | −33.0861 | 0.4962 | | |
| 44 | 88.7633 | 6.2991 | 1.49700 | 81.54 |
| 45 | −32.4165 | DD[45] | | |
| 46 | 277.7775 | 2.0046 | 1.48749 | 70.24 |
| 47 | 134.6603 | 0.4004 | | |
| 48 | 162.3311 | 3.9730 | 1.74400 | 44.90 |
| 49 | −77.8311 | 12.7200 | | |
| 50 | ∞ | 23.0000 | 1.51633 | 64.14 |
| 51 | ∞ | 3.0000 | 1.48749 | 70.44 |
| 52 | ∞ | 0.0264 | | |

TABLE 22

Example 6

| | WIDE | TELE |
|---|---|---|
| Zr | 1.0 | 1.1 |
| \|f\| | 5.01 | 5.51 |
| FNo. | 2.40 | 2.40 |
| 2ω[°] | 137.2 | 133.4 |
| DD[26] | 97.50 | 91.60 |
| DD[29] | 6.78 | 8.67 |
| DD[45] | 2.00 | 6.02 |

TABLE 23

| Example 6 | | | | |
|---|---|---|---|---|
| Sn | 1 | 2 | 23 | 24 |
| KA | −7.6148269E−01 | −3.4882007E−02 | 1.0000000E+00 | 1.0000000E+00 |
| A3 | −8.0288792E−16 | −3.1633119E−16 | 3.4597817E−20 | −3.2877609E−20 |
| A4 | 1.0774083E−03 | 1.4061097E−03 | 8.0094429E−05 | 7.8043502E−05 |
| A5 | −3.3224758E−04 | −5.1425735E−04 | −3.2886283E−06 | 6.5321698E−07 |
| A6 | 5.1508443E−05 | 9.1283428E−05 | −1.1068367E−07 | −6.9688699E−07 |
| A7 | −4.5903267E−06 | −8.9522989E−06 | −6.1226036E−09 | 2.5466238E−08 |
| A8 | 2.2644730E−07 | 4.4015481E−07 | 1.7908340E−09 | 5.9571614E−09 |
| A9 | −3.6422752E−09 | −1.0554682E−09 | 1.9968105E−10 | −5.6194926E−10 |
| A10 | −2.3579547E−10 | −1.1001913E−09 | −3.5592894E−11 | −1.2104640E−11 |
| A11 | 1.5049966E−11 | 5.1105509E−11 | −1.5574703E−13 | 3.3810511E−12 |
| A12 | −2.2829856E−13 | −1.4264738E−14 | 2.1454634E−13 | −8.3593219E−14 |
| A13 | −8.1718235E−15 | −6.9531032E−14 | −5.7342871E−15 | −7.4993385E−15 |
| A14 | 3.8691327E−16 | 1.8799388E−15 | −5.4630591E−16 | 4.5359285E−16 |
| A15 | −3.2400230E−18 | 1.6772189E−17 | 2.6263862E−17 | 8.8073304E−19 |
| A16 | −1.3384878E−19 | −1.6227326E−18 | 4.9546510E−19 | −7.4216721E−19 |
| A17 | 3.5384486E−21 | 2.0453846E−20 | −4.4995797E−20 | 1.8407124E−20 |
| A18 | −1.2528064E−23 | 2.9929765E−22 | 2.1459976E−22 | 2.6644388E−22 |
| A19 | −6.1779429E−25 | −9.8161254E−24 | 2.7668331E−23 | −1.8200182E−23 |
| A20 | 9.3011614E−27 | 7.6279426E−26 | −4.4919234E−25 | 2.2669167E−25 |
| A21 | −4.1728265E−29 | −8.0117377E−29 | | |

TABLE 24

| Example 6 | | | |
|---|---|---|---|
| | Number of lenses | Sn | Form of moving |
| First adjustment group | 2 | 9-12 | moving integrally |
| Second adjustment group | 2 | 46-49 | moving integrally |

EXAMPLE 7

Figure 21:
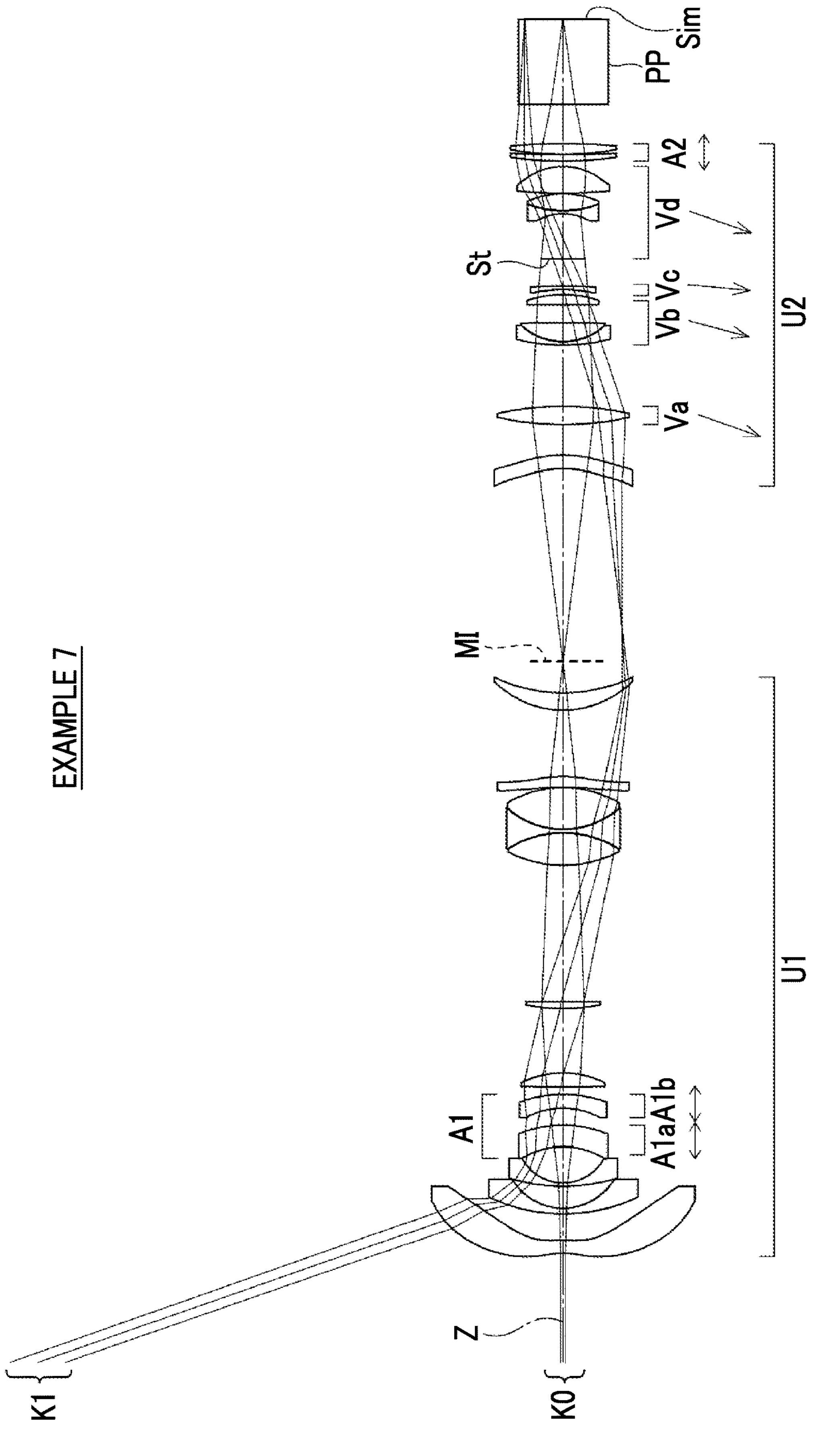
FIG. 21 is a cross-sectional view showing a configuration and luminous flux of an image forming optical system according to Example 7.

FIG. 21 shows a cross-sectional view of a configuration and luminous flux of the image forming optical system according to Example 7. The image forming optical system of Example 7 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two groups including the sub-group A1*a* and the sub-group A1*b*, which move along the optical axis Z by changing the mutual spacing during the adjustment. The sub-group A1*a* consists of one lens which is fourth from the magnification side. The sub-group A1*b* consists of one lens which is fifth from the magnification side. The second optical system U2 includes the second adjustment group A2 closest to the reduction side. The second adjustment group A2 consists of two lenses including a lens closest to the reduction side and a lens which is second from the reduction side. The two lenses of the second adjustment group A2 move integrally along the optical axis Z during the adjustment.

The image forming optical system of Example 7 is a variable magnification optical system. During magnification change, the lens group Va, the lens group Vb, the lens group Vc, and the lens group Vd in the second optical system U2 move along the optical axis Z by changing the spacing between the adjacent groups, and the other lenses remain stationary with respect to the image display surface Sim. The lens group Vd includes an aperture stop St.

Figure 22:
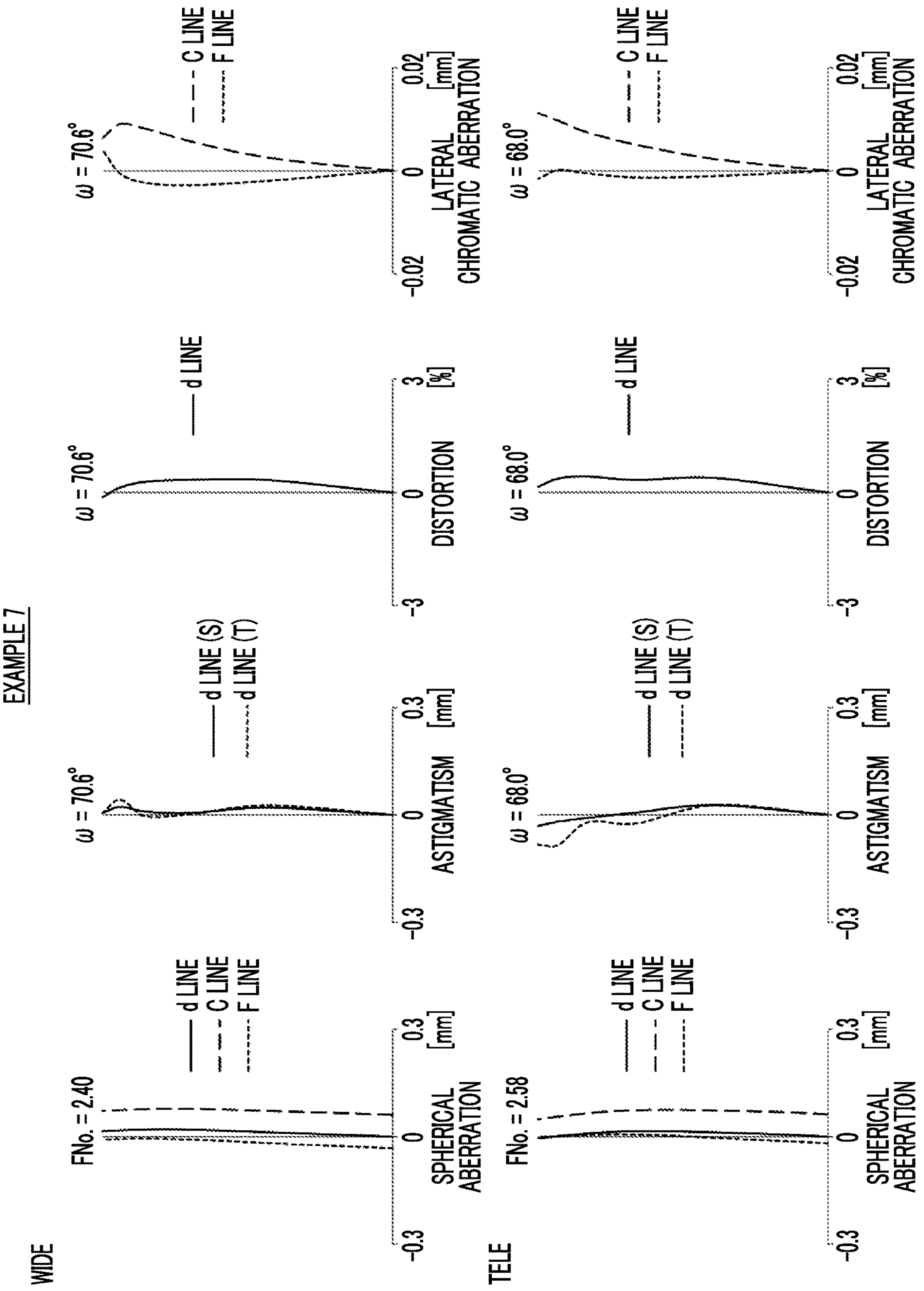
FIG. 22 is an aberration diagram of the image forming optical system according to Example 7.

Regarding the image forming optical system of Example 7, Tables 25A and 25B show basic lens data, Table 26 shows specifications and variable surface spacings, Table 27 shows aspherical coefficients, and Table 28 shows general pictures of the adjustment groups. Further, FIG. 22 shows aberration diagrams in a state where the projection distance is 0.5 meters (m).

TABLE 25A

| Example 7 | | | | |
|---|---|---|---|---|
| Sn | R | D | Nd | νd |
| *1 | −12.6157 | 4.0009 | 1.53158 | 55.08 |
| *2 | −24.7934 | 8.0000 | | |
| 3 | 52.0365 | 1.7183 | 1.89190 | 37.13 |
| 4 | 17.9588 | 6.7548 | | |
| 5 | 56.6610 | 1.0000 | 1.83481 | 42.74 |
| 6 | 14.1039 | 11.0609 | | |
| 7 | −23.8425 | 6.5000 | 1.58913 | 61.13 |
| 8 | −35.1280 | 5.2229 | | |
| 9 | −22.9585 | 4.1681 | 1.48749 | 70.44 |
| 10 | −38.4140 | 2.3040 | | |
| 11 | 641.9030 | 4.2611 | 1.48749 | 70.44 |
| 12 | −28.3969 | 19.7628 | | |
| 13 | 60.6983 | 1.9616 | 1.84666 | 23.78 |
| 14 | ∞ | 41.7263 | | |
| 15 | 36.7331 | 9.9395 | 1.58913 | 61.13 |
| 16 | −31.0542 | 1.1000 | 1.84666 | 23.78 |
| 17 | 25.7764 | 12.7242 | 1.49700 | 81.61 |
| 18 | −33.3333 | 0.2000 | | |
| *19 | −55.8462 | 3.2703 | 1.51007 | 56.24 |
| *20 | −31.8968 | 20.0469 | | |
| 21 | 29.8254 | 5.1315 | 1.51680 | 64.20 |
| 22 | 48.3278 | 68.5344 | | |

TABLE 25B

| Example 7 | | | | |
|---|---|---|---|---|
| Sn | R | D | Nd | νd |
| *23 | −29.8212 | 4.1806 | 1.51007 | 56.24 |
| *24 | −32.3410 | DD[24] | | |
| 25 | 91.4448 | 5.5785 | 1.80400 | 46.53 |
| 26 | −94.8015 | DD[26] | | |
| 27 | 58.8390 | 1.0000 | 1.84666 | 23.78 |
| 28 | 18.7070 | 5.8312 | 1.60562 | 43.71 |

TABLE 25B-continued

| Example 7 | | | | |
|---|---|---|---|---|
| Sn | R | D | Nd | νd |
| 29 | −571.9766 | 5.5086 | | |
| 30 | 2073.8039 | 3.0516 | 1.54814 | 45.78 |
| 31 | −34.2355 | DD[31] | | |
| 32 | −43.6933 | 1.0666 | 1.80518 | 25.46 |
| 33 | −130.3348 | DD[33] | | |
| 34(St) | ∞ | 13.6056 | | |
| 35 | −15.7462 | 0.9500 | 1.77250 | 49.60 |
| 36 | 31.3828 | 5.1345 | 1.49700 | 81.61 |
| 37 | −26.6009 | 0.2010 | | |
| 38 | 147.6832 | 8.1395 | 1.49700 | 81.61 |
| 39 | −19.5755 | DD[39] | | |
| 40 | 118.2224 | 1.9230 | 1.84666 | 23.78 |
| 41 | 319.0508 | 0.1008 | | |
| 42 | 90.3010 | 3.2453 | 1.84666 | 23.78 |

TABLE 26

| Example 7 | | |
|---|---|---|
| | WIDE | TELE |
| Zr | 1.0 | 1.2 |
| \|f\| | 4.05 | 4.66 |
| FNo. | 2.40 | 2.58 |
| 2ω[°] | 141.2 | 136.0 |
| DD[24] | 9.28 | 0.51 |
| DD[26] | 18.80 | 20.48 |
| DD[31] | 1.60 | 5.30 |
| DD[33] | 8.41 | 2.33 |
| DD[39] | 1.72 | 11.18 |

TABLE 27

| Example 7 | | | | |
|---|---|---|---|---|
| Sn | 1 | 2 | 19 | 20 |
| KA | −6.2182769E−01 | −1.5355807E+00 | −1.5858446E+00 | 1.5000003E+00 |
| A3 | 3.8383286E−03 | 4.1488459E−03 | 0.0000000E+00 | 0.0000000E+00 |
| A4 | −9.1338843E−05 | −2.3934025E−04 | −3.1436112E−06 | 7.6973804E−06 |
| A5 | −9.2642946E−06 | 1.7407229E−05 | 1.8988477E−06 | 8.5277807E−06 |
| A6 | 6.1979184E−07 | −1.3112112E−06 | 7.1757499E−07 | −9.7103093E−07 |
| A7 | −1.2013722E−09 | 5.7395918E−08 | −3.9723233E−08 | 1.4549716E−07 |
| A8 | −1.0289975E−09 | −1.2369484E−09 | −1.1179392E−09 | −1.4673944E−09 |
| A9 | 2.4603555E−11 | −8.2624924E−12 | −1.4712815E−09 | −3.0192864E−09 |
| A10 | 7.5394098E−13 | 1.7199913E−12 | 1.5662130E−10 | 2.4203710E−10 |
| A11 | −3.5418247E−14 | −5.4804872E−14 | 1.1495137E−11 | 1.5271251E−11 |
| A12 | −1.3875271E−16 | 2.4498811E−16 | −1.8199602E−12 | −2.2399054E−12 |
| A13 | 2.4269892E−17 | 2.5351261E−17 | −1.2111742E−14 | −1.0041288E−14 |
| A14 | −1.4448904E−19 | −4.1895134E−19 | 8.4947240E−15 | 9.1007465E−15 |
| A15 | −9.0477567E−21 | −1.1729680E−20 | −1.3113249E−16 | −1.4723540E−16 |
| A16 | 1.0287934E−22 | 6.3495989E−22 | −1.9838931E−17 | −1.9191290E−17 |
| A17 | 1.7734342E−24 | −1.3900584E−23 | 5.2772279E−19 | 5.1715263E−19 |
| A18 | −2.6566534E−26 | 1.7876263E−25 | 2.3110316E−20 | 2.0568448E−20 |
| A19 | −1.4403762E−28 | −1.3330589E−27 | −7.7451336E−22 | −6.9402500E−22 |
| A20 | 2.5420114E−30 | 4.5847762E−30 | −1.0716205E−23 | −8.8791568E−24 |
| A21 | | | 4.1120282E−25 | 3.4253753E−25 |

| Sn | 23 | 24 |
|---|---|---|
| KA | 1.1231593E+00 | 1.0107870E+00 |
| A3 | 0.0000000E+00 | 0.0000000E+00 |
| A4 | 2.7980397E−05 | 2.1082832E−05 |
| A5 | 3.3011358E−07 | 1.0088926E−07 |
| A6 | −5.5218352E−08 | −2.5617355E−09 |
| A7 | −1.9661014E−09 | −2.0688133E−09 |
| A8 | 1.1311924E−10 | −1.7786537E−10 |
| A9 | 9.1972123E−12 | 2.1945902E−11 |
| A10 | 1.2024901E−13 | 4.8976352E−13 |
| A11 | −2.7367780E−14 | −6.7870971E−14 |
| A12 | −9.6453886E−16 | −4.6364679E−16 |
| A13 | 3.7099297E−17 | 8.4657946E−17 |
| A14 | 1.4138423E−18 | 8.2628331E−20 |
| A15 | −1.8144292E−20 | −3.7566623E−20 |
| A16 | −6.3616164E−22 | 7.3930362E−23 |

TABLE 25B-continued

| Example 7 | | | | |
|---|---|---|---|---|
| Sn | R | D | Nd | νd |
| 43 | −176.8956 | 12.0000 | | |
| 44 | ∞ | 26.0500 | 1.51633 | 64.14 |
| 45 | ∞ | 0.1972 | | |

TABLE 28

| Example 7 | | | |
|---|---|---|---|
| | Number of lenses | Sn | Form of moving |
| First adjustment group | 1 | 7-8 | moving individually |
| | 1 | 9-10 | |
| Second adjustment group | 2 | 40-43 | moving integrally |

EXAMPLE 8

Figure 23:
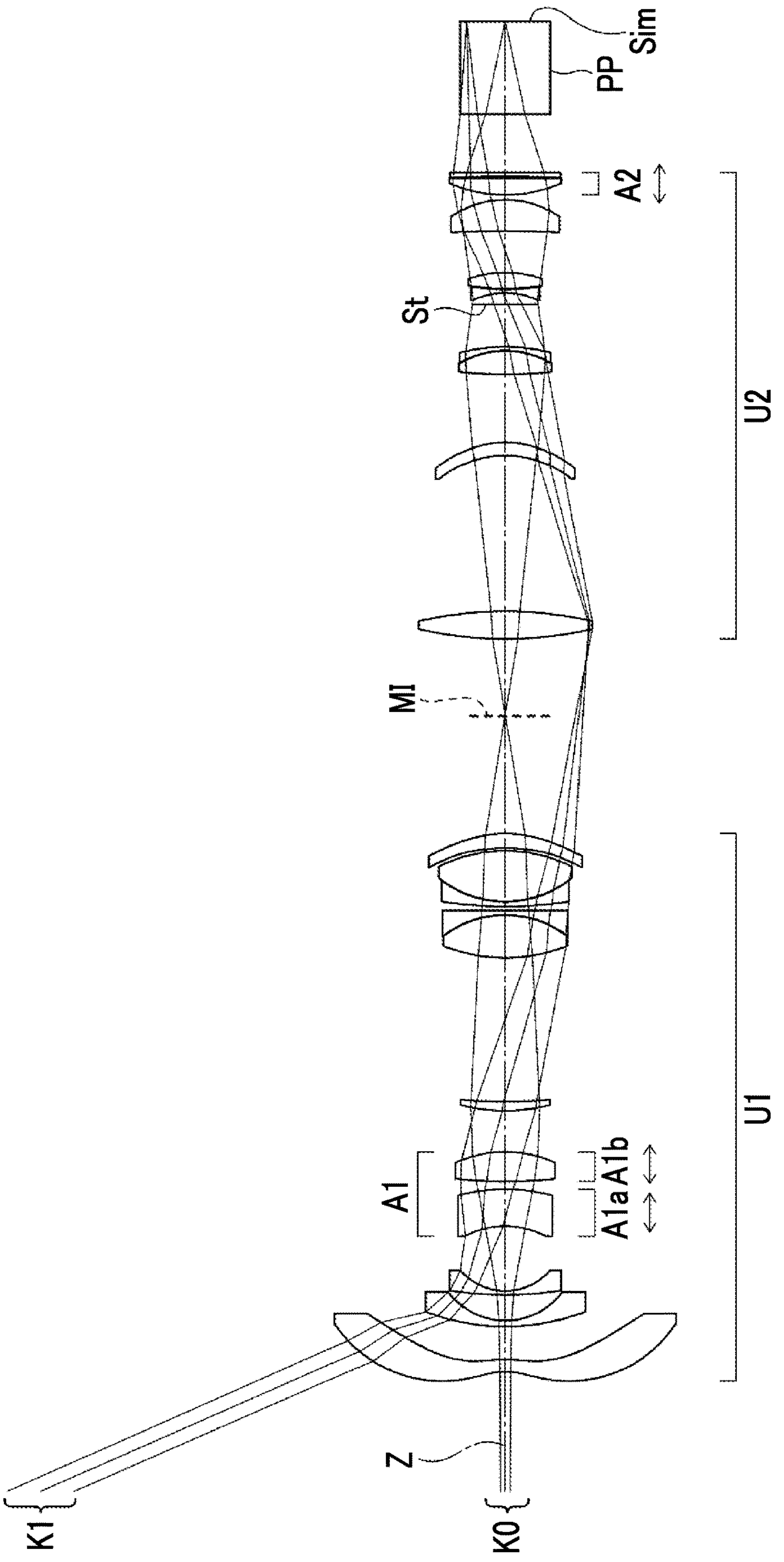
FIG. 23 is a cross-sectional view showing a configuration and luminous flux of an image forming optical system according to Example 8.

FIG. 23 shows a cross-sectional view of a configuration and luminous flux of the image forming optical system according to Example 8. The image forming optical system of Example 8 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two groups including the sub-group A1*a* and the sub-group A1*b*, which move along the optical axis Z by changing the mutual spacing during the adjustment. The sub-group A1*a* consists of one lens which is fourth from the magnification side. The sub-group A1*b* consists of one lens which is fifth from the magnification side. The second optical system U2 includes the second adjustment group A2 closest to the reduction side. The second adjustment group A2 consists of two lenses including a lens closest to the reduction side and a lens which is second from the reduction side. The two lenses of the second adjustment group A2 move integrally along the optical axis Z during the adjustment.

Figure 24:
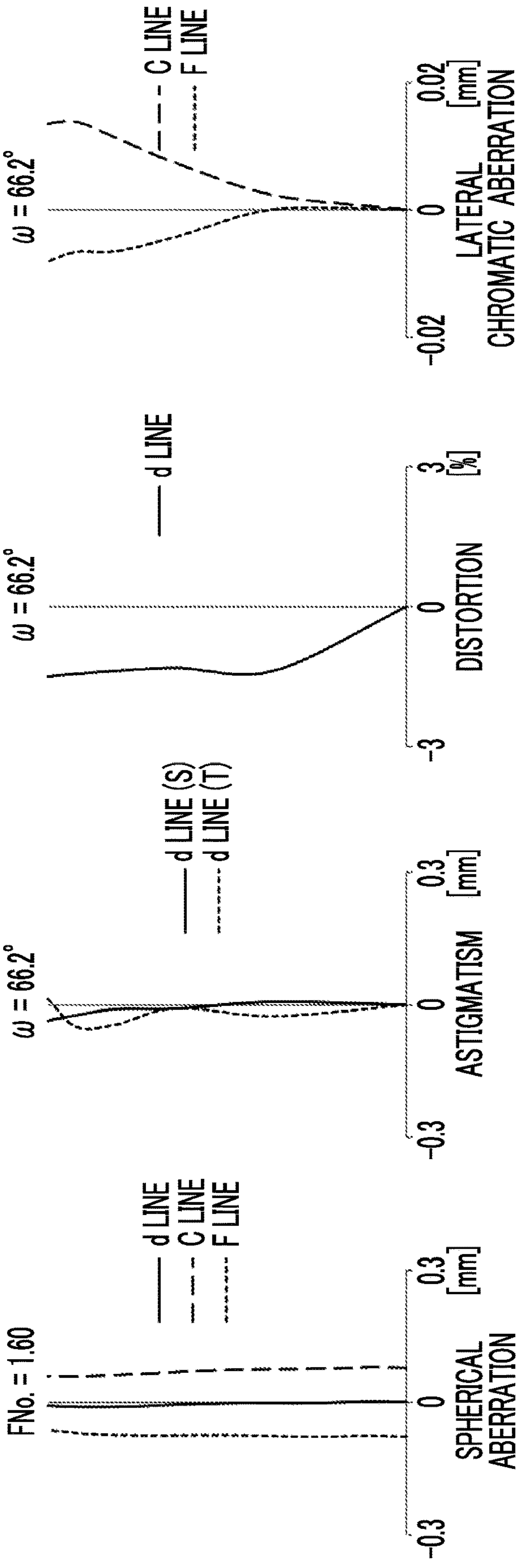
FIG. 24 is an aberration diagram of the image forming optical system according to Example 8.

The image forming optical system of Example 8 is a fixed focus optical system. The second optical system U2 includes an aperture stop St. Regarding the image forming optical system of Example 8, Tables 29A and 29B show basic lens data, Table 30 shows specifications, Table 31 shows aspherical coefficients, and Table 32 shows a general picture of each adjustment group. Further, FIG. 24 shows aberration diagrams in a state where the projection distance is 0.8 meters (m).

TABLE 29A

| Example 8 | | | | |
|---|---|---|---|---|
| Sn | R | D | Nd | νd |
| *1 | −13.5866 | 3.4990 | 1.53158 | 55.08 |
| *2 | −24.2661 | 9.5616 | | |
| 3 | 63.4433 | 1.7003 | 1.80420 | 46.50 |
| 4 | 20.4061 | 7.3956 | | |
| 5 | 96.6959 | 1.2003 | 1.80420 | 46.50 |
| 6 | 16.9432 | 18.5218 | | |
| 7 | −26.0435 | 10.7823 | 1.58913 | 61.13 |
| 8 | −50.7306 | 2.2391 | | |
| 9 | 139.7282 | 8.5672 | 1.48749 | 70.44 |

TABLE 29A-continued

| Example 8 | | | | |
|---|---|---|---|---|
| Sn | R | D | Nd | νd |
| 10 | −33.9915 | 11.8850 | | |
| 11 | 50.4244 | 2.6337 | 1.71736 | 29.52 |
| 12 | 152.6116 | 41.5009 | | |
| 13 | 48.6419 | 12.3541 | 1.58913 | 61.25 |
| 14 | −28.9712 | 1.3200 | 1.84667 | 23.79 |
| 15 | ∞ | 1.1566 | | |
| 16 | 116.2197 | 1.4000 | 1.84667 | 23.79 |
| 17 | 30.4357 | 14.7154 | 1.49700 | 81.61 |
| 18 | −42.1254 | 0.7584 | | |
| *19 | −47.5687 | 4.2813 | 1.51007 | 56.24 |
| *20 | −28.6725 | 55.8683 | | |

TABLE 29B

| Example 8 | | | | |
|---|---|---|---|---|
| Sn | R | D | Nd | νd |
| 21 | 112.1696 | 7.9514 | 1.80518 | 25.46 |
| 22 | −112.1696 | 44.9307 | | |
| *23 | −28.5698 | 3.8037 | 1.51007 | 56.24 |
| *24 | −27.1054 | 19.7283 | | |
| 25 | 127.9280 | 6.8025 | 1.77250 | 49.60 |
| 26 | −25.9831 | 1.1200 | 1.80518 | 25.46 |
| 27 | −52.1136 | 12.2331 | | |
| 28(St) | ∞ | 3.3532 | | |
| 29 | −22.6459 | 1.0119 | 1.80518 | 25.46 |
| 30 | 51.5901 | 0.3488 | | |
| 31 | 77.2783 | 4.5422 | 1.53172 | 48.84 |
| 32 | −32.7095 | 11.9033 | | |
| 33 | −281.9466 | 9.0196 | 1.48749 | 70.44 |
| 34 | −27.3764 | 1.3994 | | |
| 35 | 40.0006 | 4.8565 | 1.80518 | 25.46 |
| 36 | 11227.2406 | 0.5693 | | |
| 37 | −345.0975 | 1.1367 | 1.80440 | 39.58 |
| 38 | 12596.3176 | 16.7007 | | |
| 39 | ∞ | 26.9000 | 1.51680 | 64.20 |
| 40 | ∞ | 0.0375 | | |

TABLE 30

| Example 8 | |
|---|---|
| \|f\| | 4.96 |
| FNo. | 1.60 |
| 2ω[°] | 132.4 |

TABLE 31

| Example 8 | | | | |
|---|---|---|---|---|
| Sn | 1 | 2 | 19 | 20 |
| KA | −4.1474640E−01 | −3.7456972E+00 | −3.6768238E+00 | 8.3356129E−01 |
| A3 | 1.7777123E−03 | 2.2970637E−03 | 0.0000000E+00 | 6.6844047E−20 |
| A4 | 3.4490917E−05 | −2.1589344E−04 | 1.4529358E−05 | 3.9572407E−05 |
| A5 | −5.7611777E−06 | 2.5069755E−05 | −1.7067007E−06 | −2.7759897E−06 |
| A6 | 7.4469629E−08 | −1.9149384E−06 | 3.3371827E−07 | 2.6229316E−07 |
| A7 | 6.9449899E−09 | 7.5922331E−08 | −7.8638840E−08 | −9.1085322E−09 |
| A8 | −1.8788527E−10 | −1.0050961E−09 | 5.7489108E−09 | −2.7471250E−09 |
| A9 | −4.7343381E−12 | −3.5690958E−11 | 3.0904551E−10 | 2.6181497E−10 |
| A10 | 2.1007545E−13 | 1.9192048E−12 | −6.6839017E−11 | 5.9358552E−12 |
| A11 | 1.1806510E−15 | −4.3775005E−14 | 1.8485907E−12 | −1.4425797E−12 |
| A12 | −1.2612907E−16 | 5.0812505E−16 | 2.2650344E−13 | 1.4159813E−14 |
| A13 | 4.0913794E−19 | 1.1536497E−17 | −1.4655056E−14 | 3.8853705E−15 |
| A14 | 4.2466115E−20 | −5.7556132E−19 | −2.1927976E−16 | −9.1923691E−17 |
| A15 | −3.6926214E−22 | −7.6932714E−21 | 3.7513690E−17 | −5.7396637E−18 |
| A16 | −7.2924829E−24 | 1.0326221E−21 | −3.4506329E−19 | 1.8320345E−19 |
| A17 | 9.9248707E−26 | −2.9137660E−23 | −4.3012490E−20 | 4.4636184E−21 |

TABLE 31-continued

| Example 8 | | | | |
|---|---|---|---|---|
| A18 | 3.6258054E−28 | 3.8904933E−25 | 8.7489505E−22 | −1.6948724E−22 |
| A19 | −9.7954146E−30 | −2.4240685E−27 | 1.8792800E−23 | −1.4300797E−24 |
| A20 | 3.5143489E−32 | 4.8205067E−30 | −5.0716397E−25 | 6.1646451E−26 |

| Sn | 23 | 24 |
|---|---|---|
| KA | 1.3387039E+00 | 8.6114721E−01 |
| A3 | −1.0534808E−19 | 0.0000000E+00 |
| A4 | 1.7130621E−06 | −1.0359266E−06 |
| A5 | 9.9002376E−07 | 1.7637691E−06 |
| A6 | −2.6304305E−08 | −1.0057597E−08 |
| A7 | −1.3124718E−08 | −4.4981235E−08 |
| A8 | 1.9021557E−09 | 5.6080916E−09 |
| A9 | −3.8949330E−12 | 3.4140701E−11 |
| A10 | −1.2130022E−11 | −4.6226213E−11 |
| A11 | 2.9253005E−13 | 1.9385332E−12 |
| A12 | 3.8895228E−14 | 1.3481930E−13 |
| A13 | −1.0531538E−15 | −1.0882320E−14 |
| A14 | −8.0150813E−17 | −8.5962232E−17 |
| A15 | 1.6620655E−18 | 2.5042193E−17 |
| A16 | 1.1172026E−19 | −3.1938916E−19 |
| A17 | −1.2481771E−21 | −2.6734491E−20 |
| A18 | −9.5365218E−23 | 6.3939451E−22 |
| A19 | 3.6105081E−25 | 1.0847508E−23 |
| A20 | 3.6418672E−26 | −3.4512080E−25 |

TABLE 32

| Example 8 | Number of lenses | Sn | Form of moving |
|---|---|---|---|
| First adjustment | 1 | 7-8 | moving individually |
| group | 1 | 9-10 | |
| Second adjustment group | 2 | 35-38 | moving integrally |

EXAMPLE 9

Figure 25:
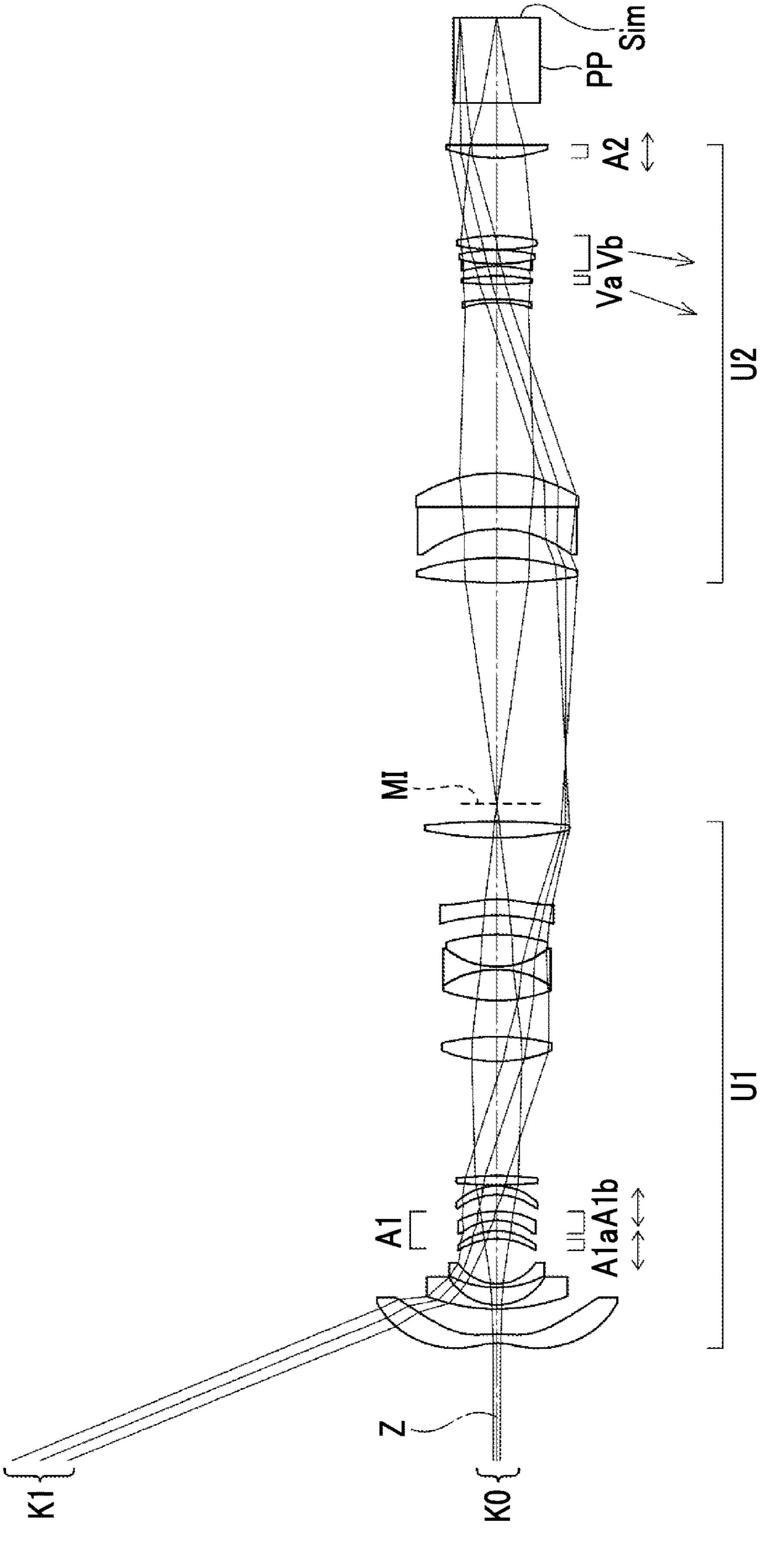
FIG. 25 is a cross-sectional view showing a configuration and luminous flux of an image forming optical system according to Example 9.

FIG. 25 shows a cross-sectional view of a configuration and luminous flux of the image forming optical system according to Example 9. The image forming optical system of Example 9 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two groups including the sub-group A1*a* and the sub-group A1*b*, which move along the optical axis Z by changing the mutual spacing during the adjustment. The sub-group A1*a* consists of one lens which is fourth from the magnification side. The sub-group A1*b* consists of one lens which is fifth from the magnification side. The second optical system U2 includes the second adjustment group A2 closest to the reduction side. The second adjustment group A2 consists of one lens closest to the reduction side.

The image forming optical system of Example 9 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 26:
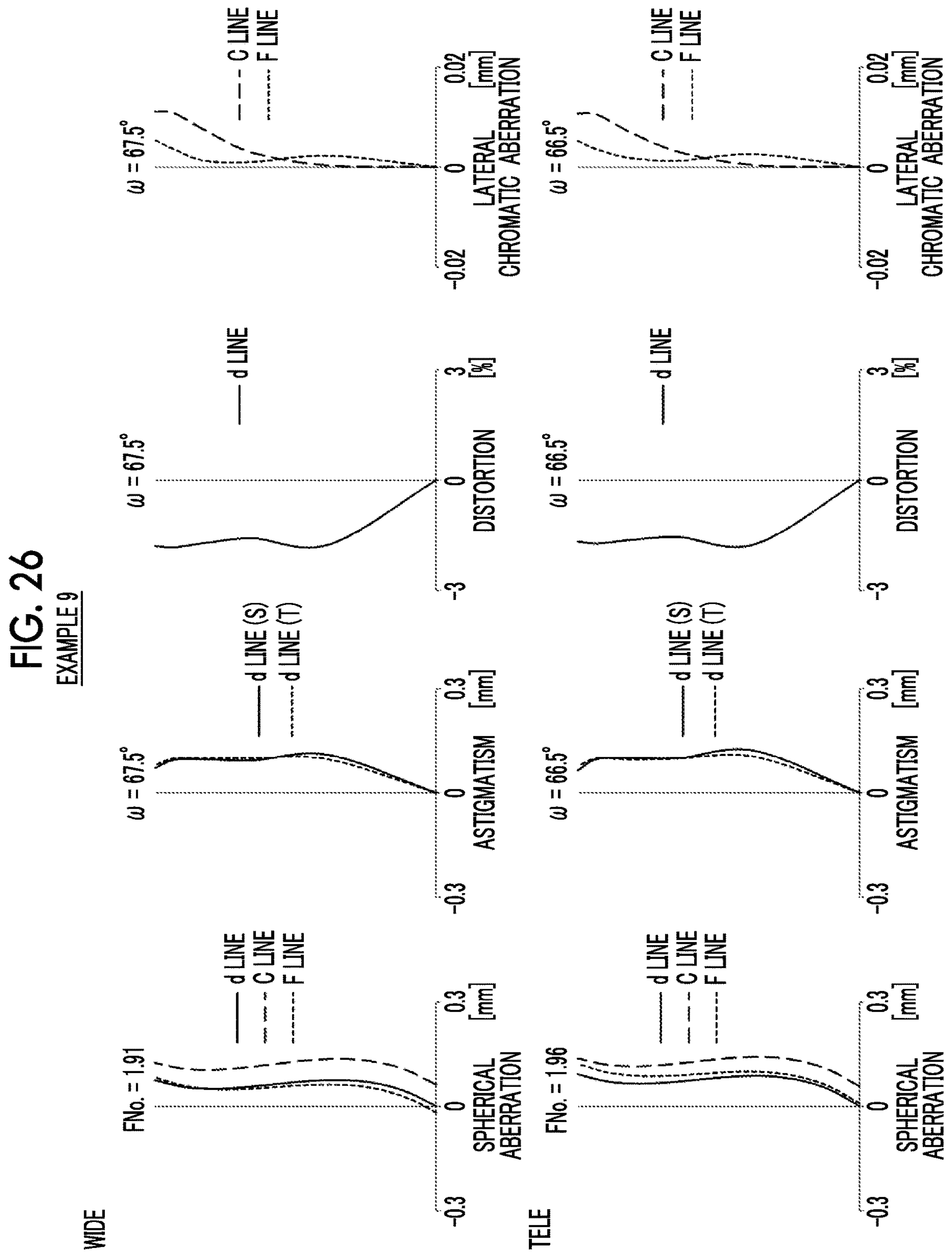
FIG. 26 is an aberration diagram of the image forming optical system according to Example 9.

Regarding the image forming optical system of Example 9, Tables 33A and 33B show basic lens data, Table 34 shows specifications and variable surface spacings, Table 35 shows aspherical coefficients, and Table 36 shows general pictures of the adjustment groups. Further, FIG. 26 shows aberration diagrams in a state where the projection distance is 1.1 meters (m).

TABLE 33A

Example 9

| Sn | R | D | Nd | νd |
|---|---|---|---|---|
| *1 | −26.9404 | 4.5007 | 1.53097 | 55.61 |
| *2 | −60.0953 | 12.6346 | | |
| 3 | 100.6651 | 1.9991 | 1.91082 | 35.25 |
| 4 | 27.7067 | 8.8282 | | |
| 5 | 52.2511 | 1.8779 | 1.80400 | 46.53 |
| 6 | 23.3682 | 22.5232 | | |
| 7 | −34.9030 | 3.7499 | 1.78880 | 28.43 |
| 8 | −31.1911 | 5.2433 | | |
| 9 | −28.3494 | 4.5698 | 1.71299 | 53.87 |
| 10 | −42.2800 | 8.1936 | | |
| 11 | −31.9832 | 4.5251 | 1.62299 | 58.16 |
| 12 | −28.9117 | 0.4991 | | |
| 13 | 214.9795 | 4.6012 | 1.80809 | 22.76 |
| 14 | −187.8992 | 57.5074 | | |
| 15 | 72.5312 | 12.3648 | 1.49700 | 81.61 |
| 16 | −117.9602 | 18.2286 | | |
| 17 | 76.0673 | 15.2595 | 1.60311 | 60.64 |
| 18 | −47.5909 | 1.4003 | 1.84666 | 23.78 |
| 19 | 40.3520 | 16.1237 | 1.49700 | 81.61 |
| 20 | −85.0845 | 9.6987 | | |
| *21 | −70.7541 | 8.0009 | 1.51633 | 64.06 |
| *22 | −50.0375 | 30.8403 | | |
| 23 | 169.8434 | 8.3237 | 1.80518 | 25.46 |
| 24 | −333.8444 | 119.2496 | | |

TABLE 33B

Example 9

| Sn | R | D | Nd | νd |
|---|---|---|---|---|
| 25 | 271.9779 | 12.5631 | 1.80400 | 46.53 |
| 26 | −122.5999 | 14.3419 | | |
| 27 | −59.6127 | 10.9728 | 1.59270 | 35.31 |

TABLE 33B-continued

| Example 9 | | | | |
|---|---|---|---|---|
| Sn | R | D | Nd | νd |
| 28 | −39102.4957 | 16.8190 | 1.72916 | 54.68 |
| 29 | −75.6151 | 85.7198 | | |
| 30 | −54.5860 | 1.6986 | 1.80610 | 40.93 |
| 31 | −97.4347 | DD[31] | | |
| 32 | 228.7789 | 4.0470 | 1.60311 | 60.64 |
| 33 | −114.9233 | DD[33] | | |
| 34 | −61.6554 | 0.9991 | 1.78880 | 28.43 |
| 35 | 75.3388 | 0.0808 | | |
| 36 | 77.9902 | 6.6660 | 1.53775 | 74.70 |
| 37 | −84.4693 | 0.1991 | | |
| 38 | 93.0401 | 7.0207 | 1.49700 | 81.61 |
| 39 | −86.8400 | DD[39] | | |
| 40 | 78.3184 | 6.4841 | 1.94595 | 17.98 |
| 41 | ∞ | 21.0000 | | |
| 42 | ∞ | 42.8000 | 1.51633 | 64.14 |
| 43 | ∞ | 0.0301 | | |

TABLE 34

| Example 9 | | |
|---|---|---|
| | WIDE | TELE |
| Zr | 1.0 | 1.05 |
| \|f\| | 7.71 | 8.10 |
| FNo. | 1.91 | 1.96 |
| 2ω[°] | 135.0 | 133.0 |
| DD[31] | 7.49 | 1.63 |
| DD[33] | 5.03 | 8.87 |
| DD[39] | 39.19 | 41.21 |

TABLE 35

| Example 9 | | | | |
|---|---|---|---|---|
| Sn | 1 | 2 | 21 | 22 |
| KA | 1.8608216E−01 | 1.0179895E+00 | 1.0000000E+00 | 1.0000000E+00 |
| A3 | −2.8936816E−04 | 4.1623046E−06 | −9.0742884E−05 | −1.2897310E−05 |
| A4 | 1.2794980E−04 | 5.6416240E−05 | 2.7314424E−05 | 1.7124061E−05 |
| A5 | −5.0133951E−06 | 3.1467105E−07 | −7.4319044E−07 | 6.0538150E−07 |
| A6 | −5.9866291E−08 | −1.8118949E−07 | −1.6638597E−07 | −1.3500811E−07 |
| A7 | 8.8691765E−09 | 3.3079409E−09 | 1.9305555E−08 | 7.3910737E−09 |
| A8 | −1.2644848E−10 | 1.9778842E−10 | −5.7250326E−10 | 6.9100668E−11 |
| A9 | −6.3247711E−12 | −5.9651361E−12 | −2.7007812E−11 | −2.4933814E−11 |
| A10 | 2.0939799E−13 | −1.2457572E−13 | 1.6384585E−12 | 5.8535011E−13 |
| A11 | 1.1050401E−15 | 5.7027521E−15 | 3.5607132E−14 | 3.4810046E−14 |
| A12 | −1.2697634E−16 | 2.6695282E−17 | −3.3380393E−15 | −1.4779460E−15 |
| A13 | 9.3349335E−19 | −2.9095336E−18 | −8.0006335E−18 | −2.3089753E−17 |
| A14 | 3.5788950E−20 | 7.4903683E−21 | 3.3890400E−18 | 1.5950454E−18 |
| A15 | −5.7205263E−22 | 8.4961232E−22 | −1.2245202E−20 | 6.1963265E−21 |
| A16 | −3.6266843E−24 | −5.9050800E−24 | −1.9741633E−21 | −9.0906372E−22 |
| A17 | 1.2231076E−25 | −1.2830907E−25 | 1.0230275E−23 | 1.4913220E−25 |
| A18 | −2.6665566E−28 | 1.2410587E−27 | 6.0239946E−25 | 2.6919663E−25 |
| A19 | −9.4411509E−30 | 8.0813372E−30 | −1.9126804E−27 | −2.4535051E−28 |
| A20 | 5.8944135E−32 | −9.3488710E−32 | −8.3011777E−29 | −3.2943196E−29 |

TABLE 36

| Example 9 | | | |
|---|---|---|---|
| | Number of lenses | Sn | Form of moving |
| First adjustment group | 2 | 7-8<br>9-10 | moving individually |
| Second adjustment group | 1 | 40-41 | — |

EXAMPLE 10

Figure 27:
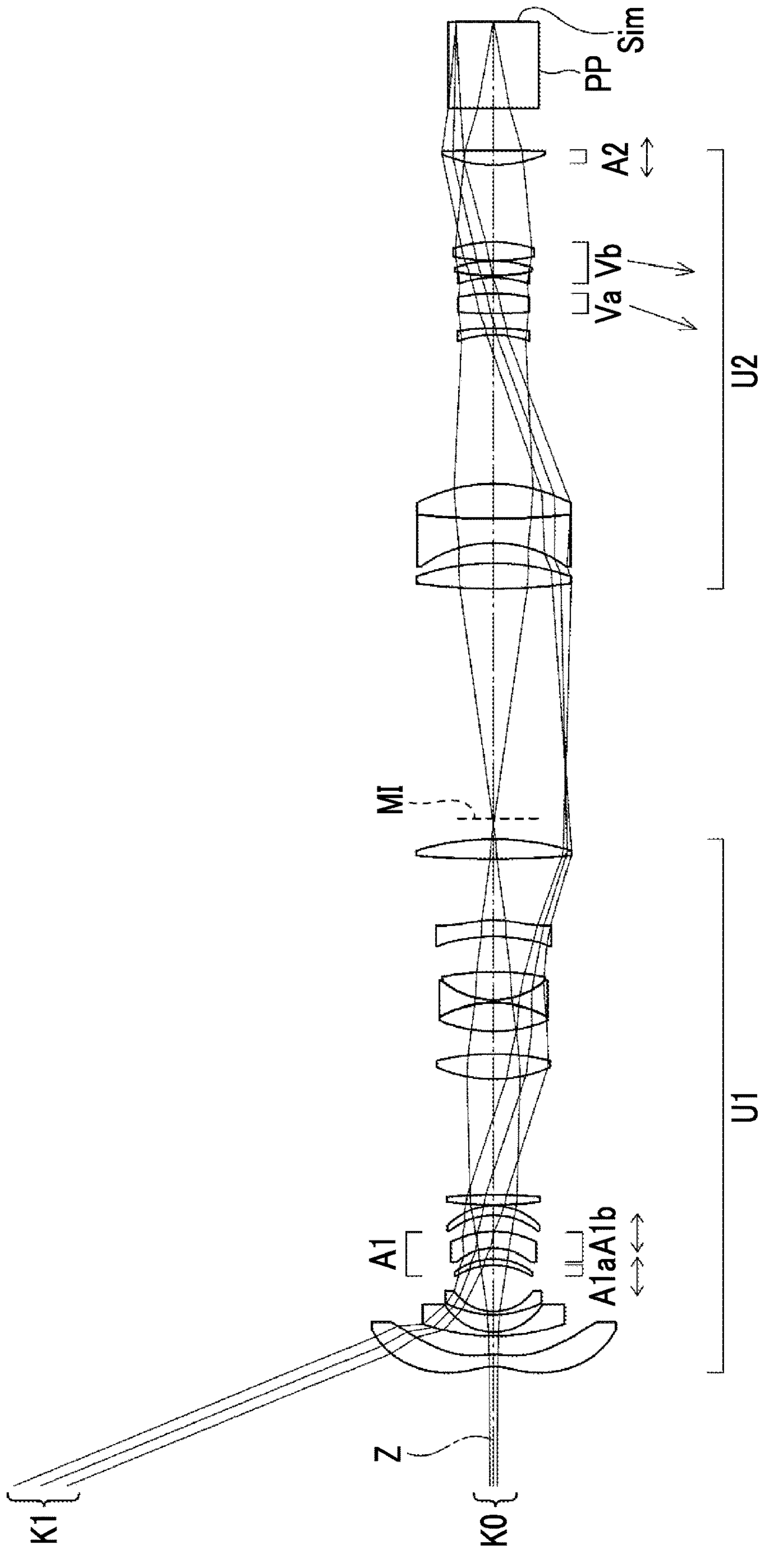
FIG. 27 is a cross-sectional view showing a configuration and luminous flux of an image forming optical system according to Example 10.

FIG. 27 shows a cross-sectional view of a configuration and luminous flux of the image forming optical system according to Example 10. The image forming optical system of Example 10 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two groups including the sub-group A1*a* and the sub-group A1*b*, which move along the optical axis Z by changing the mutual spacing during the adjustment. The sub-group A1*a* consists of one lens which is fourth from the magnification side. The sub-group A1*b* consists of one lens which is fifth from the magnification side. The second optical system U2 includes the second adjustment group A2 closest to the reduction side. The second adjustment group A2 consists of one lens closest to the reduction side.

The image forming optical system of Example 10 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 28:
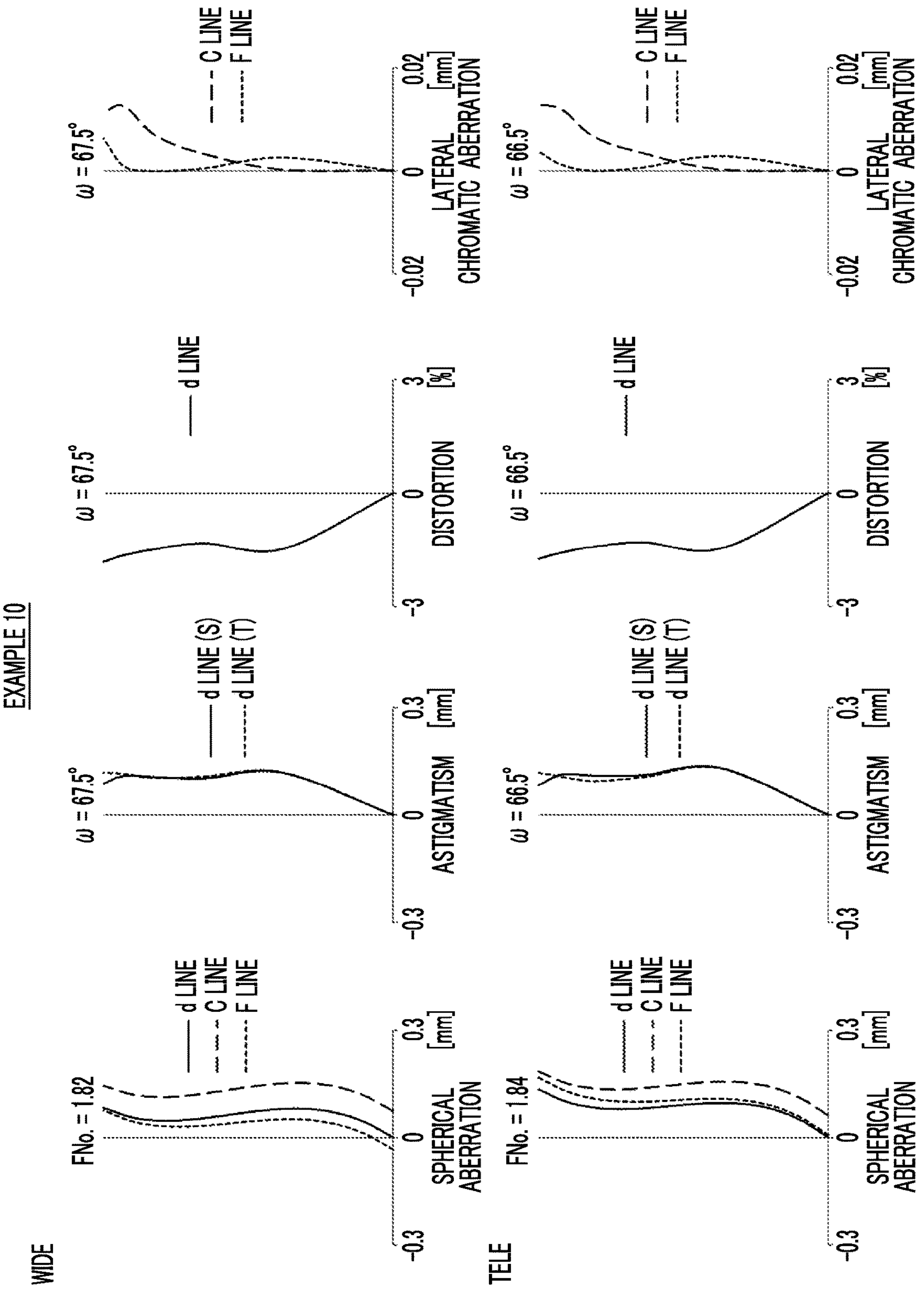
FIG. 28 is an aberration diagram of the image forming optical system according to Example 10.

Regarding the image forming optical system of Example 10, Tables 37A and 37B show basic lens data, Table 38 shows specifications and variable surface spacings, Table 39 shows aspherical coefficients, and Table 40 shows general pictures of the adjustment groups. Further, FIG. 28 shows aberration diagrams in a state where the projection distance is 1.1 meters (m).

TABLE 37A

| Example 10 | | | | |
|---|---|---|---|---|
| Sn | R | D | Nd | νd |
| *1 | −25.0155 | 5.9701 | 1.53097 | 55.61 |
| *2 | −53.6066 | 9.1218 | | |

TABLE 37A-continued

| Example 10 | | | | |
|---|---|---|---|---|
| Sn | R | D | Nd | νd |
| 3 | 105.6177 | 2.0007 | 1.88300 | 40.80 |
| 4 | 28.2469 | 8.6422 | | |
| 5 | 51.1390 | 1.5010 | 1.80400 | 46.53 |
| 6 | 24.0082 | 22.9150 | | |
| 7 | −35.4648 | 3.0841 | 1.80610 | 33.27 |
| 8 | −31.6347 | 5.1889 | | |
| 9 | −28.2604 | 8.1403 | 1.72916 | 54.68 |
| 10 | −45.2413 | 8.0159 | | |
| 11 | −34.7572 | 4.7453 | 1.61800 | 63.32 |
| 12 | −31.3637 | 0.4991 | | |
| 13 | 184.1250 | 5.0636 | 1.80809 | 22.76 |
| 14 | −216.8800 | 57.1212 | | |
| 15 | 68.6533 | 12.4922 | 1.49700 | 81.61 |
| 16 | −122.2353 | 11.2903 | | |
| 17 | 70.6152 | 13.8723 | 1.60311 | 60.64 |
| 18 | −54.6799 | 1.4006 | 1.84666 | 23.78 |
| 19 | 38.5671 | 13.8030 | 1.49700 | 81.61 |
| 20 | −134.8793 | 17.5930 | | |
| *21 | −72.9620 | 8.0041 | 1.51633 | 64.06 |
| *22 | −50.3007 | 30.3820 | | |
| 23 | 449.8170 | 9.8601 | 1.86966 | 20.02 |
| 24 | −128.0946 | 123.2705 | | |

TABLE 37B

| Example 10 | | | | |
|---|---|---|---|---|
| Sn | R | D | Nd | νd |
| 25 | 274.7551 | 12.6576 | 1.77250 | 49.60 |
| 26 | −113.5453 | 10.0097 | | |
| 27 | −61.0427 | 12.0155 | 1.59270 | 35.31 |
| 28 | 362.3209 | 17.0005 | 1.75500 | 52.32 |
| 29 | −80.1649 | 73.7045 | | |
| 30 | −53.7827 | 3.3712 | 1.85150 | 40.78 |
| 31 | −116.6975 | DD[31] | | |
| 32 | 161.9792 | 9.9998 | 1.55032 | 75.50 |
| 33 | −90.2251 | DD[33] | | |
| 34 | −50.8432 | 1.0016 | 1.88300 | 40.80 |
| 35 | 91.0694 | 0.0794 | | |
| 36 | 94.9209 | 6.8813 | 1.52841 | 76.45 |

TABLE 37B-continued

| Example 10 | | | | |
|---|---|---|---|---|
| Sn | R | D | Nd | νd |
| 37 | −63.5831 | 0.2714 | | |
| 38 | 109.5798 | 9.1918 | 1.49700 | 81.61 |
| 39 | −61.8701 | DD[39] | | |
| 41 | 64.7913 | 7.0000 | 1.76182 | 26.52 |
| 42 | −1837.8716 | 21.0000 | | |
| 43 | ∞ | 42.8000 | 1.51633 | 64.14 |
| 44 | ∞ | 0.0414 | | |

TABLE 38

| Example 10 | | |
|---|---|---|
| | WIDE | TELE |
| Zr | 1.0 | 1.05 |
| \|f\| | 7.70 | 8.09 |
| FNo. | 1.82 | 1.84 |
| 2ω[°] | 135.0 | 133.0 |
| DD[31] | 7.16 | 2.05 |
| DD[33] | 7.85 | 9.76 |
| DD[39] | 38.19 | 41.39 |

TABLE 39

| Example 10 | | | | |
|---|---|---|---|---|
| Sn | 1 | 2 | 21 | 22 |
| KA | 1.6051738E−01 | 7.6632252E−01 | 1.0000000E+00 | 1.0000000E+00 |
| A3 | −2.7712100E−04 | 1.4073840E−05 | −2.1260454E−04 | 1.3514150E−04 |
| A4 | 1.2951561E−04 | 5.3218626E−05 | 5.0842950E−05 | 4.5338620E−05 |
| A5 | −5.2349205E−06 | 5.2044925E−07 | −2.1974764E−06 | −1.9554626E−06 |
| A6 | −5.2693892E−08 | −1.8464135E−07 | −3.1871849E−07 | −8.6957295E−08 |
| A7 | 9.2071627E−09 | 2.9908950E−09 | 4.4902416E−08 | 1.6554504E−08 |
| A8 | −1.4804846E−10 | 2.1247540E−10 | −1.2980867E−09 | −4.2915656E−10 |
| A9 | −6.3934926E−12 | −5.8128018E−12 | −9.2553954E−11 | −3.9656921E−11 |
| A10 | 2.3349135E−13 | −1.4247117E−13 | 5.2507127E−12 | 1.9963634E−12 |
| A11 | 8.5783780E−16 | 5.8089986E−15 | 1.3011090E−13 | 4.4693615E−14 |
| A12 | −1.4005856E−16 | 3.6696356E−17 | −1.1750403E−14 | −3.6675836E−15 |
| A13 | 1.1831490E−18 | −3.0504789E−18 | −4.5321796E−17 | −2.0061572E−17 |
| A14 | 3.9089640E−20 | 4.7306134E−21 | 1.3248149E−17 | 3.6349688E−18 |
| A15 | −6.7583934E−22 | 9.1173106E−22 | −4.1056393E−20 | −2.9506406E−21 |
| A16 | −3.7831167E−24 | −5.6683505E−24 | −8.4655075E−21 | −2.0414796E−21 |
| A17 | 1.4281540E−25 | −1.4039867E−25 | 4.3241068E−23 | 5.3716537E−24 |
| A18 | −3.5018362E−28 | 1.2737026E−27 | 2.8477779E−24 | 6.1481907E−25 |
| A19 | −1.1022835E−29 | 8.9976267E−30 | −9.7560710E−27 | −1.2312071E−27 |
| A20 | 7.0501919E−32 | −9.9427321E−32 | −4.2342157E−28 | −7.7793820E−29 |

TABLE 40

| Example 10 | | | |
|---|---|---|---|
| | Number of lenses | Sn | Form of moving |
| First adjustment group | 2 | 7-8<br>9-10 | moving individually |
| First adjustment group | 1 | 41-42 | — |

EXAMPLE 11

Figure 29:
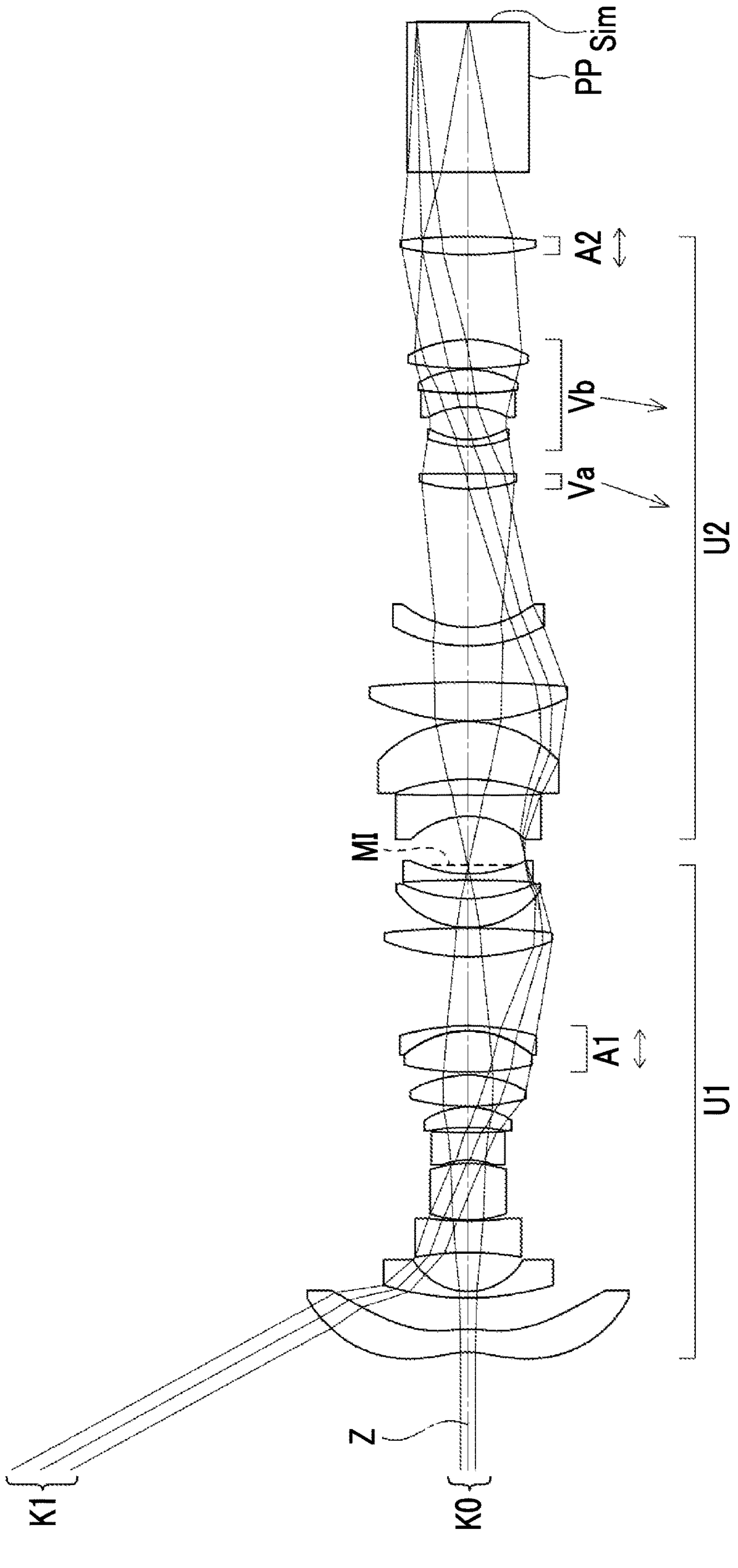
FIG. 29 is a cross-sectional view showing a configuration and luminous flux of an image forming optical system according to Example 11.

FIG. 29 shows a cross-sectional view of a configuration and luminous flux of the image forming optical system according to Example 11. The image forming optical system of Example 11 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two lenses including an eighth lens and a ninth lens from the magnification side. The two lenses of the first adjustment group A1 move integrally along the optical axis Z during the adjustment. The second optical system U2 includes the second adjustment group A2 closest to the reduction side. The second adjustment group A2 consists of one lens closest to the reduction side.

The image forming optical system of Example 11 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 30:
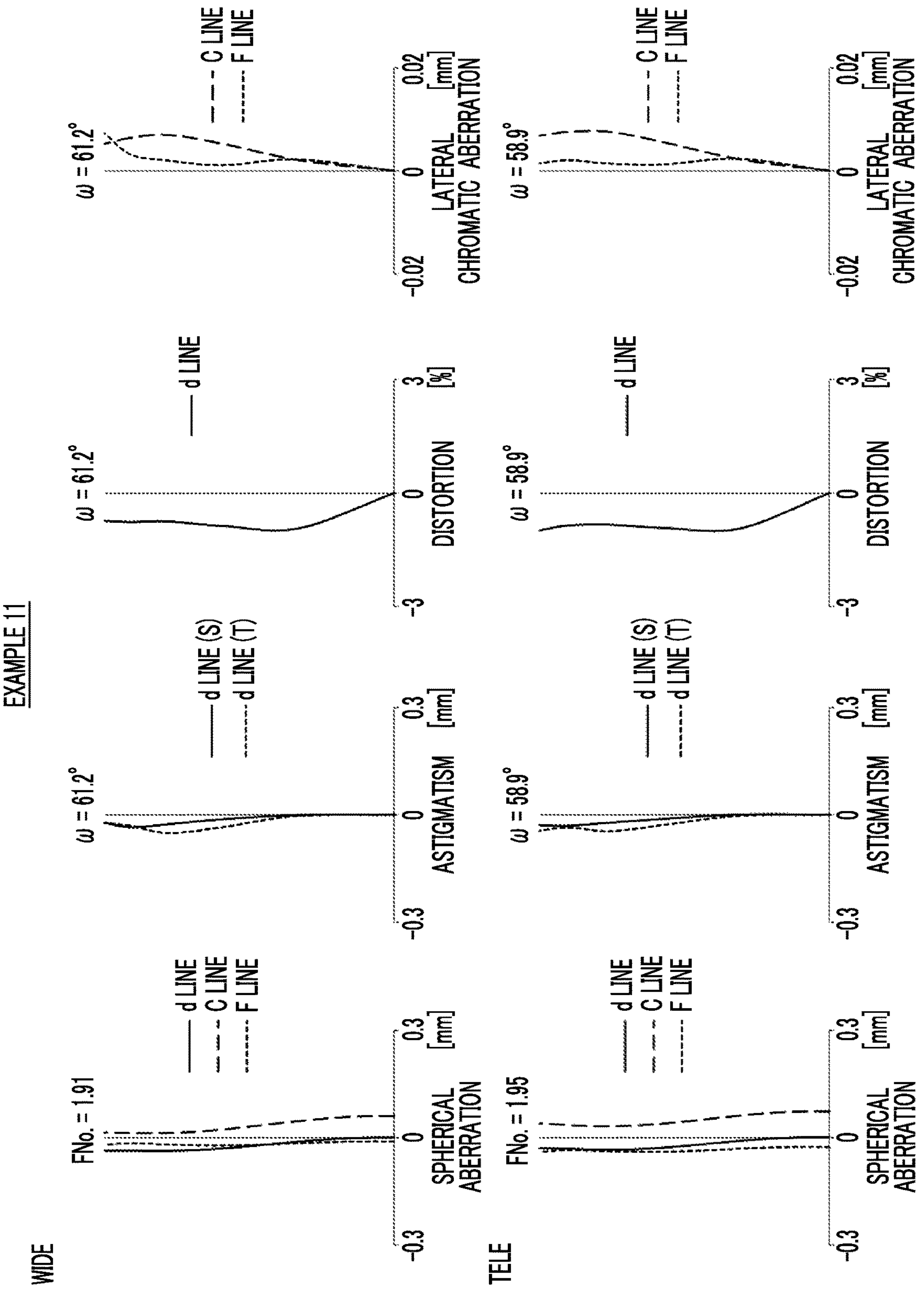
FIG. 30 is an aberration diagram of the image forming optical system according to Example 11.

Regarding the image forming optical system of Example 11, Tables 41A and 41B show basic lens data, Table 42 shows specifications and variable surface spacings, Table 43 shows aspherical coefficients, and Table 44 shows general pictures of the adjustment groups. Further, FIG. 30 shows aberration diagrams in a state where the projection distance is 1.5 meters (m).

TABLE 41A

Example 11

| Sn | R | D | Nd | vd |
|---|---|---|---|---|
| *1 | −22.7258 | 6.0009 | 1.53158 | 55.08 |
| *2 | −47.1762 | 8.3000 | | |
| 3 | 75.7900 | 1.6991 | 1.71299 | 53.87 |
| 4 | 16.7656 | 10.2649 | | |
| 5 | −82.3123 | 8.1701 | 1.62299 | 58.16 |
| 6 | 85.2835 | 0.1991 | | |
| 7 | 30.2415 | 15.0003 | 1.65412 | 39.68 |
| 8 | −31.2079 | 0.8874 | | |
| 9 | −18.1442 | 6.9830 | 1.84666 | 23.78 |
| 10 | 156.6196 | 1.3572 | | |
| 11 | −57.8974 | 5.3816 | 1.58913 | 61.13 |
| 12 | −20.3446 | 0.1991 | | |
| 13 | 57.4610 | 8.1936 | 1.49700 | 81.61 |
| 14 | −30.0735 | 0.8050 | | |
| 15 | 74.9371 | 10.8720 | 1.43875 | 94.66 |
| 16 | −25.4956 | 1.3504 | 1.84666 | 23.78 |
| 17 | −63.6004 | 18.1142 | | |
| 18 | 61.0765 | 7.4925 | 1.84666 | 23.78 |
| 19 | −198.9142 | 0.2010 | | |
| 20 | 23.5949 | 7.6071 | 1.83400 | 37.21 |
| 21 | 40.4314 | 4.8309 | | |
| 22 | −368.0565 | 1.7004 | 1.84666 | 23.78 |
| 23 | 34.6824 | 15.2071 | | |

TABLE 41B

Example 11

| Sn | R | D | Nd | vd |
|---|---|---|---|---|
| 24 | −21.4404 | 5.6183 | 1.58913 | 61.13 |
| 25 | 10809.9889 | 4.1602 | | |
| 26 | −52.0731 | 14.9999 | 1.84666 | 23.78 |
| 27 | −32.6922 | 0.2009 | | |
| 28 | 59.2368 | 10.2562 | 1.83481 | 42.72 |
| 29 | −268.3886 | 9.5050 | | |
| 30 | 40.1723 | 4.9997 | 1.84666 | 23.78 |

TABLE 41B-continued

Example 11

| Sn | R | D | Nd | vd |
|---|---|---|---|---|
| 31 | 27.9147 | DD[31] | | |
| 32 | 42.9280 | 4.0034 | 1.80000 | 29.84 |
| 33 | −7562.5394 | DD[33] | | |
| 34 | 28.2414 | 1.8504 | 1.84666 | 23.78 |
| 35 | 19.5348 | 8.6297 | | |
| 36 | −20.9020 | 3.4533 | 1.84666 | 23.78 |
| 37 | 90.0820 | 0.1475 | | |
| 38 | 105.6812 | 6.0633 | 1.49700 | 81.61 |
| 39 | −25.6134 | 0.2000 | | |
| 40 | 84.9085 | 7.6112 | 1.49700 | 81.61 |
| 41 | −31.8299 | DD[41] | | |
| 42 | 86.1896 | 4.7291 | 1.89286 | 20.36 |
| 43 | −170.7689 | 16.9950 | | |
| 44 | ∞ | 39.6050 | 1.51680 | 64.20 |
| 45 | ∞ | 0.2043 | | |

TABLE 42

Example 11

| | WIDE | TELE |
|---|---|---|
| Zr | 1.0 | 1.1 |
| \|f\| | 7.41 | 8.16 |
| FNo. | 1.91 | 1.95 |
| 2ω[°] | 122.4 | 117.8 |
| DD[31] | 36.28 | 29.68 |
| DD[33] | 7.18 | 9.33 |
| DD[41] | 22.29 | 26.75 |

TABLE 43

Example 11

| Sn | 1 | 2 |
|---|---|---|
| KA | 9.7738435E−02 | 1.4139603E+00 |
| A3 | −6.9289621E−04 | −4.7043161E−04 |
| A4 | 3.1438137E−04 | 2.2382019E−04 |
| A5 | −1.9236046E−05 | −8.1620931E−06 |
| A6 | 8.7611141E−09 | −5.8995902E−07 |
| A7 | 5.0395159E−08 | 5.1153437E−08 |
| A8 | −1.7544372E−09 | −3.2721031E−10 |
| A9 | −4.0610986E−11 | −8.7788497E−11 |
| A10 | 3.6005752E−12 | 2.4353250E−12 |
| A11 | −2.4666214E−14 | 6.6672038E−14 |
| A12 | −3.1458542E−15 | −3.6784656E−15 |
| A13 | 6.6412821E−17 | −1.3747543E−18 |
| A14 | 1.2161924E−18 | 2.4793391E−18 |
| A15 | −4.7849482E−20 | −2.7247247E−20 |
| A16 | −5.4827740E−23 | −7.6270198E−22 |
| A17 | 1.5596577E−23 | 1.5811217E−23 |
| A18 | −9.6121827E−26 | 4.1038804E−26 |
| A19 | −1.9744372E−27 | −2.8071111E−27 |
| A20 | 2.0322306E−29 | 1.6901228E−29 |

TABLE 44

Example 11

| | Number of lenses | Sn | Form of moving |
|---|---|---|---|
| First adjustment group | 2 | 15-17 | moving integrally |
| Second adjustment group | 1 | 42-43 | — |

EXAMPLE 12

Figure 31:
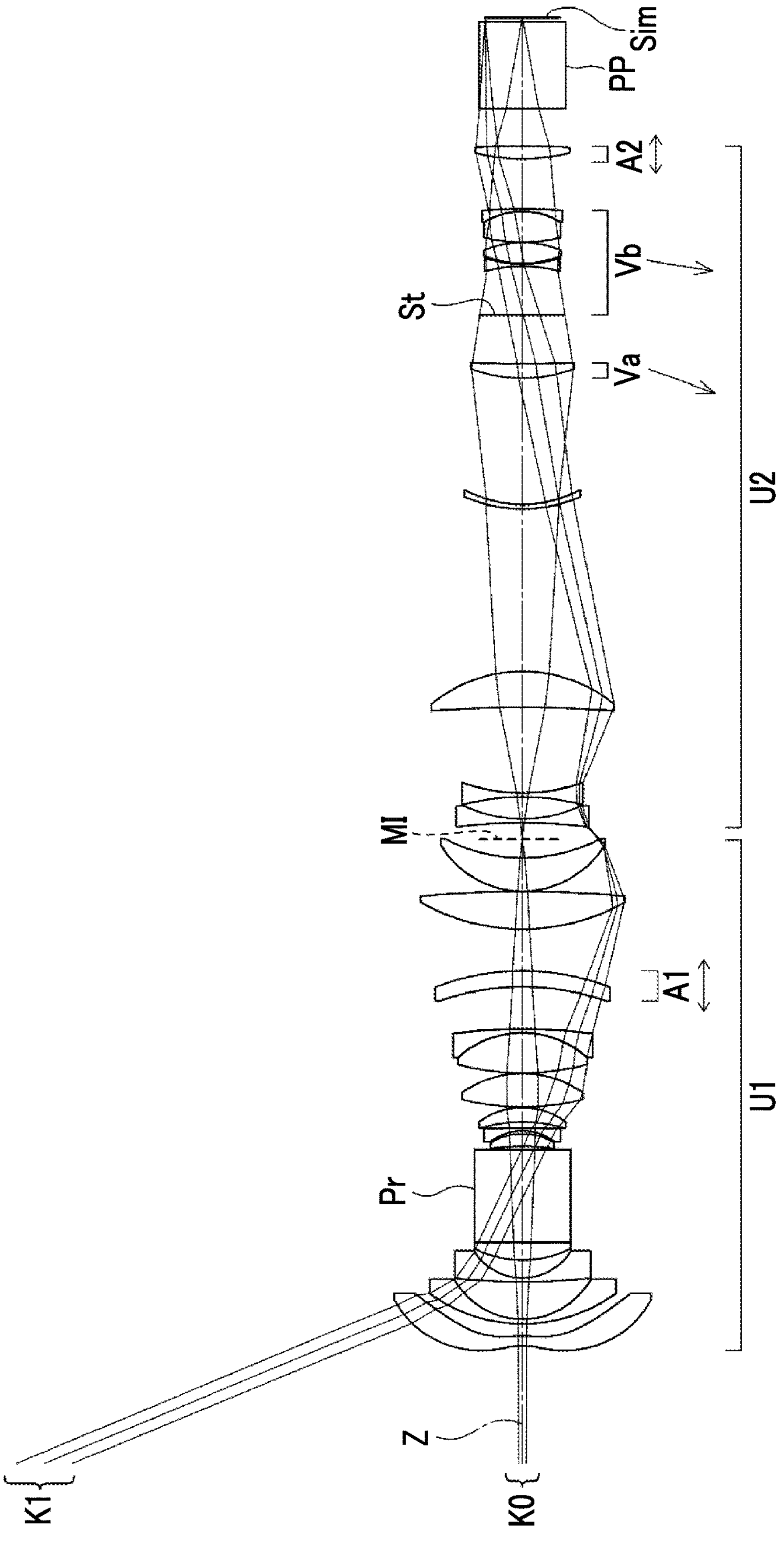
FIG. 31 is a cross-sectional view showing a configuration and luminous flux of an image forming optical system according to Example 12.

FIG. 31 shows a cross-sectional view of a configuration and luminous flux of the image forming optical system according to Example 12. The image forming optical system of Example 12 consists of, in order from the magnification side to the reduction side, the first optical system U1 and the second optical system U2 with the intermediate image MI formed in the image forming optical system and interposed between the first optical system U1 and the second optical system U2. The first optical system U1 includes a prism Pr and a plurality of lenses. The first adjustment group A1 consists of one lens which is eleventh from the magnification side in the first optical system U1. The second optical system U2 includes the second adjustment group A2 closest to the reduction side. The second adjustment group A2 consists of one lens closest to the reduction side.

The image forming optical system of Example 12 is a variable magnification optical system. During magnification change, the lens group Va and the lens group Vb in the second optical system U2 move along the optical axis Z by changing the spacing between the adjacent groups, and the other lenses remain stationary with respect to the image display surface Sim. The lens group Vb includes an aperture stop St.

Figure 32:
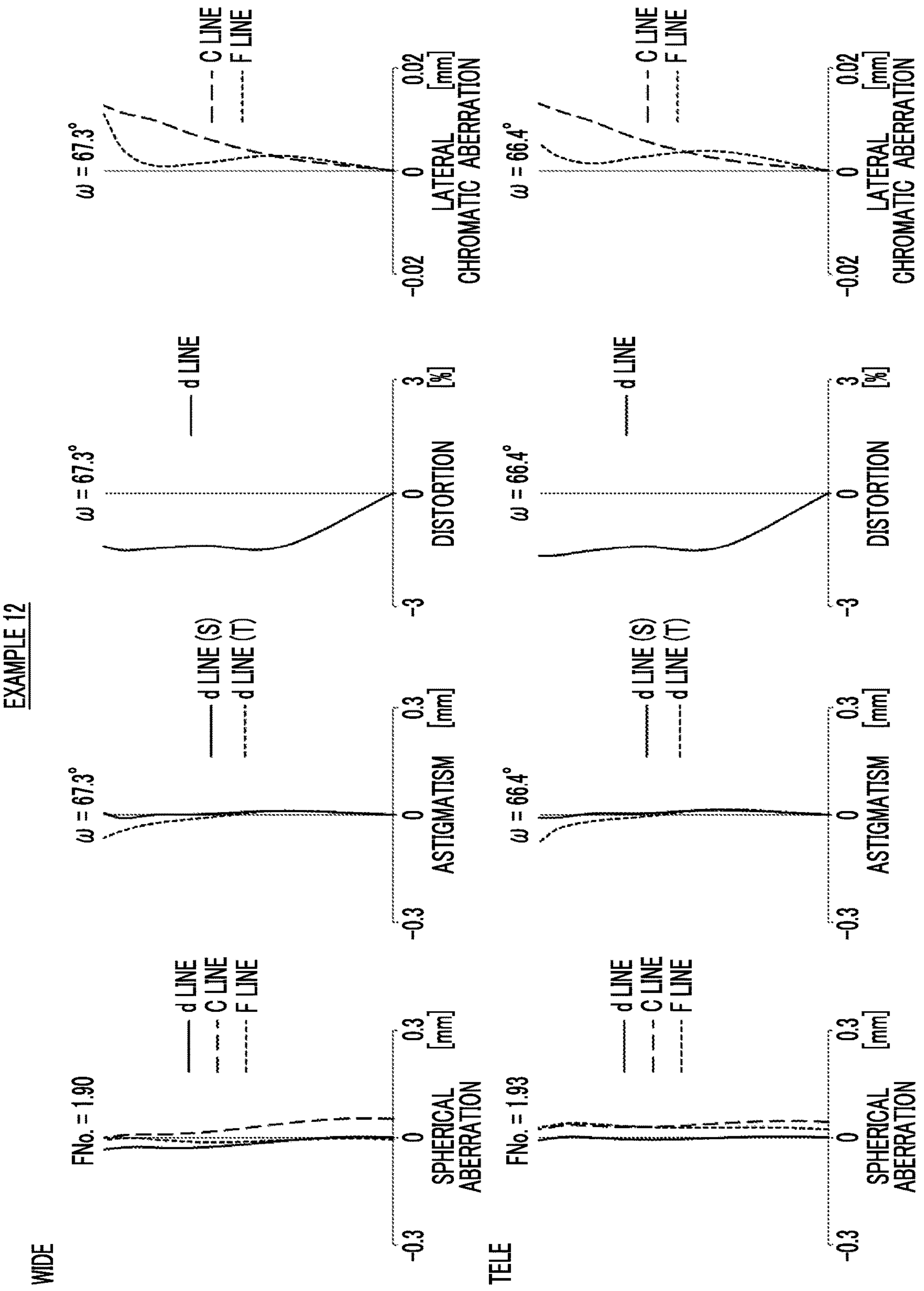
FIG. 32 is an aberration diagram of the image forming optical system according to Example 12.

Regarding the image forming optical system of Example 12, Tables 45A and 45B show basic lens data, Table 46 shows specifications and variable surface spacings, Table 47 shows aspherical coefficients, and Table 48 shows general pictures of the adjustment groups. Further, FIG. 32 shows aberration diagrams in a state where the projection distance is 1.1 meters (m).

TABLE 45A

Example 12

| Sn | R | D | Nd | νd |
|---|---|---|---|---|
| *1 | −28.7363 | 4.7831 | 1.53158 | 55.08 |
| *2 | −61.3952 | 6.0015 | | |
| 3 | 76.6756 | 2.3008 | 1.80400 | 46.58 |
| 4 | 38.2745 | 18.3639 | | |
| 5 | 318.4499 | 2.0001 | 1.62299 | 58.16 |
| 6 | 28.2362 | 8.7638 | | |
| 7 | 51.6778 | 8.5085 | 1.64769 | 33.79 |
| 8 | −12309.8934 | 0.4654 | | |
| 9 | ∞ | 45.0000 | 1.51680 | 64.20 |
| 10 | ∞ | 1.3724 | | |
| 11 | −102.9471 | 6.1165 | 1.80400 | 46.58 |
| 12 | −30.4895 | 1.4315 | | |
| 13 | −25.9713 | 1.2998 | 1.80518 | 25.46 |
| 14 | −1757.4901 | 3.1666 | | |
| 15 | −66.6462 | 7.1076 | 1.80400 | 46.58 |
| 16 | −35.3500 | 0.1993 | | |
| 17 | 115.7320 | 16.5255 | 1.49700 | 81.61 |
| 18 | −51.6615 | 0.2000 | | |
| 19 | 119.0389 | 19.9340 | 1.43875 | 94.66 |
| 20 | −47.0312 | 1.7998 | 1.84666 | 23.78 |
| 21 | −264.9301 | 20.5999 | | |
| 22 | −127.6973 | 7.7009 | 1.83481 | 42.72 |
| 23 | −119.1408 | 20.5999 | | |
| 24 | 100.9714 | 18.5738 | 1.84666 | 23.78 |
| 25 | −528.0856 | 0.2005 | | |
| 26 | 46.8342 | 16.4137 | 1.80518 | 25.46 |
| 27 | 81.8036 | 17.2384 | | |

TABLE 45B

Example 12

| Sn | R | D | Nd | νd |
|---|---|---|---|---|
| 28 | −257.3541 | 2.0007 | 1.80518 | 25.46 |
| 29 | 68.9517 | 10.7754 | | |
| 30 | −113.8172 | 2.0000 | 1.80518 | 25.46 |
| 31 | 90.1106 | 41.8599 | | |
| 32 | −533.8282 | 17.7386 | 1.80400 | 46.58 |
| 33 | −70.1595 | 79.9999 | | |
| 34 | 75.3152 | 1.9999 | 1.80518 | 25.46 |
| 35 | 59.4587 | DD[35] | | |
| 36 | 72.1212 | 7.1528 | 1.80518 | 25.46 |
| 37 | 825.3841 | DD[37] | | |
| 38(St) | ∞ | 23.8733 | | |
| 39 | −73.5725 | 1.2000 | 1.84666 | 23.78 |
| 40 | 66.3808 | 0.1994 | | |
| 41 | 54.9006 | 10.0640 | 1.49700 | 81.61 |
| 42 | −47.5628 | 0.2000 | | |
| 43 | 79.1072 | 15.1202 | 1.49700 | 81.61 |
| 44 | −35.7982 | 0.1010 | | |
| 45 | −35.4029 | 1.2005 | 1.80610 | 33.27 |
| 46 | −239.6832 | DD[46] | | |
| 47 | 90.4706 | 6.3202 | 1.92286 | 20.88 |
| 48 | −374.1162 | 18.5000 | | |
| 49 | ∞ | 42.8000 | 1.51680 | 64.20 |
| 50 | ∞ | 1.8448 | | |

TABLE 46

Example 12

| | WIDE | TELE |
|---|---|---|
| Zr | 1.0 | 1.0 |
| \|f\| | 7.72 | 8.11 |
| FNo. | 1.90 | 1.93 |
| 2ω[°] | 134.6 | 132.8 |
| DD[35] | 61.78 | 56.47 |
| DD[37] | 24.05 | 25.72 |
| DD[46] | 24.57 | 28.21 |

TABLE 47

Example 12

| Sn | 1 | 2 |
|---|---|---|
| KA | 1.2240508E−01 | 1.0018467E+00 |
| A3 | −2.4128380E−04 | −1.2198494E−05 |
| A4 | 1.1576083E−04 | 5.3291799E−05 |
| A5 | −4.7837274E−06 | 5.7925131E−07 |
| A6 | −1.4885746E−08 | −1.7824154E−07 |
| A7 | 5.9338659E−09 | 2.1410757E−09 |
| A8 | −1.0813549E−10 | 2.2932249E−10 |
| A9 | −2.6527974E−12 | −4.8531282E−12 |
| A10 | 1.0686855E−13 | −1.7798846E−13 |
| A11 | −1.6079198E−17 | 5.4117720E−15 |
| A12 | −4.4261025E−17 | 6.7191493E−17 |
| A13 | 4.2750450E−19 | −3.1829826E−18 |
| A14 | 8.6361292E−21 | −6.8375975E−21 |
| A15 | −1.5699496E−22 | 1.0586203E−21 |
| A16 | −5.1354090E−25 | −3.8253786E−24 |
| A17 | 2.4048697E−26 | −1.8372287E−25 |
| A18 | −6.6797998E−29 | 1.3001778E−27 |
| A19 | −1.4000061E−30 | 1.3176607E−29 |
| A20 | 8.3592312E−33 | −1.2367320E−31 |

TABLE 48

| Example 12 | Number of lenses | Sn |
|---|---|---|
| First adjustment group | 1 | 22-23 |
| Second adjustment group | 1 | 47-48 |

EXAMPLE 13

Figure 33:
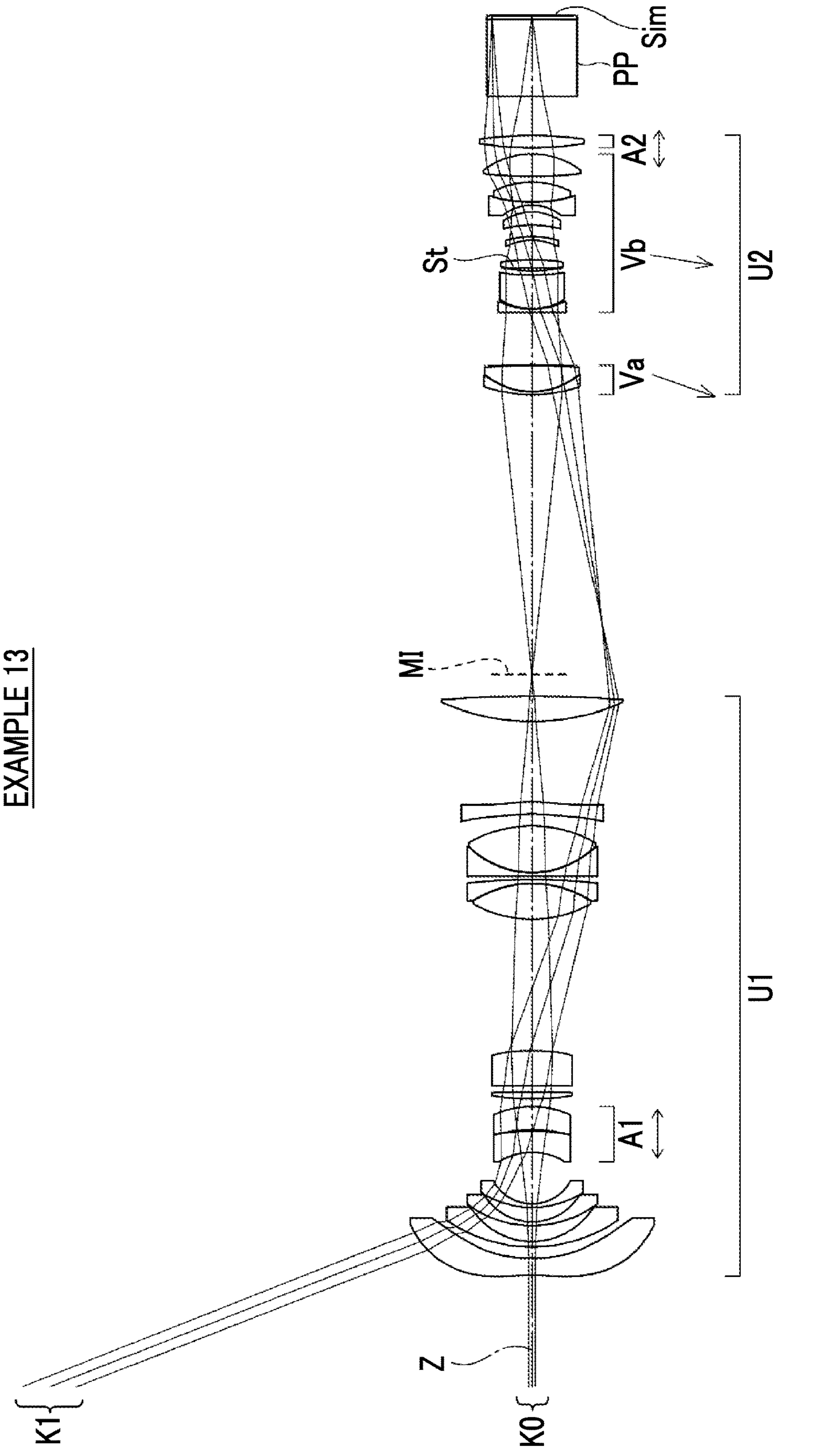
FIG. 33 is a cross-sectional view showing a configuration and luminous flux of an image forming optical system according to Example 13.

FIG. 33 shows a cross-sectional view of a configuration and luminous flux of the image forming optical system according to Example 13. The image forming optical system of Example 13 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two lenses including a fifth lens and a sixth lens from the magnification side. The two lenses of the first adjustment group A1 move integrally along the optical axis Z during the adjustment. The second optical system U2 includes the second adjustment group A2 closest to the reduction side. The second adjustment group A2 consists of one lens closest to the reduction side.

The image forming optical system of Example 13 is a variable magnification optical system. During magnification change, the lens group Va and the lens group Vb in the second optical system U2 move along the optical axis Z by changing the spacing between the adjacent groups, and the other lenses remain stationary with respect to the image display surface Sim. The lens group Vb includes an aperture stop St.

Figure 34:
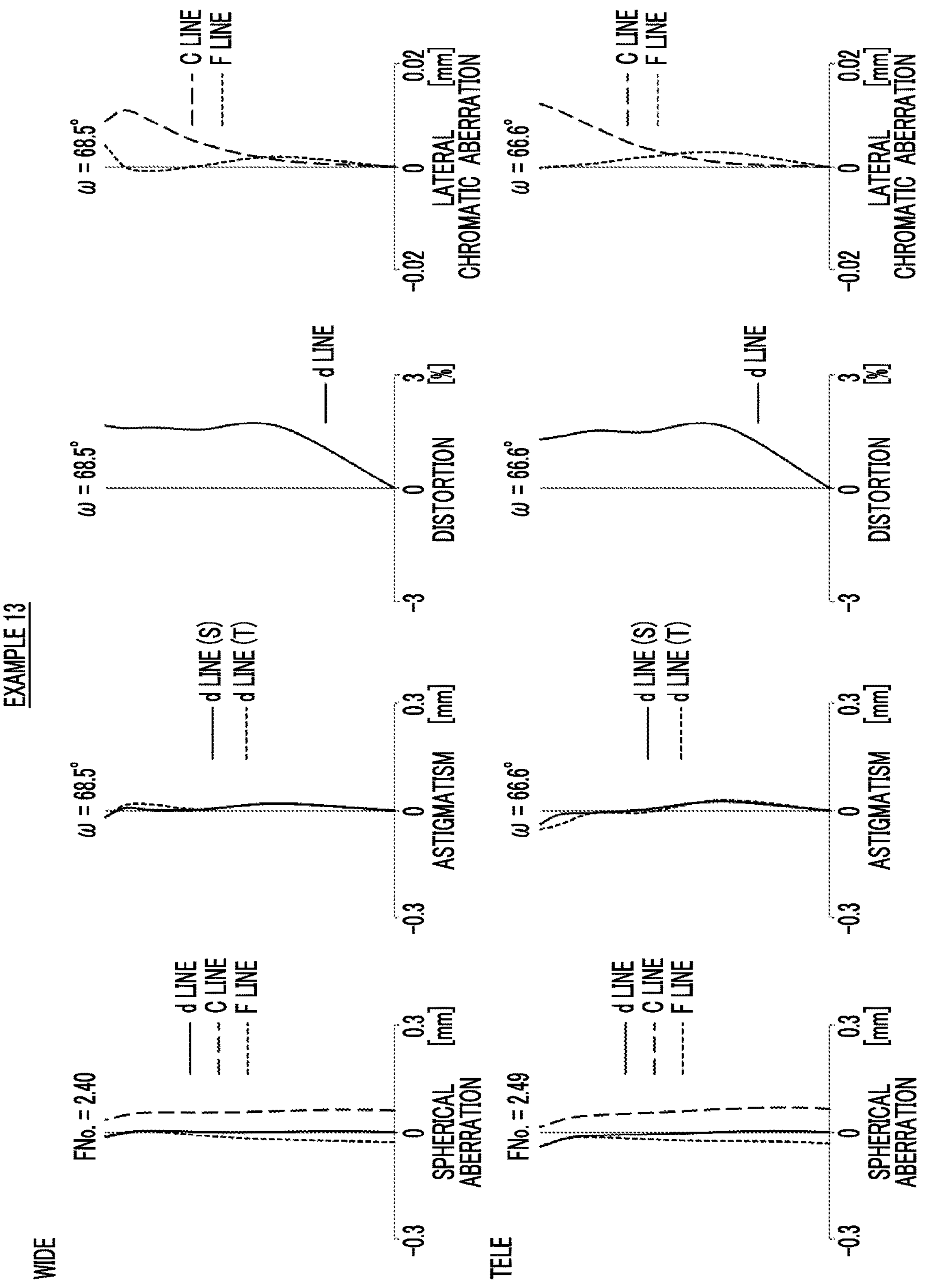
FIG. 34 is an aberration diagram of the image forming optical system according to Example 13.

Regarding the image forming optical system of Example 13, Tables 49A and 49B show basic lens data, Table 50 shows specifications and variable surface spacings, Table 51 shows aspherical coefficients, and Table 52 shows general pictures of the adjustment groups. Further, FIG. 34 shows aberration diagrams in a state where the projection distance is 0.8 meters (m).

TABLE 49A

Example 13

| Sn | R | D | Nd | νd |
|---|---|---|---|---|
| *1 | −32.5278 | 5.6000 | 1.53158 | 55.08 |
| *2 | −403.8257 | 3.5954 | | |
| 3 | 48.4465 | 1.8000 | 1.77250 | 49.60 |
| 4 | 23.3214 | 5.1653 | | |
| 5 | 35.1492 | 1.2500 | 1.84666 | 23.78 |
| 6 | 18.1194 | 4.6972 | | |
| 7 | 31.1090 | 1.1000 | 1.77250 | 49.60 |
| 8 | 14.1635 | 16.6517 | | |
| 9 | −19.9180 | 6.8585 | 1.48749 | 70.44 |
| 10 | −72.3758 | 0.4322 | | |
| 11 | −48.4240 | 7.5285 | 1.51742 | 52.43 |
| 12 | −31.0219 | 2.5325 | | |
| 13 | 85.3382 | 2.2644 | 1.80518 | 25.45 |
| 14 | −385.6206 | 1.7376 | | |
| 15 | ∞ | 11.4429 | 1.77250 | 49.60 |
| 16 | −57.8548 | 42.5973 | | |
| 17 | 38.8616 | 11.6490 | 1.49700 | 81.54 |
| 18 | −34.8465 | 1.3000 | 1.84666 | 23.78 |
| 19 | −191.5030 | 1.0032 | | |
| 20 | 16819.5477 | 1.2500 | 1.84666 | 23.78 |
| 21 | 29.2677 | 15.1802 | 1.55032 | 75.50 |

TABLE 49A-continued

Example 13

| Sn | R | D | Nd | νd |
|---|---|---|---|---|
| 22 | −41.2090 | 3.8446 | | |
| *23 | −48.5219 | 3.9996 | 1.51633 | 64.06 |
| *24 | −39.9999 | 26.1572 | | |
| 25 | 74.0952 | 7.9993 | 1.84666 | 23.78 |
| 26 | −388.5020 | DD[26] | | |

TABLE 49B

Example 13

| Sn | R | D | Nd | νd |
|---|---|---|---|---|
| 27 | 46.8502 | 1.0000 | 1.84666 | 23.78 |
| 28 | 23.7772 | 8.5100 | 1.76200 | 40.10 |
| 29 | −222.9569 | DD[29] | | |
| 30 | 2090.4549 | 1.0000 | 1.84666 | 23.78 |
| 31 | 24.3397 | 0.1612 | | |
| 32 | 20.0737 | 10.9594 | 1.48749 | 70.44 |
| 33 | 65.3789 | 1.3319 | | |
| 34 | 35.7917 | 3.6513 | 1.80518 | 25.42 |
| 35 | −66.5143 | −2.7460 | | |
| 36(St) | ∞ | 8.9180 | | |
| 37 | −18.3668 | 1.2000 | 1.77250 | 49.60 |
| 38 | −28.5145 | 3.6800 | | |
| 39 | −38.3873 | 4.3173 | 1.48749 | 70.24 |
| 40 | −16.7966 | 2.1687 | | |
| 41 | −15.4276 | 1.0000 | 1.80400 | 46.58 |
| 42 | 46.9988 | 0.0996 | | |
| 43 | 50.1547 | 6.4416 | 1.49700 | 81.54 |
| 44 | −27.8356 | 1.8910 | | |
| 45 | 141.0154 | 7.2984 | 1.49700 | 81.54 |
| 46 | −25.9496 | DD[46] | | |
| 47 | 108.8287 | 4.0047 | 1.65412 | 39.68 |
| 48 | −108.8287 | 12.7000 | | |
| 49 | ∞ | 25.0000 | 1.51633 | 64.14 |
| 50 | ∞ | 1.0500 | 1.51633 | 64.14 |
| 51 | ∞ | 0.0084 | | |

TABLE 50

Example 13

| | WIDE | TELE |
|---|---|---|
| Zr | 1.0 | 1.1 |
| \|f\| | 5.01 | 5.51 |
| FNo. | 2.40 | 2.49 |
| 2ω[°] | 137.0 | 133.2 |
| DD[26] | 97.97 | 91.42 |
| DD[29] | 17.06 | 19.30 |
| DD[46] | 2.04 | 6.35 |

TABLE 51

| Example 13 | | | | |
|---|---|---|---|---|
| Sn | 1 | 2 | 23 | 24 |
| KA | −7.6148269E−01 | −3.4882007E−02 | −1.0387550E+00 | 8.5671790E−01 |
| A3 | 1.8014080E−03 | 2.1138244E−03 | −2.8479294E−20 | −6.7397429E−21 |
| A4 | −1.0116779E−04 | −1.8918255E−04 | 5.1209362E−05 | 6.8095081E−05 |
| A5 | 1.8909553E−06 | 9.8261065E−06 | 3.2988477E−08 | −1.2878167E−06 |
| A6 | 3.2663504E−07 | −1.1167955E−07 | −1.3302072E−08 | 9.4506273E−09 |
| A7 | −3.0480053E−08 | −1.2491117E−08 | −1.6074171E−08 | 1.4612975E−08 |
| A8 | 6.9046164E−10 | 6.8074773E−11 | −7.0085836E−10 | −2.6964442E−09 |
| A9 | 4.2703302E−11 | 6.1646832E−11 | 1.3468934E−10 | −5.5195598E−11 |
| A10 | −2.7774724E−12 | −2.8028719E−12 | 2.1262782E−12 | 1.9778962E−11 |
| A11 | 1.0610461E−14 | −4.3436779E−14 | −5.2766109E−13 | 4.8329217E−14 |
| A12 | 3.2668859E−15 | 5.7217691E−15 | −1.2334888E−15 | −7.9985943E−14 |
| A13 | −7.2784457E−17 | −6.0680576E−17 | 1.1402691E−15 | 4.7572315E−16 |
| A14 | −1.5307710E−18 | −4.6549530E−18 | −4.0538079E−18 | 1.9533000E−16 |
| A15 | 6.7937597E−20 | 1.1227323E−19 | −1.3988931E−18 | −2.0504261E−18 |
| A16 | 2.4347839E−23 | 1.4127279E−21 | 8.1028512E−21 | −2.7698167E−19 |
| A17 | −2.6942451E−23 | −6.6219973E−23 | 9.1628228E−22 | 3.2810599E−21 |
| A18 | 2.0868791E−25 | 1.7144592E−25 | −5.8123085E−24 | 2.0398843E−22 |
| A19 | 4.0385228E−27 | 1.3644427E−26 | −2.4959807E−25 | −1.9045107E−24 |
| A20 | −4.9329621E−29 | −1.2901744E−28 | 1.5495162E−27 | −5.7748411E−26 |

TABLE 52

| Example 13 | | | |
|---|---|---|---|
| | Number of lenses | Sn | Form of moving |
| First adjustment group | 2 | 9-12 | moving integrally |
| Second adjustment group | 1 | 47-48 | — |

EXAMPLE 14

Figure 35:
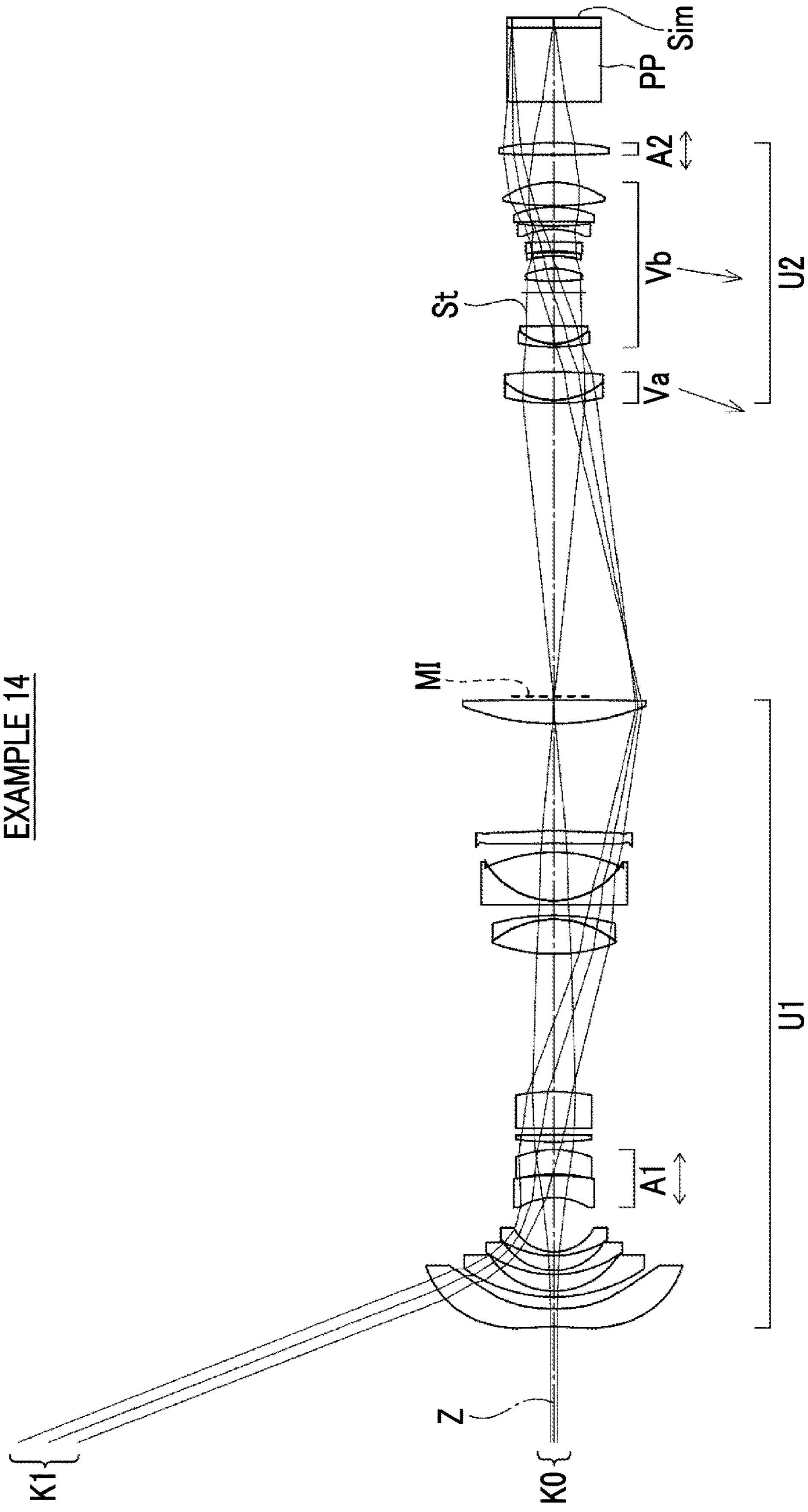
FIG. 35 is a cross-sectional view showing a configuration and luminous flux of an image forming optical system according to Example 14.

FIG. 35 shows a cross-sectional view of a configuration and luminous flux of the image forming optical system according to Example 14. The image forming optical system of Example 14 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of two lenses including a fifth lens and a sixth lens from the magnification side. The two lenses of the first adjustment group A1 move integrally along the optical axis Z during the adjustment. The second optical system U2 includes the second adjustment group A2 closest to the reduction side. The second adjustment group A2 consists of one lens closest to the reduction side.

The image forming optical system of Example 14 is a variable magnification optical system. During magnification change, the lens group Va and the lens group Vb in the second optical system U2 move along the optical axis Z by changing the spacing between the adjacent groups, and the other lenses remain stationary with respect to the image display surface Sim. The lens group Vb includes an aperture stop St.

Figure 36:
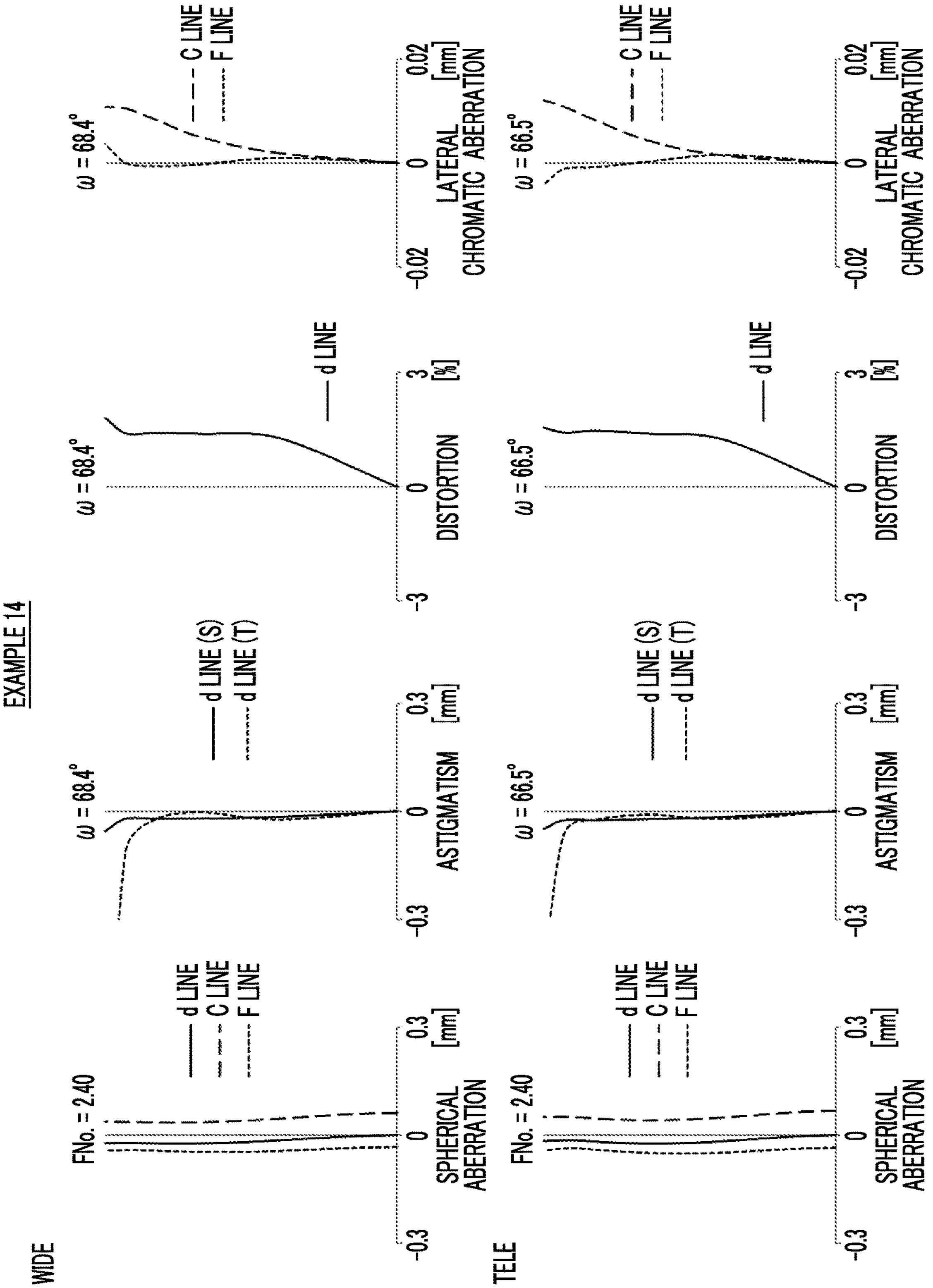
FIG. 36 is an aberration diagram of the image forming optical system according to Example 14.

Regarding the image forming optical system of Example 14, Tables 53A and 53B show basic lens data, Table 54 shows specifications and variable surface spacings, Table 55 shows aspherical coefficients, and Table 56 shows general pictures of the adjustment groups. Further, FIG. 36 shows aberration diagrams in a state where the projection distance is 0.8 meters (m).

TABLE 53A

| Example 14 | | | | |
|---|---|---|---|---|
| Sn | R | D | Nd | νd |
| *1 | −32.5278 | 5.6000 | 1.53158 | 55.08 |
| *2 | −403.8257 | 3.5954 | | |
| 3 | 48.4465 | 1.8000 | 1.77250 | 49.62 |
| 4 | 23.3214 | 5.1653 | | |
| 5 | 35.1492 | 1.2500 | 1.84666 | 23.78 |
| 6 | 18.1194 | 4.6972 | | |
| 7 | 31.1090 | 1.1000 | 1.77250 | 49.62 |
| 8 | 14.1635 | 16.7517 | | |
| 9 | −19.9180 | 6.8585 | 1.48749 | 70.44 |
| 10 | −72.3758 | 0.4322 | | |
| 11 | −48.4240 | 7.5285 | 1.51742 | 52.19 |
| 12 | −31.0219 | 2.4325 | | |
| 13 | 85.3382 | 2.2644 | 1.80518 | 25.46 |
| 14 | −385.6206 | 1.7376 | | |
| 15 | ∞ | 11.4429 | 1.77249 | 49.58 |
| 16 | −57.8548 | 42.5973 | | |
| 17 | 53.9468 | 10.7997 | 1.49700 | 81.61 |
| 18 | −29.7375 | 1.3000 | 1.84666 | 23.78 |
| 19 | −70.9783 | 3.2779 | | |
| 20 | ∞ | 1.2500 | 1.84666 | 23.78 |
| 21 | 24.7565 | 15.0202 | 1.59282 | 68.62 |
| 22 | −49.8499 | 2.7991 | | |
| *23 | −102.2553 | 4.0000 | 1.51633 | 64.06 |
| *24 | −55.2397 | 33.0467 | | |
| 25 | 74.9759 | 7.4033 | 1.92286 | 20.88 |
| 26 | −1271.2539 | DD[26] | | |

TABLE 53B

| Example 14 | | | | |
|---|---|---|---|---|
| Sn | R | D | Nd | νd |
| 27 | 70.1257 | 1.0000 | 1.92286 | 20.88 |
| 28 | 23.7435 | 8.5091 | 1.90366 | 31.31 |
| 29 | −138.7615 | DD[29] | | |
| 30 | 49.9472 | 0.9000 | 1.88300 | 40.76 |
| 31 | 15.9786 | 0.2747 | | |
| 32 | 16.5646 | 5.4096 | 1.53172 | 48.84 |
| 33 | −605.5667 | 10.3870 | | |
| 34(St) | ∞ | 3.5869 | 1.49700 | 81.61 |
| 35 | 85.7355 | 3.8000 | | |
| 36 | −23.9190 | 3.7414 | | |
| 37 | −37.9338 | 1.1957 | 1.77250 | 49.60 |
| 38 | −70.7655 | 0.4397 | | |

TABLE 53B-continued

| Example 14 | | | | |
|---|---|---|---|---|
| Sn | R | D | Nd | νd |
| 39 | −42.2353 | 2.8583 | 1.92286 | 20.88 |
| 40 | −118.8612 | 3.9127 | | |
| 41 | −21.6527 | 1.0000 | 1.90366 | 31.31 |
| 42 | 94.6650 | 1.4242 | | |
| 43 | −258.5646 | 4.4648 | 1.92286 | 20.88 |
| 44 | −32.1110 | 0.4009 | | |
| 45 | 87.2740 | 7.2983 | 1.49700 | 81.61 |
| 46 | −28.4244 | DD[46] | | |
| 47 | 301.9875 | 3.8714 | 1.90366 | 31.31 |
| 48 | −85.3603 | 12.7200 | | |
| 49 | ∞ | 23.0000 | 1.51633 | 64.14 |
| 50 | ∞ | 3.0000 | 1.48749 | 70.44 |
| 51 | ∞ | 0.0250 | | |

TABLE 54

| Example 14 | | |
|---|---|---|
| | WIDE | TELE |
| Zr | 1.0 | 1.1 |
| \|f\| | 5.01 | 5.51 |
| FNo. | 2.40 | 2.40 |
| 2ω[°] | 136.8 | 133.0 |
| DD[26] | 92.16 | 86.21 |
| DD[29] | 7.71 | 9.73 |
| DD[46] | 8.48 | 12.41 |

TABLE 55

| Example 14 | | | | |
|---|---|---|---|---|
| Sn | 1 | 2 | 23 | 24 |
| KA | −7.6148269E−01 | −3.4882007E−02 | 1.0000000E+00 | 1.0000000E+00 |
| A3 | 1.0255780E−15 | −2.2668122E−16 | −1.3850655E−19 | −1.9965248E−19 |
| A4 | 1.0776928E−03 | 1.4108492E−03 | 7.4549149E−05 | 6.9019279E−05 |
| A5 | −3.3241480E−04 | −5.1608863E−04 | −2.0844729E−06 | 4.1130489E−06 |
| A6 | 5.1521522E−05 | 9.1416396E−05 | −8.3685531E−07 | −1.6012262E−06 |
| A7 | −4.5889038E−06 | −8.9373599E−06 | 2.3156100E−08 | 2.2202164E−08 |
| A8 | 2.2633579E−07 | 4.3873503E−07 | 1.3621713E−08 | 2.1888583E−08 |
| A9 | −3.6457605E−09 | −1.1063750E−09 | −7.4103816E−10 | −1.3547728E−09 |
| A10 | −2.3544149E−10 | −1.0938230E−09 | −1.0788162E−10 | −1.1854003E−10 |
| A11 | 1.5052933E−11 | 5.1175671E−11 | 8.5805136E−12 | 1.2144178E−11 |
| A12 | −2.2888691E−13 | −2.9849639E−14 | 3.7664033E−13 | 2.2073976E−13 |
| A13 | −8.1703797E−15 | −6.9510451E−14 | −4.5380655E−14 | −4.9265815E−14 |
| A14 | 3.8747535E−16 | 1.9022515E−15 | −3.5690287E−16 | 3.1631819E−16 |
| A15 | −3.2448297E−18 | 1.6581357E−17 | 1.2304069E−16 | 1.0378352E−16 |
| A16 | −1.3415989E−19 | −1.6413962E−18 | −1.1531411E−18 | −1.9552548E−18 |
| A17 | 3.5422683E−21 | 2.0700441E−20 | −1.6719998E−19 | −1.1009017E−19 |
| A18 | −1.2435204E−23 | 3.0775244E−22 | 3.2034138E−21 | 2.8969028E−21 |
| A19 | −6.1915231E−25 | −9.9548623E−24 | 9.0460215E−23 | 4.6229143E−23 |
| A20 | 9.2895887E−27 | 7.4676146E−26 | −2.2926396E−24 | −1.4496673E−24 |
| A21 | −4.1542177E−29 | −5.0135179E−29 | | |

TABLE 56

| Example 14 | | | |
|---|---|---|---|
| | Number of lenses | Sn | Form of moving |
| First adjustment group | 2 | 9-12 | moving integrally |
| Second adjustment group | 1 | 47-48 | — |

EXAMPLE 15

Figure 37:
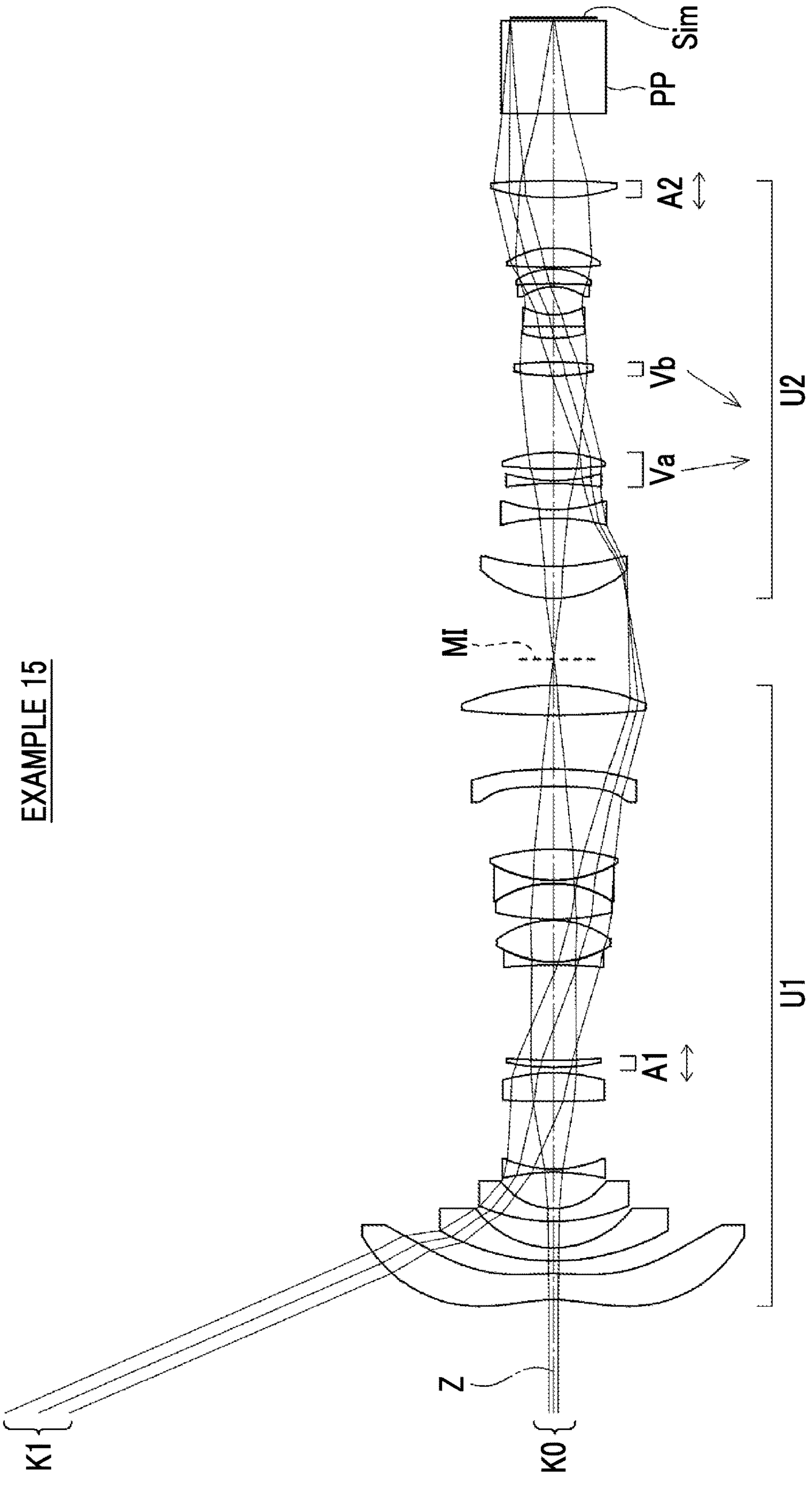
FIG. 37 is a cross-sectional view showing a configuration and luminous flux of an image forming optical system according to Example 15.

FIG. 37 shows a cross-sectional view of a configuration and luminous flux of the image forming optical system according to Example 15. The image forming optical system of Example 15 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of one lens which is sixth from the magnification side. The second optical system U2 includes the second adjustment group A2 closest to the reduction side. The second adjustment group A2 consists of one lens closest to the reduction side.

The image forming optical system of Example 15 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 38:
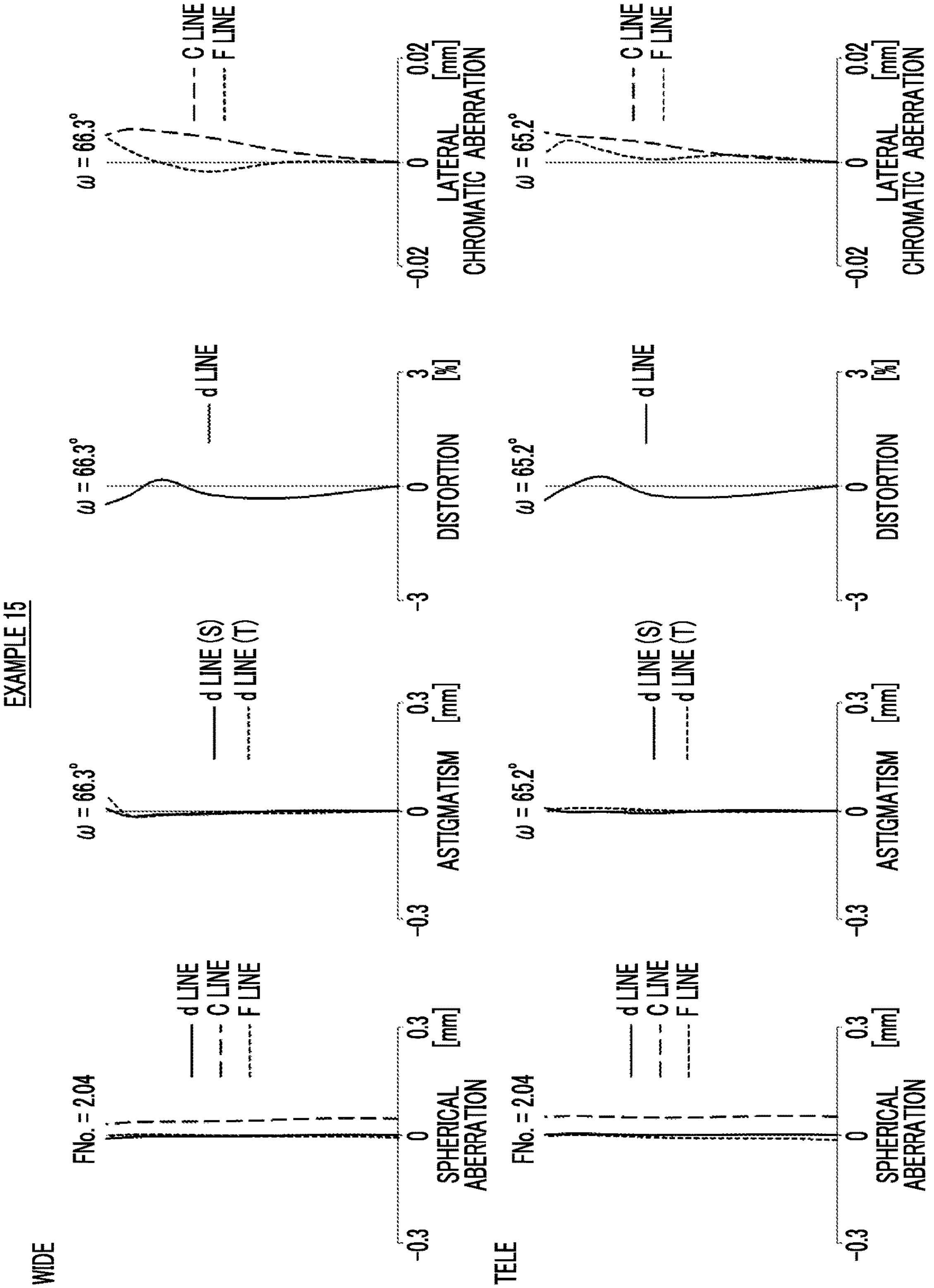
FIG. 38 is an aberration diagram of the image forming optical system according to Example 15.

Regarding the image forming optical system of Example 15, Tables 57A and 57B show basic lens data, Table 58 shows specifications and variable surface spacings, Table 59 shows aspherical coefficients, and Table 60 shows general pictures of the adjustment groups. Further, FIG. 38 shows aberration diagrams in a state where the projection distance is 0.9 meters (m).

TABLE 57A

| Example 15 | | | | |
|---|---|---|---|---|
| Sn | R | D | Nd | νd |
| *1 | −31.3204 | 7.0000 | 1.49100 | 57.58 |
| *2 | −69.1286 | 3.4332 | | |
| 3 | 61.1534 | 3.5000 | 1.69680 | 55.53 |
| 4 | 25.9784 | 7.1074 | | |
| 5 | 49.4855 | 3.5000 | 1.91082 | 35.25 |
| 6 | 17.5285 | 9.6172 | | |
| 7 | −58.0533 | 0.8009 | 1.67790 | 55.34 |
| 8 | 32.0522 | 18.0476 | | |

TABLE 57A-continued

| Example 15 | | | | |
|---|---|---|---|---|
| Sn | R | D | Nd | νd |
| 9 | 321.8716 | 7.6651 | 1.83400 | 37.16 |
| 10 | −47.9040 | 1.5154 | | |
| 11 | 62.7718 | 1.9022 | 1.89286 | 20.36 |
| 12 | 176.5886 | 25.6062 | | |
| 13 | −143.7043 | 0.8000 | 1.71736 | 29.52 |
| 14 | 29.8630 | 11.0643 | 1.49700 | 81.61 |
| 15 | −25.1370 | 0.2998 | | |
| 16 | 68.0169 | 9.6480 | 1.69680 | 55.53 |
| 17 | −27.7055 | 0.8516 | 1.80518 | 25.46 |
| 18 | 33.5432 | 8.3633 | 1.49700 | 81.61 |
| 19 | −58.4768 | 16.8635 | | |
| *20 | −131.3795 | 4.7000 | 1.49100 | 57.58 |
| *21 | −65.6855 | 14.3544 | | |
| 22 | 225.1543 | 8.0451 | 1.80518 | 25.46 |
| 23 | −63.4897 | 23.3939 | | |

TABLE 57B

| Example 15 | | | | |
|---|---|---|---|---|
| Sn | R | D | Nd | νd |
| 24 | 28.8232 | 8.6048 | 1.80518 | 25.46 |
| 25 | 62.8979 | 12.9410 | | |
| 26 | −56.2359 | 2.2889 | 1.51742 | 52.43 |
| 27 | 39.2703 | DD[27] | | |
| 28 | −88.9371 | 0.8000 | 1.51633 | 64.14 |
| 29 | 44.2548 | 3.1501 | | |
| 30 | 119.6722 | 4.4866 | 1.80400 | 46.58 |
| 31 | −39.0911 | DD[31] | | |
| 32 | 57.4720 | 3.4255 | 1.59282 | 68.62 |
| 33 | −98.8181 | DD[33] | | |
| 34 | 27.9591 | 6.3499 | 1.53172 | 48.84 |
| 35 | 17.0655 | 7.5263 | | |
| 36 | −14.1708 | 0.8004 | 1.80518 | 25.46 |
| 37 | −153.6219 | 3.9893 | 1.59282 | 68.62 |
| 38 | −18.0996 | 0.4698 | | |
| 39 | 231.2852 | 5.0280 | 1.49700 | 81.61 |
| 40 | −23.8103 | 13.5088 | | |
| 41 | 56.5133 | 4.6204 | 1.92286 | 20.88 |
| 42 | −221.6457 | 18.0000 | | |
| 43 | ∞ | 25.0000 | 1.51633 | 64.14 |
| 44 | ∞ | 0.7901 | | |

TABLE 58

| Example 15 | | |
|---|---|---|
| | WIDE | TELE |
| Zr | 1.0 | 1.05 |
| \|f\| | 5.10 | 5.35 |
| FNo. | 2.04 | 2.04 |
| 2ω[°] | 132.6 | 130.4 |
| DD[27] | 6.90 | 7.98 |
| DD[31] | 20.60 | 16.05 |
| DD[33] | 6.43 | 9.91 |

TABLE 59

| Example 15 | | | | |
|---|---|---|---|---|
| Sn | 1 | 2 | 20 | 21 |
| KA | −2.1926668E−01 | 1.4999999E+01 | −1.3173453E+01 | −9.9448103E+00 |
| A3 | 5.0626707E−04 | 8.8072819E−04 | −1.9339387E−05 | −2.0392881E−05 |
| A4 | 1.6103375E−05 | −1.3897599E−04 | 4.8772739E−05 | 6.2310992E−05 |
| A5 | −1.0072710E−06 | 2.6709176E−05 | −5.9439168E−06 | −2.5909988E−06 |
| A6 | 1.3222393E−08 | −3.5617157E−06 | 4.9262414E−07 | −3.2036850E−07 |
| A7 | 3.4737245E−10 | 3.3040648E−07 | −9.3079642E−08 | 2.9396419E−08 |
| A8 | −1.2209684E−11 | −2.1806072E−08 | 1.0360664E−08 | −1.5502355E−09 |
| A9 | 1.2071604E−14 | 1.0429808E−09 | −5.5165077E−10 | 8.3753978E−11 |
| A10 | 4.6743246E−15 | −3.6571592E−11 | 7.6986592E−12 | −2.7933783E−12 |
| A11 | −6.0606541E−17 | 9.4105102E−13 | 3.3623293E−13 | 1.1632538E−14 |
| A12 | −5.6706833E−19 | −1.7565399E−14 | 1.6648540E−14 | 2.1671925E−16 |
| A13 | 1.7763175E−20 | 2.3130647E−16 | −2.9138561E−15 | 1.3966919E−16 |
| A14 | −5.1171832E−23 | −2.0358949E−18 | 1.1441300E−16 | −7.0853547E−18 |
| A15 | −1.6175591E−24 | 1.0741641E−20 | −1.6755216E−18 | 1.3092978E−19 |
| A16 | 1.2272530E−26 | −2.5676738E−23 | 5.5284488E−21 | −9.2752891E−22 |

TABLE 60

| Example 15 | | |
|---|---|---|
| | Number of lenses | Sn |
| First adjustment group | 1 | 11-12 |
| Second adjustment group | 1 | 41-42 |

EXAMPLE 16

Figure 39:
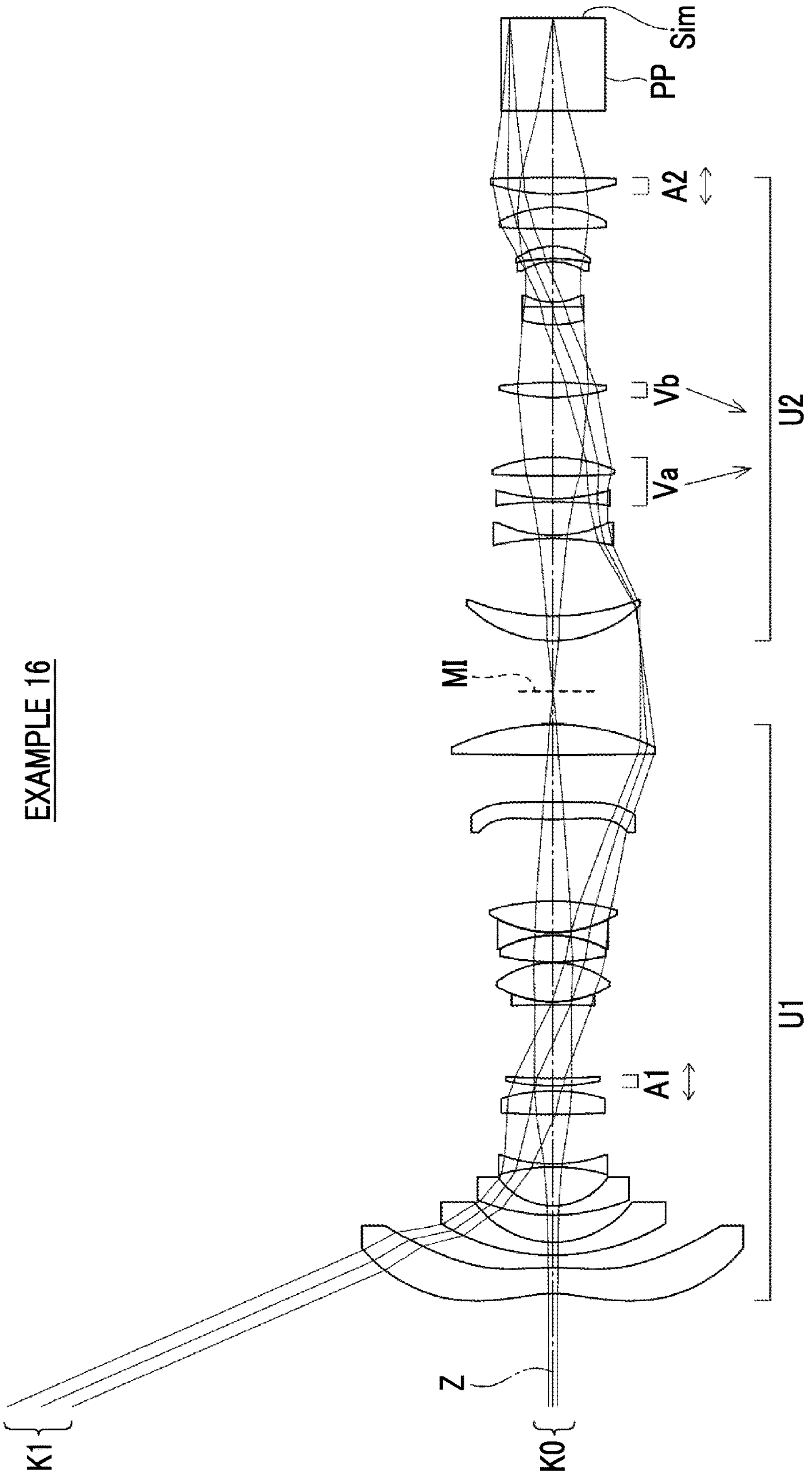
FIG. 39 is a cross-sectional view showing a configuration and luminous flux of an image forming optical system according to Example 16.

FIG. 39 shows a cross-sectional view of a configuration and luminous flux of the image forming optical system according to Example 16. The image forming optical system of Example 16 consists of, in order from the magnification side to the reduction side, the first optical system U1 and the second optical system U2 with the intermediate image MI formed in the image forming optical system and interposed between the first optical system U1 and the second optical system U2. The first optical system U1 includes the first adjustment group A1. The first adjustment group A1 consists of one lens which is sixth from the magnification side. The second optical system U2 includes the second adjustment group A2 closest to the reduction side. The second adjustment group A2 consists of one lens closest to the reduction side.

The image forming optical system of Example 16 is a variable magnification optical system. During magnification change, the lens group Va and the lens group Vb in the second optical system U2 move along the optical axis Z by changing the spacing between the adjacent groups, and the other lenses remain stationary with respect to the image display surface Sim.

Figure 40:
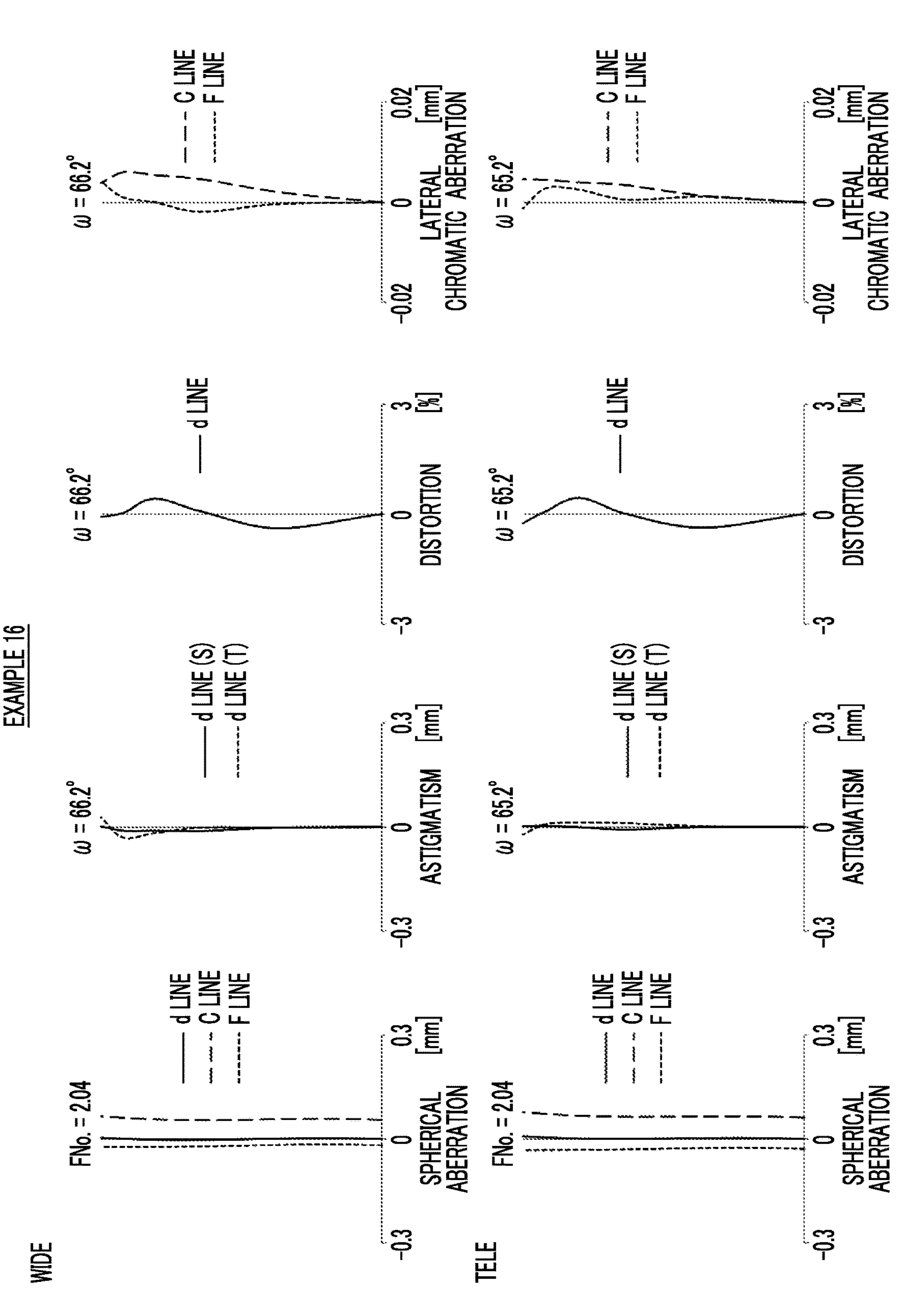
FIG. 40 is an aberration diagram of the image forming optical system according to Example 16.

Regarding the image forming optical system of Example 16, Tables 61A and 61B show basic lens data, Table 62 shows specifications and variable surface spacings, Table 63 shows aspherical coefficients, and Table 64 shows general pictures of the adjustment groups. Further, FIG. 40 shows aberration diagrams in a state where the projection distance is 0.9 meters (m).

TABLE 61A

Example 16

| Sn | R | D | Nd | νd |
|---|---|---|---|---|
| *1 | −31.2500 | 7.0000 | 1.49100 | 57.58 |
| *2 | −60.5243 | 3.3342 | | |
| 3 | 57.2526 | 3.5000 | 1.69680 | 55.53 |
| 4 | 25.9802 | 7.3721 | | |
| 5 | 52.7212 | 2.4998 | 1.91082 | 35.25 |
| 6 | 18.2958 | 10.3474 | | |
| 7 | −51.1827 | 0.7998 | 1.67790 | 55.34 |
| 8 | 42.1458 | 13.3400 | | |
| 9 | 262.3680 | 6.1631 | 1.83400 | 37.16 |
| 10 | −46.1876 | 1.3633 | | |
| 11 | 62.4199 | 2.0755 | 1.89286 | 20.36 |
| 12 | 215.7523 | 19.7975 | | |
| 13 | −175.0287 | 0.8003 | 1.71736 | 29.52 |
| 14 | 29.5175 | 10.5101 | 1.49700 | 81.61 |
| 15 | −24.9812 | 0.3008 | | |
| 16 | 73.1877 | 6.9755 | 1.69680 | 55.53 |
| 17 | −29.5090 | 0.8007 | 1.80518 | 25.46 |
| 18 | 32.8448 | 8.4583 | 1.49700 | 81.61 |
| 19 | −58.2748 | 22.0183 | | |
| *20 | 150.3992 | 4.7000 | 1.49100 | 57.58 |
| *21 | −179.0927 | 12.7026 | | |
| 22 | 1199.4971 | 8.2253 | 1.92286 | 20.88 |
| 23 | −63.0372 | 22.4528 | | |

TABLE 61B

Example 16

| Sn | R | D | Nd | νd |
|---|---|---|---|---|
| 24 | 32.9753 | 6.6604 | 1.91082 | 35.25 |
| 25 | 61.2659 | 20.9687 | | |
| 26 | −66.2652 | 0.8416 | 1.51742 | 52.43 |
| 27 | 34.6021 | DD[27] | | |
| 28 | −105.5662 | 0.8010 | 1.51633 | 64.14 |
| 29 | 52.2031 | 5.9689 | | |
| 30 | 275.2636 | 5.0528 | 1.80400 | 46.58 |
| 31 | −42.4432 | DD[31] | | |
| 32 | 51.6332 | 4.0647 | 1.59282 | 68.62 |
| 33 | −103.6742 | DD[33] | | |
| 34 | 28.4045 | 6.0965 | 1.51680 | 64.20 |
| 35 | 16.7942 | 10.8938 | | |
| 36 | −15.0469 | 0.8008 | 1.80518 | 25.46 |
| 37 | −49.6173 | 3.1805 | 1.59282 | 68.62 |
| 38 | −17.8470 | 4.7162 | | |
| 39 | 263.3946 | 5.8253 | 1.49700 | 81.61 |
| 40 | −28.7720 | 3.6282 | | |
| 41 | 53.7547 | 4.4221 | 1.91082 | 35.25 |
| 42 | −460.5440 | 18.0000 | | |
| 43 | ∞ | 25.0000 | 1.51633 | 64.14 |
| 44 | ∞ | 0.0200 | | |

TABLE 62

Example 16

| | WIDE | TELE |
|---|---|---|
| Zr | 1.0 | 1.05 |
| \|f\| | 5.10 | 5.35 |
| FNo. | 2.04 | 2.04 |
| 2ω[°] | 132.4 | 130.4 |
| DD[27] | 9.04 | 9.68 |
| DD[31] | 16.19 | 12.36 |
| DD[33] | 15.32 | 18.51 |

TABLE 63

Example 16

| Sn | 1 | 2 | 20 | 21 |
|---|---|---|---|---|
| KA | −4.1727314E−01 | −1.5000000E+01 | −1.4999997E+01 | 9.9999121E−01 |
| A3 | 4.6697540E−04 | 8.4661077E−04 | −6.3733112E−05 | −7.7958205E−05 |
| A4 | 1.6361657E−05 | −1.3911943E−04 | 4.7722164E−05 | 6.9100520E−05 |
| A5 | −1.0104847E−06 | 2.6708880E−05 | −5.9873888E−06 | −2.9625159E−06 |
| A6 | 1.3071561E−08 | −3.5617152E−06 | 4.8717940E−07 | −3.2924594E−07 |
| A7 | 3.4471561E−10 | 3.3040664E−07 | −9.3157555E−08 | 2.9349275E−08 |
| A8 | −1.2164780E−11 | −2.1805993E−08 | 1.0356460E−08 | −1.5510016E−09 |
| A9 | 1.2927255E−14 | 1.0429844E−09 | −5.5251514E−10 | 8.3898520E−11 |
| A10 | 4.6690553E−15 | −3.6571572E−11 | 7.6856375E−12 | −2.7988926E−12 |
| A11 | −6.0718403E−17 | 9.4105103E−13 | 3.3609751E−13 | 1.1573337E−14 |
| A12 | −5.6997316E−19 | −1.7565437E−14 | 1.6649210E−14 | 2.1561646E−16 |
| A13 | 1.7722470E−20 | 2.3130630E−16 | −2.9138558E−15 | 1.3965491E−16 |
| A14 | −5.1400100E−23 | −2.0358965E−18 | 1.1441536E−16 | −7.0854215E−18 |
| A15 | −1.6130391E−24 | 1.0741730E−20 | −1.6755342E−18 | 1.3092873E−19 |
| A16 | 1.2665671E−26 | −2.5675701E−23 | 5.3951048E−21 | −9.2754041E−22 |

TABLE 64

| Example 16 | | |
|---|---|---|
| | Number of lenses | Sn |
| First adjustment group | 1 | 11-12 |
| Second adjustment group | 1 | 41-42 |

In the above description, the image forming optical system in which the optical path is deflected has been described with reference to the drawings as modification examples of Examples 1 and 2. Although not shown, the configurations of the modification examples can be made in the same manner for the other examples. For example, in a similar manner to the modification example of Example 1, it is possible to make a configuration of a modification example in which the optical path is deflected by disposing the mirror inside the image forming optical system of Examples 5, 6, 7, 8, 9, 10, 13, and 14. Further, by substituting the prism Pr of the image forming optical system of Examples 4 and 12 with a prism having a reflective surface provided therein, it is possible to make the configuration of the modification example in which the optical path is deflected.

Table 65 shows the corresponding values of Conditional Expressions (1) to (5) of the image forming optical system of Examples 1 to 16. Table 65 shows values in a case where the d line is used as a reference. Preferable ranges of the conditional expressions may be set by using the corresponding values of the examples shown in Table 65 as the upper limits or the lower limits of the conditional expressions.

It is necessary for a projection image forming optical system used in a projection type display device to have favorable aberration correction in accordance with a resolution of the light valve of the projection type display device. Further, from the viewpoint of improving the degree of freedom in setting the distance to the screen and installing in an indoor space, there is also a growing demand for an image forming optical system having high optical performance in which a wider angle of view is ensured and various aberrations are satisfactorily corrected. On the other hand, in order to cope with an increase in brightness of the projection type display device, an interchangeable lens system in which the image forming optical system is exchanged depending on the application is also widely used. However, in a system using the interchangeable lens system, in a case where an increase in angle of view of the image forming optical system is achieved, the effect on the optical performance due to the variation in the mounting surface cannot be ignored. Therefore, various adjustment mechanisms such as correction of field curvature and focus adjustment are required for the image forming optical system. On the other hand, the image forming optical systems of Examples 1 to 16 described above have two types of adjustment groups, and various aberrations caused by an increase in angle of view are satisfactorily corrected while a sufficiently wide angle of view is ensured. Thus, it is possible to meet the above-mentioned demands.

Figure 41:
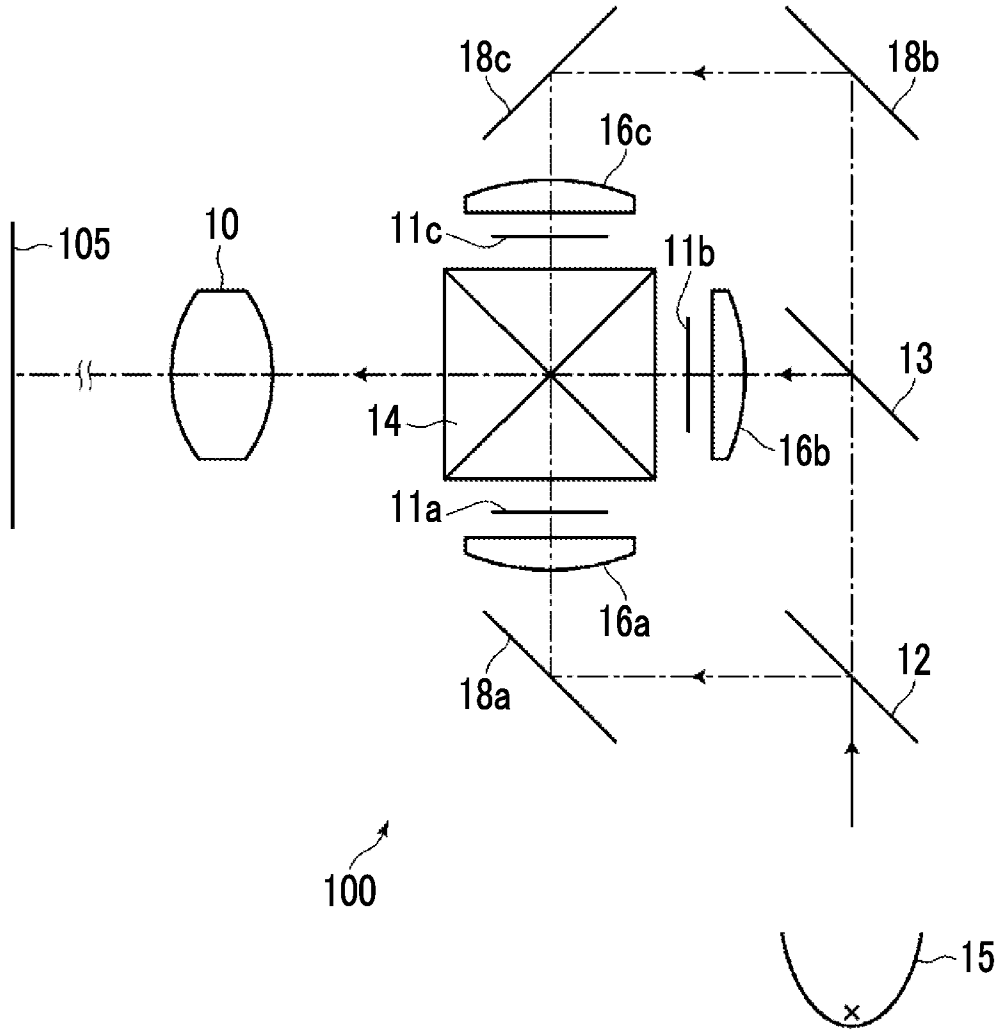
FIG. 41 is a schematic configuration diagram of a projection type display device according to an embodiment.

Next, a projection type display device according to an embodiment of the present disclosure will be described. FIG. 41 is a schematic configuration diagram of a projection

TABLE 65

| Expression number | | Example 1 | Example 2 | Example 3 | Example 4 | Example 5 | Example 6 |
|---|---|---|---|---|---|---|---|
| (1) | νp | 17.98 | 17.98 | 20.36 | 22.73 | 58.40 | 44.90 |
| (2) | $\|f1/f2\|$ | 3.5 | 3.6 | 4.5 | 21.1 | 1.6 | 1.6 |
| (3) | $\|\{(1-\beta1^2) \times \beta1r^2\}/(1-\beta2^2)\|$ | 0.08 | 0.06 | 0.07 | 0.00 | 0.10 | 0.11 |
| (4) | $fU1/\|fw\|$ | 1.9 | 1.7 | 1.2 | 2.1 | 2.0 | 1.9 |
| (5) | $Bfw/\|fw\|$ | 6.4 | 6.4 | 5.8 | 6.3 | 6.0 | 6.0 |

| Expression number | | Example 7 | Example 8 | Example 9 | Example 10 | Example 11 | Example 12 |
|---|---|---|---|---|---|---|---|
| (1) | νp | 23.78 | 25.46 | 17.98 | 26.52 | 20.36 | 20.88 |
| (2) | $\|f1/f2\|$ | 1.6 | 1.5 | 3.3 | 2.7 | 4.6 | 19.0 |
| (3) | $\|\{(1-\beta1^2) \times \beta1r^2\}/(1-\beta2^2)\|$ | 0.34 | 0.31 | 0.08 | 0.08 | 0.07 | 0.00 |
| (4) | $fU1/\|fw\|$ | 1.7 | 1.9 | 1.9 | 1.9 | 1.2 | 2.1 |
| (5) | $Bfw/\|fw\|$ | 7.2 | 6.9 | 6.4 | 6.4 | 5.8 | 6.3 |

| Expression number | | Example 13 | Example 14 | Example 15 | Example 16 |
|---|---|---|---|---|---|
| (1) | νp | 31.31 | 39.68 | 20.88 | 35.25 |
| (2) | $\|f1/f2\|$ | 1.7 | 1.5 | 2.2 | 1.8 |
| (3) | $\|\{(1-\beta1^2) \times \beta1r^2\}/(1-\beta2^2)\|$ | 0.10 | 0.11 | 0.03 | 0.04 |
| (4) | $fU1/\|fw\|$ | 2.0 | 1.9 | 1.9 | 2.2 |
| (5) | $Bfw/\|fw\|$ | 6.0 | 6.0 | 6.9 | 6.8 |

The image forming optical systems of Examples 1 to 16 have a first adjustment group A1 and a second adjustment group A2, and various adjustments can be made. Further, the image forming optical systems of Examples 1 to 16 have a maximum total angle of view of 120 degrees or more. Thus, it is possible to achieve high optical performance by satisfactorily correcting aberrations while achieving an increase in angle of view.

type display device according to an embodiment of the present disclosure. The projection type display device 100 shown in FIG. 41 has an image forming optical system 10 according to an embodiment of the present disclosure, a light source 15, and transmissive display elements 11*a* to 11*c* as light valves corresponding to each color light and outputting an optical image. Further, the projection type display device 100 has dichroic mirrors 12 and 13 for color separation, cross dichroic prisms 14 for color synthesis, condenser lenses 16_a_ to 16_c_, and total reflection mirrors 18_a_ to 18_c_ for deflecting an optical path. In addition, FIG. 41 schematically shows the image forming optical system 10. Furthermore, an integrator is disposed between the light source 15 and the dichroic mirror 12, but is not shown in FIG. 41.

White light originating from the light source 15 is separated into ray with three colors (blue light, green light, and red light) through the dichroic mirrors 12 and 13. Thereafter, the ray respectively pass through the condenser lenses 16_a_ to 16_c_, are incident into and modulated through the transmissive display elements 11_a_ to 11_c_ respectively corresponding to the ray with the respective colors, are subjected to color synthesis through the cross dichroic prism 14, and are subsequently incident into the image forming optical system 10. The image forming optical system 10 projects an optical image, which is based on the modulated light modulated through the transmissive display elements 11_a_ to 11_c_, onto a screen 105.

Figure 42:
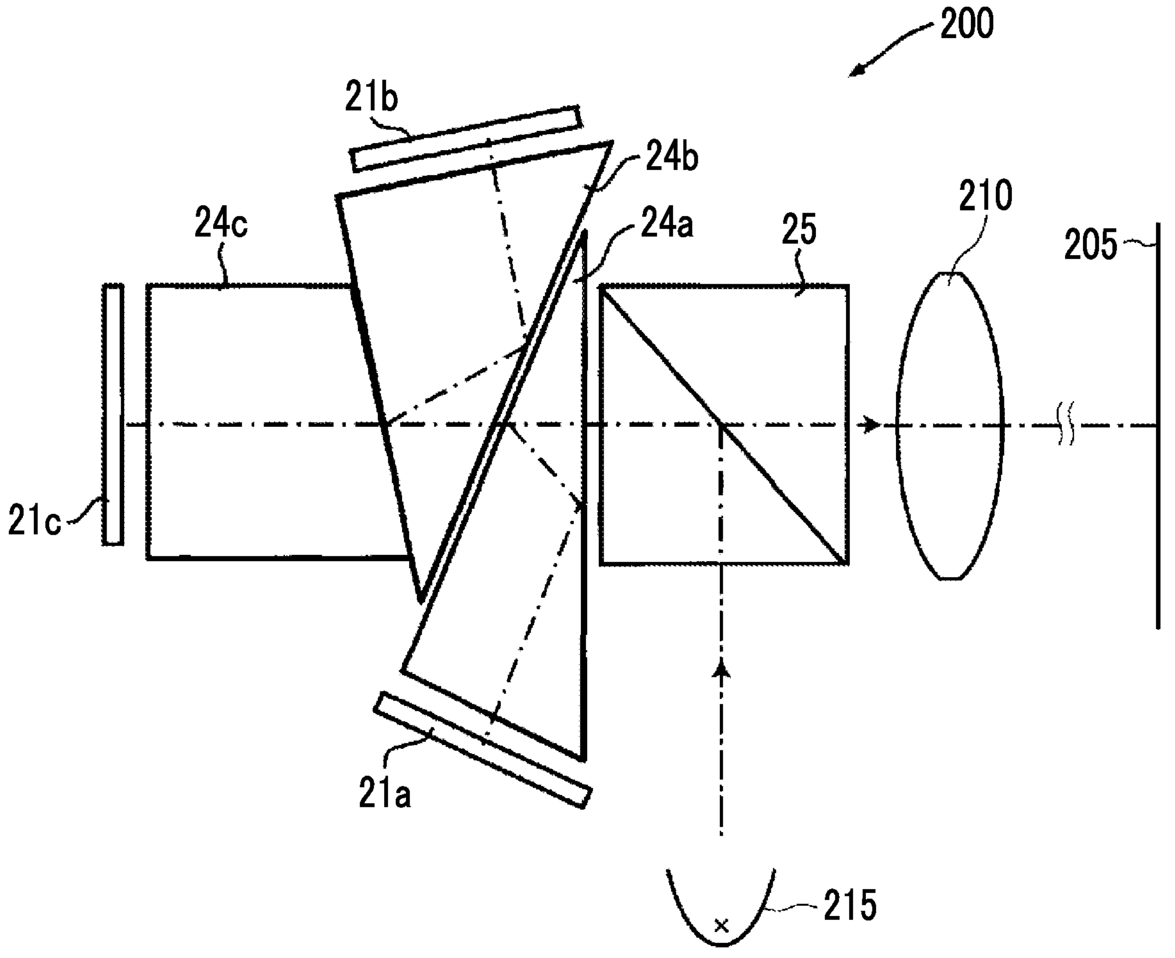
FIG. 42 is a schematic configuration diagram of a projection type display device according to another embodiment.

FIG. 42 is a schematic configuration diagram of a projection type display device according to another embodiment of the present disclosure. The projection type display device 200 shown in FIG. 42 has an image forming optical system 210 according to an embodiment of the present disclosure, a light source 215, and digital micromirror device (DMD: registered trademark) elements 21_a_ to 21_c_ as light valves each of which outputs an optical image corresponding to each color light. Further, the projection type display device 200 has total internal reflection (TIR) prisms 24_a_ to 24_c_ for color separation and color synthesis, and a polarized light separating prism 25 that separates illumination light and projection light. In addition, FIG. 42 schematically shows the image forming optical system 210. Furthermore, an integrator is disposed between the light source 215 and the polarized light separating prism 25, but is not shown in FIG. 42.

White light originating from the light source 215 is reflected on a reflective surface inside the polarized light separating prism 25, and is separated into ray with three colors (blue light, green light, and red light) through the TIR prisms 24_a_ to 24_c_. The separated ray with the respective colors are respectively incident into and modulated through the corresponding DMD elements 21_a_ to 21_c_, travel through the TIR prisms 24_a_ to 24_c_ again in a reverse direction, are subjected to color synthesis, are subsequently transmitted through the polarized light separating prism 25, and are incident into the image forming optical system 210. The image forming optical system 210 projects an optical image, which is based on the modulated light modulated through the DMD elements 21_a_ to 21_c_, onto a screen 205.

Figure 43:
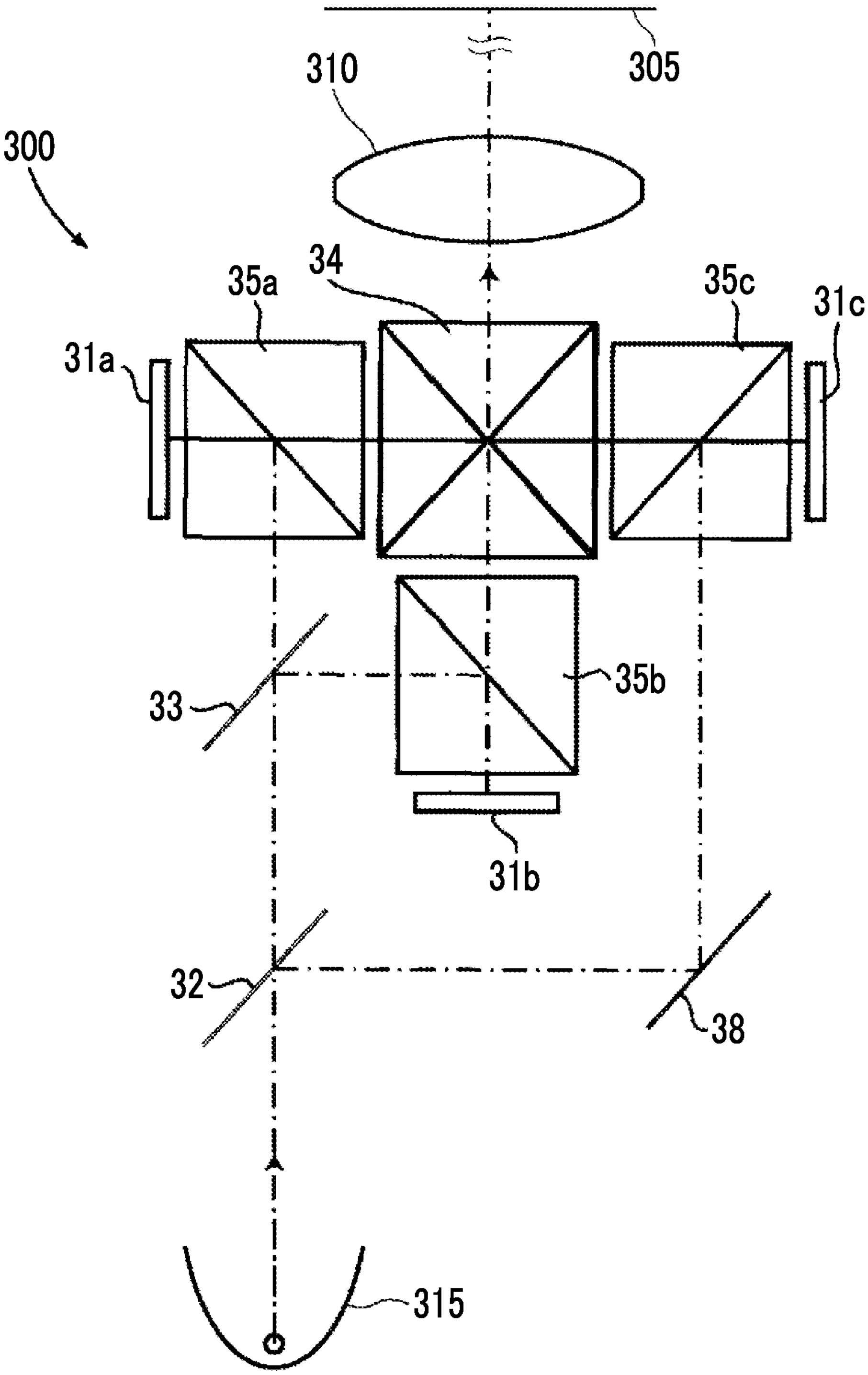
FIG. 43 is a schematic configuration diagram of a projection type display device according to still another embodiment.

FIG. 43 is a schematic configuration diagram of a projection type display device according to still another embodiment of the present disclosure. The projection type display device 300 shown in FIG. 43 has an image forming optical system 310 according to an embodiment of the present disclosure, a light source 315, and reflective display elements 31_a_ to 31_c_ as light valves corresponding to each color light and outputting an optical image. Further, the projection type display device 300 has dichroic mirrors 32 and 33 for color separation, a cross dichroic prism 34 for color synthesis, a total reflection mirror 38 for optical path deflection, and polarized light separating prisms 35_a_ to 35_c_. In addition, FIG. 43 schematically shows the image forming optical system 310. Furthermore, an integrator is disposed between the light source 315 and the dichroic minor 32, but is not shown in FIG. 43.

White light originating from the light source 315 is separated into ray with three colors (blue light, green light, and red light) through the dichroic mirrors 32 and 33. The separated ray with the respective colors respectively pass through the polarized light separating prisms 35_a_ to 35_c_, are incident into and modulated through the reflective display elements 31_a_ to 31_c_ respectively corresponding to the ray with the respective colors, are subjected to color synthesis through the cross dichroic prism 34, and are subsequently incident into the image forming optical system 310. The image forming optical system 310 projects an optical image, which is based on the modulated light modulated through the reflective display elements 31_a_ to 31_c_, onto a screen 305.

Figure 44:
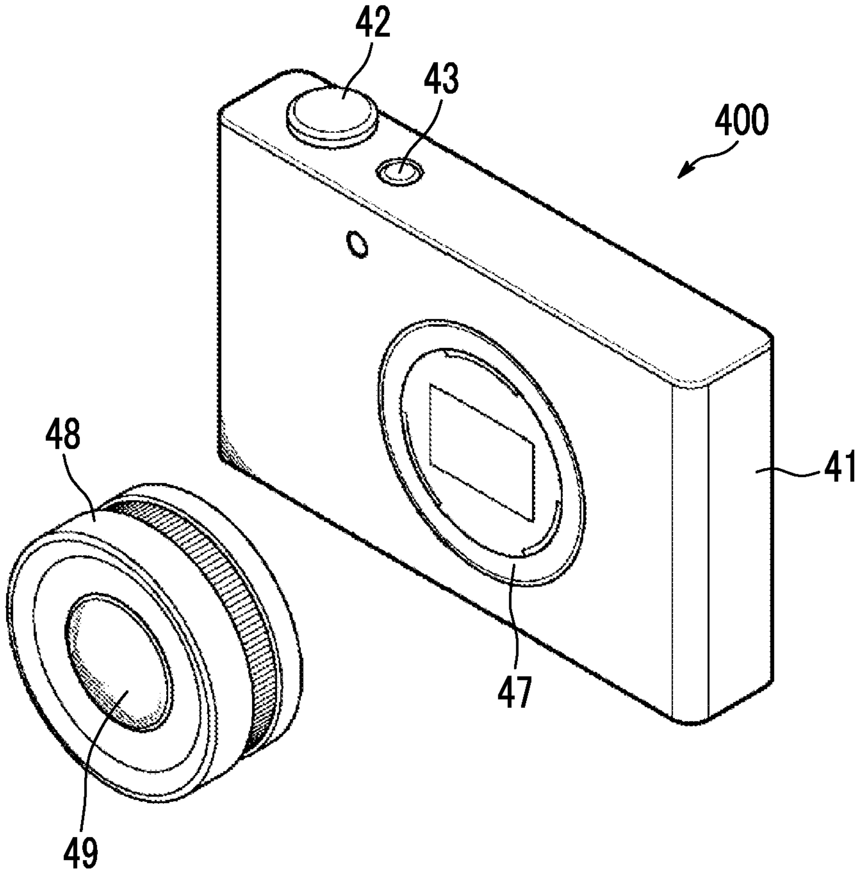
FIG. 44 is a perspective view of the front side of an imaging apparatus according to an embodiment.
Figure 45:
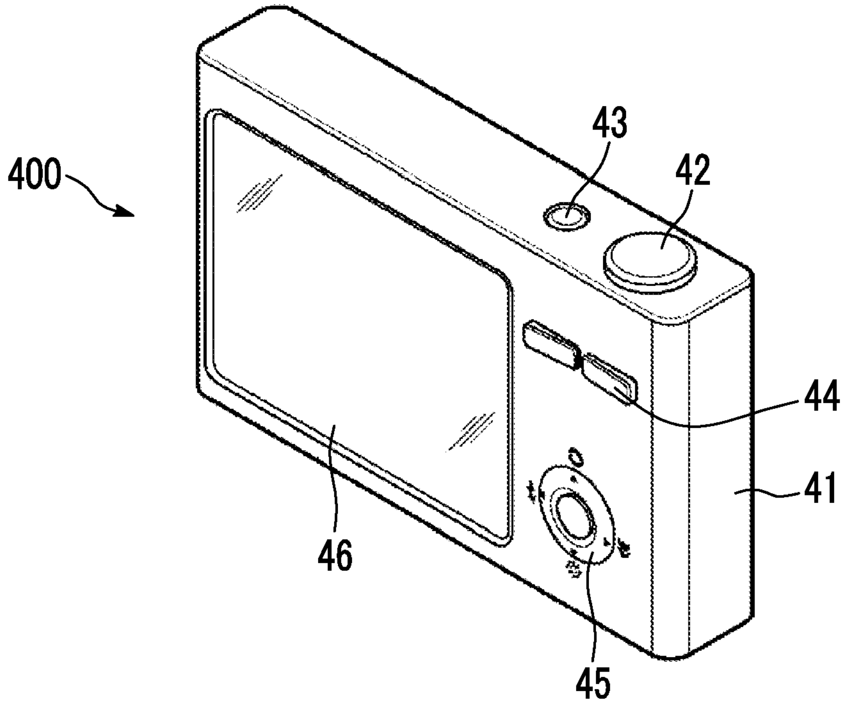
FIG. 45 is a perspective view of the rear side of the imaging apparatus shown in FIG. 44.

FIGS. 44 and 45 are external views of a camera 400 which is the imaging apparatus according to the embodiment of the present disclosure. FIG. 44 is a perspective view of the camera 400 viewed from a front side, and FIG. 45 is a perspective view of the camera 400 viewed from a rear side. The camera 400 is a mirrorless single-lens type digital camera on which an interchangeable lens 48 is attachably and detachably mounted. The interchangeable lens 48 is configured such that an image forming optical system 49 as the optical system according to the embodiment of the present disclosure is housed in a lens barrel.

The camera 400 comprises a camera body 41, and a shutter button 42 and a power button 43 are provided on an upper surface of the camera body 41. Further, operating parts 44 and 45 and a display unit 46 are provided on a rear surface of the camera body 41. The display unit 46 displays a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element (not shown), a signal processing circuit (not shown), a storage medium (not shown), and the like. The imaging element such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium stores the generated image. The camera 400 captures a static image or a video by pressing the shutter button 42, and records image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the projection type display device according to the technique of the present disclosure is not limited to the above-mentioned configuration, and may be modified into various forms such as the optical member used for ray separation or ray synthesis and the light valve. The light valve is not limited to a form in which light from a light source is spatially modulated through an image display element and is output as an optical image based on image data, but may be a form in which light itself output from the self-luminous image display element is output as an optical image based on the image data. Examples of the self-luminous image display element include an image display element in which light emitting elements such as light emitting diodes (LED) or organic light emitting diodes (OLED) are two-dimensionally arranged.

Further, the imaging apparatus according to the technique of the present disclosure is not limited to the above-mentioned configuration, and may be modified into various forms such as a non-mirrorless type camera, a film camera, a video camera, and a camera for movie imaging.

Regarding the above-mentioned embodiments and examples, the following Supplementary Notes will be further disclosed.

Supplementary Note 1

An image forming optical system capable of forming an image on a conjugated plane on a reduction side as an intermediate image and re-forming the intermediate image as a magnified image on a conjugated plane on a magnification side, the image forming optical system comprising:

a first adjustment group that moves along an optical axis in adjusting an image formation position of a region of the magnified image including a farthest point from the optical axis; and a second adjustment group that moves along the optical axis in adjusting an image formation position of a region of the magnified image including a nearest point from the optical axis, wherein an optical element disposed closest to the magnification side is a lens, and the second adjustment group includes at least two lenses, has a positive refractive power as a whole, and is disposed closest to the reduction side.

Supplementary Note 2

The image forming optical system according to Supplementary Note 1, wherein the second adjustment group consists of two lenses, at least one of the two lenses is a positive lens, and assuming that an Abbe number of the positive lens based on a d line is νp, Conditional Expression (1) is satisfied, which is represented by $$\nu p<45 \quad (1).$$

Supplementary Note 3

The image forming optical system according to Supplementary Note 1 or 2, wherein assuming that a focal length of the first adjustment group is f1, a composite focal length of a plurality of groups of the first adjustment group is f1 in a case where the first adjustment group consists of the plurality of groups that move by changing a spacing from adjacent groups during the adjustment, a focal length of the second adjustment group is f2, and a composite focal length of a plurality of groups of the second adjustment group is f2 in a case where the second adjustment group consists of the plurality of groups that move by changing a spacing from adjacent groups during the adjustment, Conditional Expression (2) is satisfied, which is represented by $$0.5<|f1/f2|<30 \quad (2).$$

Supplementary Note 4

The image forming optical system according to any one of Supplementary Notes 1 to 3, wherein assuming that a paraxial lateral magnification of the first adjustment group is β1, a composite paraxial lateral magnification of a plurality of groups of the first adjustment group is β1 in a case where the first adjustment group consists of the plurality of groups that move by changing a spacing from adjacent groups during the adjustment, a composite paraxial lateral magnification of the entire optical system closer to the reduction side than the first adjustment group is β1r, a paraxial lateral magnification of the second adjustment group is β2, and a composite paraxial lateral magnification of a plurality of groups of the second adjustment group is β2 in a case where the second adjustment group consists of the plurality of groups that move by changing a spacing from adjacent groups during the adjustment, Conditional Expression (3) is satisfied, which is represented by $$0<|\{(1-\beta 1^2)\times\beta 1r^2\}/(1-\beta 2^2)|0.5 \quad (3).$$

Supplementary Note 5

The image forming optical system according to any one of Supplementary Notes 1 to 4, wherein the first adjustment group is disposed closer to the magnification side than the intermediate image.

Supplementary Note 6

The image forming optical system according to any one of Supplementary Notes 1 to 5, wherein the image forming optical system consists of, in order from the magnification side to the reduction side, a first optical system and a second optical system with the intermediate image interposed therebetween, and assuming that a focal length of the first optical system is fU1, and a focal length of the image forming optical system is fw, where fU1 and fw are values at a wide angle end in a case where the image forming optical system is a variable magnification optical system, Conditional Expression (4) is satisfied, which is represented by $$1<fU1/|fw|<5 \quad (4).$$

Supplementary Note 7

The image forming optical system according to any one of Supplementary Notes 1 to 6, wherein assuming that a back focal length of the image forming optical system at an air-equivalent distance is Bfw, and a focal length of the image forming optical system is fw, where Bfw and fw are values at a wide angle end in a case where the image forming optical system is a variable magnification optical system, Conditional Expression (5) is satisfied, which is represented by $$3.5<Bfw/|fw| \quad (5).$$

Supplementary Note 8

The image forming optical system according to any one of Supplementary Notes 1 to 7, further comprising three single lenses that have negative refractive powers, successively in order from a position closest to the magnification side to the reduction side.

Supplementary Note 9

The image forming optical system according to any one of Supplementary Notes 1 to 8, wherein the image forming optical system is a variable magnification optical system, and the image forming optical system further includes at least two lens groups, of which spacings with adjacent groups change during magnification change, at a position closer to the reduction side than the intermediate image.

Supplementary Note 10

The image forming optical system according to any one of Supplementary Notes 1 to 9, wherein the first adjustment group consists of two or fewer lenses.

Supplementary Note 11

An image forming optical system capable of forming an image on a conjugated plane on a reduction side as an intermediate image and re-forming the intermediate image as a magnified image on a conjugated plane on a magnification side, the image forming optical system comprising:

a first adjustment group that moves along an optical axis in adjusting an image formation position of a region of the magnified image including a farthest point from the optical axis; and a second adjustment group that moves along the optical axis in adjusting an image formation position of a region of the magnified image including a nearest point from the optical axis, wherein an optical element disposed closest to the magnification side is a lens, the second adjustment group includes at least one positive lens, has a positive refractive power as a whole, and is disposed closest to the reduction side, and assuming that an Abbe number of the positive lens based on a d line is νp, Conditional Expression (1) is satisfied, which is represented by $$\nu p<45 \quad (1).$$

Supplementary Note 12

The image forming optical system according to Supplementary Note 11, wherein assuming that a focal length of the first adjustment group is f1, a composite focal length of a plurality of groups of the first adjustment group is f1 in a case where the first adjustment group consists of the plurality of groups that move by changing a spacing from adjacent groups during the adjustment, a focal length of the second adjustment group is f2, and a composite focal length of a plurality of groups of the second adjustment group is f2 in a case where the second adjustment group consists of the plurality of groups that move by changing a spacing from adjacent groups during the adjustment, Conditional Expression (2) is satisfied, which is represented by $$0.5<|f1/f2|<30 \quad (2).$$

Supplementary Note 13

The image forming optical system according to Supplementary Note 11 or 12, wherein assuming that a paraxial lateral magnification of the first adjustment group is β1, a composite paraxial lateral magnification of a plurality of groups of the first adjustment group is β1 in a case where the first adjustment group consists of the plurality of groups that move by changing a spacing from adjacent groups during the adjustment, a composite paraxial lateral magnification of the entire optical system closer to the reduction side than the first adjustment group is β1r, a paraxial lateral magnification of the second adjustment group is β2, and a composite paraxial lateral magnification of a plurality of groups of the second adjustment group is β2 in a case where the second adjustment group consists of the plurality of groups that move by changing a spacing from adjacent groups during the adjustment, Conditional Expression (3) is satisfied, which is represented by $$0<|\{(1-\beta1^2)\times\beta1r^2\}/(1-\beta2^2)|<0.5 \quad (3).$$

Supplementary Note 14

The image forming optical system according to any one of Supplementary Notes 11 to 13, wherein the first adjustment group is disposed closer to the magnification side than the intermediate image.

Supplementary Note 15

The image forming optical system according to any one of Supplementary Notes 11 to 14, wherein the image forming optical system consists of, in order from a magnification side to a reduction side, a first optical system and a second optical system with the intermediate image interposed therebetween, and assuming that a focal length of the first optical system is fU1, and a focal length of the image forming optical system is fw, where fU1 and fw are values at a wide angle end in a case where the image forming optical system is a variable magnification optical system, Conditional Expression (4) is satisfied, which is represented by $$1<fU1/|fw|<5 \quad (4).$$

Supplementary Note 16

The image forming optical system according to any one of Supplementary Notes 11 to 15, wherein assuming that a back focal length of the image forming optical system at an air-equivalent distance is Bfw, and a focal length of the image forming optical system is fw, where Bfw and fw are values at a wide angle end in a case where the image forming optical system is a variable magnification optical system, Conditional Expression (5) is satisfied, which is represented by $$3.5<Bfw/|fw| \quad (5).$$

Supplementary Note 17

The image forming optical system according to any one of Supplementary Notes 11 to 16, further comprising three single lenses that have negative refractive powers, successively in order from a position closest to the magnification side to the reduction side.

Supplementary Note 18

The image forming optical system according to any one of Supplementary Notes 11 to 17, wherein the image forming optical system is a variable magnification optical system, and the image forming optical system further includes at least two lens groups, of which spacings with adjacent groups change during magnification change, at a position closer to the reduction side than the intermediate image.

Supplementary Note 19

The image forming optical system according to any one of Supplementary Notes 11 to 18, wherein the first adjustment group consists of two or fewer lenses.

Supplementary Note 20

A projection type display device comprising:

a light valve that outputs an optical image; and the image forming optical system according to any one of Supplementary Notes 1 to 19, wherein the image forming optical system projects the optical image, which is output from the light valve, on a screen.

Supplementary Note 21

An imaging apparatus comprising the image forming optical system according to any one of Supplementary Notes 1 to 19.

What is claimed is:

1. An image forming optical system capable of forming an image on a conjugated plane on a reduction side as an intermediate image and re-forming the intermediate image as a magnified image on a conjugated plane on a magnification side, the image forming optical system comprising:

a first adjustment group that moves along an optical axis in adjusting an image formation position of a region of the magnified image including a farthest point from the optical axis; and a second adjustment group that moves along the optical axis in adjusting an image formation position of a region of the magnified image including a nearest point from the optical axis, wherein an optical element disposed closest to the magnification side is a lens, the second adjustment group includes at least two lenses, has a positive refractive power as a whole, and is disposed closest to the reduction side, and the first adjustment group is disposed closer to the magnification side than the intermediate image.

2. The image forming optical system according to claim 1, wherein the second adjustment group consists of two lenses, at least one of the two lenses is a positive lens, and assuming that an Abbe number of the positive lens based on a d line is νp, Conditional Expression (1) is satisfied, which is represented by $$\nu p<45 \quad (1).$$

3. The image forming optical system according to claim 1, wherein assuming that a focal length of the first adjustment group is f1, a composite focal length of a plurality of groups of the first adjustment group is f1 in a case where the first adjustment group consists of the plurality of groups that move by changing a spacing from adjacent groups during the adjustment, a focal length of the second adjustment group is f2, and a composite focal length of a plurality of groups of the second adjustment group is f2 in a case where the second adjustment group consists of the plurality of groups that move by changing a spacing from adjacent groups during the adjustment, Conditional Expression (2) is satisfied, which is represented by $$0.5<|f1/f2|<30 \quad (2).$$

4. The image forming optical system according to claim 1, wherein assuming that a paraxial lateral magnification of the first adjustment group is β1, a composite paraxial lateral magnification of a plurality of groups of the first adjustment group is β1 in a case where the first adjustment group consists of the plurality of groups that move by changing a spacing from adjacent groups during the adjustment, a composite paraxial lateral magnification of the entire optical system closer to the reduction side than the first adjustment group is β1r, a paraxial lateral magnification of the second adjustment group is β2, and a composite paraxial lateral magnification of a plurality of groups of the second adjustment group is β2 in a case where the second adjustment group consists of the plurality of groups that move by changing a spacing from adjacent groups during the adjustment, Conditional Expression (3) is satisfied, which is represented by $$0<|\{(1-\beta 1^2)\times\beta 1r^2\}/(1-\beta 2^2)|<0.5 \quad (3).$$

5. The image forming optical system according to claim 1, wherein the image forming optical system consists of, in order from the magnification side to the reduction side, a first optical system and a second optical system with the intermediate image interposed therebetween, and assuming that a focal length of the first optical system is fU1, and a focal length of the image forming optical system is fw, where fU1 and fw are values at a wide angle end in a case where the image forming optical system is a variable magnification optical system, Conditional Expression (4) is satisfied, which is represented by $$1<fU1/|fw|<5 \quad (4).$$

6. The image forming optical system according to claim 1, wherein assuming that a back focal length of the image forming optical system at an air-equivalent distance is Bfw, and a focal length of the image forming optical system is fw, where Bfw and fw are values at a wide angle end in a case where the image forming optical system is a variable magnification optical system, Conditional Expression (5) is satisfied, which is represented by $$3.5<Bfw/|fw| \quad (5).$$

7. The image forming optical system according to claim 1, comprising three single lenses that have negative refractive powers, successively in order from a position closest to the magnification side to the reduction side.

8. The image forming optical system according to claim 1, wherein the image forming optical system is a variable magnification optical system, and the image forming optical system includes at least two lens groups, of which spacings with adjacent groups change during magnification change, at a position closer to the reduction side than the intermediate image.

9. The image forming optical system according to claim 1, wherein the first adjustment group consists of two or fewer lenses.

10. An image forming optical system capable of forming an image on a conjugated plane on a reduction side as an intermediate image and re-forming the intermediate image as a magnified image on a conjugated plane on a magnification side, the image forming optical system comprising:

a first adjustment group that moves along an optical axis in adjusting an image formation position of a region of the magnified image including a farthest point from the optical axis; and a second adjustment group that moves along the optical axis in adjusting an image formation position of a region of the magnified image including a nearest point from the optical axis, wherein an optical element disposed closest to the magnification side is a lens, the second adjustment group includes at least one positive lens, has a positive refractive power as a whole, and is disposed closest to the reduction side, assuming that an Abbe number of the positive lens based on a d line is νp, Conditional Expression (1) is satisfied, which is represented by $$\nu p<45 \quad (1), \text{ and}$$

the first adjustment group is disposed to the magnification side than the intermediate image.

11. The image forming optical system according to claim 10, wherein assuming that a focal length of the first adjustment group is f1, a composite focal length of a plurality of groups of the first adjustment group is f1 in a case where the first adjustment group consists of the plurality of groups that move by changing a spacing from adjacent groups during the adjustment, a focal length of the second adjustment group is f2, and a composite focal length of a plurality of groups of the second adjustment group is f2 in a case where the second adjustment group consists of the plurality of groups that move by changing a spacing from adjacent groups during the adjustment, Conditional Expression (2) is satisfied, which is represented by $$0.5<|f1/f2|<30 \quad (2).$$

12. The image forming optical system according to claim 10, wherein assuming that a paraxial lateral magnification of the first adjustment group is β1, a composite paraxial lateral magnification of a plurality of groups of the first adjustment group is β1 in a case where the first adjustment group consists of the plurality of groups that move by changing a spacing from adjacent groups during the adjustment, a composite paraxial lateral magnification of the entire optical system closer to the reduction side than the first adjustment group is β1r, a paraxial lateral magnification of the second adjustment group is (β2, and a composite paraxial lateral magnification of a plurality of groups of the second adjustment group is β2 in a case where the second adjustment group consists of the plurality of groups that move by changing a spacing from adjacent groups during the adjustment, Conditional Expression (3) is satisfied, which is represented by $$0<|\{(1-\beta1^2)\times\beta1r^2\}/(1-\beta2^2)|<0.5 \quad (3).$$

13. The image forming optical system according to claim 10, wherein the image forming optical system consists of, in order from a magnification side to a reduction side, a first optical system and a second optical system with the intermediate image interposed therebetween, and assuming that a focal length of the first optical system is fU1, and a focal length of the image forming optical system is fw, where fU1 and fw are values at a wide angle end in a case where the image forming optical system is a variable magnification optical system, Conditional Expression (4) is satisfied, which is represented by $$1<fU1/|fw|<5 \quad (4).$$

14. The image forming optical system according to claim 10, wherein assuming that a back focal length of the image forming optical system at an air-equivalent distance is Bfw, and a focal length of the image forming optical system is fw, where Bfw and fw are values at a wide angle end in a case where the image forming optical system is a variable magnification optical system, Conditional Expression (5) is satisfied, which is represented by $$3.5<Bfw/|fw| \quad (5).$$

15. The image forming optical system according to claim 10, comprising three single lenses that have negative refractive powers, successively in order from a position closest to the magnification side to the reduction side.

16. The image forming optical system according to claim 10, wherein the image forming optical system is a variable magnification optical system, and the image forming optical system includes at least two lens groups, of which spacings with adjacent groups change during magnification change, at a position closer to the reduction side than the intermediate image.

17. The image forming optical system according to claim 10, wherein the first adjustment group consists of two or fewer lenses.

18. A projection type display device comprising:

a light valve that outputs an optical image; and the image forming optical system according to claim 1, wherein the image forming optical system projects the optical image, which is output from the light valve, on a screen.

19. An imaging apparatus comprising the image forming optical system according to claim 1.

* * * * *